(12) United States Patent
Dhar et al.

(10) Patent No.: US 8,808,914 B2
(45) Date of Patent: Aug. 19, 2014

(54) LEAD-ACID BATTERY DESIGN HAVING VERSATILE FORM FACTOR

(71) Applicants: Subhash Dhar, Bloomfield Hills, MI (US); William Koetting, Davisburg, MI (US); Michael Nielson, Royal Oak, MI (US); Kwok Tom, Madison Heights, MI (US); Jorge Espinel, Troy, MI (US); Fabio Albano, Royal Oak, MI (US)

(72) Inventors: Subhash Dhar, Bloomfield Hills, MI (US); William Koetting, Davisburg, MI (US); Michael Nielson, Royal Oak, MI (US); Kwok Tom, Madison Heights, MI (US); Jorge Espinel, Troy, MI (US); Fabio Albano, Royal Oak, MI (US)

(73) Assignee: Energy Power Systems, LLC, Troy, MI (US)

( * ) Notice: Subject to any disclaimer, the term of this patent is extended or adjusted under 35 U.S.C. 154(b) by 0 days.

(21) Appl. No.: 13/766,991

(22) Filed: Feb. 14, 2013

(65) Prior Publication Data

US 2013/0183559 A1 Jul. 18, 2013

Related U.S. Application Data

(63) Continuation-in-part of application No. 13/626,426, filed on Sep. 25, 2012, which is a continuation-in-part of application No. 13/350,686, filed on Jan. 13, 2012.

(30) Foreign Application Priority Data

Jan. 11, 2013 (WO) .................. PCT/US2013/21287

(51) Int. Cl.
*H01M 4/13* (2010.01)
*H01M 4/56* (2006.01)
*H01M 4/57* (2006.01)
*H01M 4/00* (2006.01)
*H01M 6/10* (2006.01)
*H01M 2/10* (2006.01)
*H01M 10/04* (2006.01)
*H01M 10/12* (2006.01)
*H01M 2/26* (2006.01)

(52) U.S. Cl.
CPC ........ *H01M 10/0431* (2013.01); *H01M 10/122* (2013.01); *H01M 2/26* (2013.01); *H01M 10/0477* (2013.01); *H01M 10/123* (2013.01); *Y02T 10/7016* (2013.01); *Y02E 60/126* (2013.01)
USPC ................ 429/228; 429/225; 429/94; 429/99

(58) Field of Classification Search
CPC combination set(s) only.
See application file for complete search history.

(56) References Cited

U.S. PATENT DOCUMENTS

| | | |
|---|---|---|
| 275,859 A | 4/1883 | Robertson |
| 3,395,043 A * | 7/1968 | Shoeld ........................... 429/94 |
| 3,615,831 A | 10/1971 | Ruben |
| 3,808,040 A | 4/1974 | Barnes et al. |
| 3,819,412 A | 6/1974 | Taylor et al. |
| 3,880,728 A | 4/1975 | Habermann et al. |
| 3,929,505 A | 12/1975 | Burkett et al. |
| 3,941,615 A | 3/1976 | McDowall |
| 4,020,244 A | 4/1977 | Selinko |
| 4,051,000 A | 9/1977 | Gendron et al. |
| 4,076,901 A | 2/1978 | Fritz et al. |
| 4,096,318 A | 6/1978 | Wurmb et al. |
| 4,115,630 A | 9/1978 | Van Ommering et al. |
| 4,209,575 A | 6/1980 | McDowall et al. |
| 4,239,839 A | 12/1980 | McDowall et al. |
| 4,271,244 A | 6/1981 | Gabano et al. |
| 4,289,835 A | 9/1981 | Lee et al. |
| 4,307,758 A | 12/1981 | McDowall et al. |
| 4,323,470 A | 4/1982 | Mahato et al. |
| 4,345,009 A | 8/1982 | Fahle et al. |
| 4,353,969 A | 10/1982 | Rippel et al. |
| 4,401,730 A | 8/1983 | Szymborski et al. |
| 4,405,697 A | 9/1983 | Rowlette |
| 4,415,411 A | 11/1983 | Kanai et al. |
| 4,430,390 A | 2/1984 | Fekete |
| 4,477,540 A | 10/1984 | Miller et al. |
| 4,517,264 A | 5/1985 | Miller et al. |
| 4,537,842 A | 8/1985 | Sundberg |

| | | |
|---|---|---|
| 4,547,939 A | 10/1985 | McDowall et al. |
| 4,563,727 A * | 1/1986 | Curiel ............................ 362/183 |
| 4,603,093 A | 7/1986 | Edwards et al. |
| 4,615,107 A | 10/1986 | Kumeta et al. |
| 4,642,274 A | 2/1987 | Tsutsumi et al. |
| 4,658,623 A | 4/1987 | Blanyer et al. |
| 4,664,992 A | 5/1987 | Edwards et al. |
| 4,692,391 A | 9/1987 | Hirota |
| 4,787,125 A | 11/1988 | Pinsky et al. |
| 4,861,689 A | 8/1989 | Clough et al. |
| 4,964,878 A | 10/1990 | Morris |
| 4,997,728 A | 3/1991 | Onoda et al. |
| 5,009,968 A | 4/1991 | Guthrie et al. |
| 5,010,637 A | 4/1991 | Blanyer et al. |
| 5,114,804 A | 5/1992 | Stiles et al. |
| 5,126,218 A | 6/1992 | Clarke |
| 5,156,935 A | 10/1992 | Hohjo et al. |
| 5,158,841 A | 10/1992 | Mennicke et al. |
| 5,203,972 A | 4/1993 | Shimamune et al. |
| 5,288,566 A | 2/1994 | Ginatta et al. |
| 5,321,627 A | 6/1994 | Reher |
| 5,331,268 A | 7/1994 | Patino et al. |
| 5,348,817 A | 9/1994 | Rao et al. |
| 5,349,282 A | 9/1994 | McClure |
| 5,357,203 A | 10/1994 | Landau et al. |
| 5,365,160 A | 11/1994 | Leppo et al. |
| 5,368,960 A | 11/1994 | Rowlette |
| 5,379,502 A | 1/1995 | Feldstein |
| 5,396,163 A | 3/1995 | Nor et al. |
| 5,397,659 A | 3/1995 | Imhof et al. |
| 5,409,787 A | 4/1995 | Blanyer et al. |
| 5,427,872 A | 6/1995 | Shen et al. |
| 5,449,571 A | 9/1995 | Longardner et al. |
| 5,474,863 A | 12/1995 | Yamamoto |
| 5,563,496 A | 10/1996 | McClure |
| 5,585,209 A | 12/1996 | Feldstein |
| 5,698,967 A | 12/1997 | Baer et al. |
| 5,701,068 A | 12/1997 | Baer et al. |
| 5,710,506 A | 1/1998 | Broell et al. |
| 5,738,955 A | 4/1998 | Gardner et al. |
| 5,744,258 A | 4/1998 | Bai et al. |
| 5,851,695 A | 12/1998 | Misra et al. |
| 5,851,698 A | 12/1998 | Reichman et al. |
| 5,853,914 A | 12/1998 | Kawakami |
| 5,856,047 A | 1/1999 | Venkatesan et al. |
| 5,925,470 A | 7/1999 | Blanyer et al. |
| 5,958,625 A | 9/1999 | Rao |
| 6,027,822 A | 2/2000 | Blanyer et al. |
| 6,074,774 A | 6/2000 | Semmens et al. |
| 6,124,057 A | 9/2000 | Ito et al. |
| 6,139,705 A | 10/2000 | Brown, Jr. et al. |
| 6,204,630 B1 | 3/2001 | James |
| 6,232,017 B1 | 5/2001 | Tsuchida et al. |
| 6,248,478 B1 | 6/2001 | Friend et al. |
| 6,316,148 B1 | 11/2001 | Timmons et al. |
| 6,330,925 B1 | 12/2001 | Ovshinsky et al. |
| 6,352,795 B1 | 3/2002 | Nilsson et al. |
| 6,440,384 B1 | 8/2002 | Leung et al. |
| 6,511,773 B1 | 1/2003 | Dampier |
| 6,557,655 B2 | 5/2003 | Ovshinsky et al. |
| 6,565,836 B2 | 5/2003 | Ovshinsky et al. |
| 6,566,010 B1 | 5/2003 | Bhardwaj et al. |
| 6,759,034 B2 | 7/2004 | Ovshinsky et al. |
| 6,820,706 B2 | 11/2004 | Ovshinsky et al. |
| 6,837,321 B2 | 1/2005 | Ovshinsky et al. |
| 6,858,348 B2 | 2/2005 | Kitoh |
| 6,889,410 B2 | 5/2005 | Shivashankar et al. |
| 6,908,711 B2 | 6/2005 | Fauteux et al. |
| 7,060,391 B2 | 6/2006 | Gyenge et al. |
| 7,118,830 B1 | 10/2006 | Boden et al. |
| 7,119,047 B1 | 10/2006 | Adrianov et al. |
| 7,217,473 B2 | 5/2007 | Ovshinsky et al. |
| 7,226,675 B2 | 6/2007 | Ovshinsky et al. |
| 7,476,463 B2 | 1/2009 | DeSilvestro et al. |
| 7,482,081 B2 | 1/2009 | Hong |
| 7,541,113 B2 | 6/2009 | Partington |
| 7,732,098 B2 | 6/2010 | Gerber |
| 7,790,304 B2 | 9/2010 | Hendricks et al. |
| 7,799,466 B2 | 9/2010 | Lin |
| 7,811,701 B2 | 10/2010 | Yao |
| 7,816,034 B2 | 10/2010 | McGervey et al. |
| 7,826,197 B2 | 11/2010 | Gramm et al. |
| 7,868,777 B2 | 1/2011 | Bruce et al. |
| 7,881,042 B2 | 2/2011 | Buiel et al. |
| 8,017,273 B2 | 9/2011 | Lara-Curzio et al. |
| 8,048,572 B2 | 11/2011 | Gerber |
| 2002/0031702 A1 * | 3/2002 | Kimura et al. ................ 429/161 |
| 2003/0170535 A1 | 9/2003 | Watanabe |
| 2004/0112486 A1 | 6/2004 | Aust et al. |
| 2004/0170889 A1 | 9/2004 | Feng et al. |
| 2005/0208382 A1 | 9/2005 | Datta et al. |
| 2006/0046148 A1 | 3/2006 | Sakai et al. |
| 2007/0111080 A1 | 5/2007 | Brost et al. |
| 2007/0128472 A1 | 6/2007 | Tierney et al. |
| 2007/0148542 A1 | 6/2007 | Szymborski et al. |
| 2008/0038629 A1 | 2/2008 | Okabe et al. |
| 2008/0111508 A1 | 5/2008 | Dasgupta et al. |
| 2008/0245587 A1 | 10/2008 | Sastry et al. |
| 2009/0181306 A1 | 7/2009 | Kurisawa |
| 2009/0269658 A1 | 10/2009 | Shukla et al. |
| 2009/0269666 A1 | 10/2009 | Lara-Curzio et al. |
| 2010/0136245 A1 | 6/2010 | Albano et al. |
| 2010/0138072 A1 | 6/2010 | Wang et al. |
| 2010/0141212 A1 | 6/2010 | Stancovski |
| 2010/0167117 A1 | 7/2010 | Maroon et al. |
| 2010/0178543 A1 | 7/2010 | Gruner et al. |
| 2010/0183920 A1 | 7/2010 | Shaffer, II et al. |
| 2011/0020693 A1 | 1/2011 | Hoshiba |
| 2011/0104563 A1 | 5/2011 | Galloway et al. |
| 2011/0151286 A1 | 6/2011 | Lam et al. |
| 2011/0171527 A1 | 7/2011 | Simpson |
| 2011/0247936 A1 | 10/2011 | Stancovski |
| 2011/0274950 A1 | 11/2011 | Whitacre |
| 2011/0274969 A1 | 11/2011 | Wang |
| 2011/0287314 A1 | 11/2011 | Jung |
| 2012/0003509 A1 | 1/2012 | Gerber |
| 2012/0003543 A1 | 1/2012 | Kirchev et al. |
| 2012/0321949 A1 | 12/2012 | Kawakami et al. |
| 2013/0183559 A1 | 7/2013 | Dhar et al. |
| 2013/0183572 A1 | 7/2013 | Dhar et al. |
| 2013/0183581 A1 | 7/2013 | Dhar et al. |
| 2013/0216857 A1 | 8/2013 | Dhar et al. |
| 2013/0244061 A1 | 9/2013 | Dhar et al. |
| 2013/0244063 A1 | 9/2013 | Dhar et al. |

FOREIGN PATENT DOCUMENTS

| | | |
|---|---|---|
| CN | 2508406 Y | 8/2002 |
| CN | 1553531 A | 12/2004 |
| CN | 101719565 A | 6/2010 |
| CN | 102208691 A | 10/2011 |
| EP | 0 107 517 A2 | 5/1984 |
| GB | 2 289 976 A | 12/1995 |
| GB | 2 381 179 A | 4/2003 |
| JP | 55-133761 A | 10/1980 |
| JP | 56-145672 A | 11/1981 |
| JP | 58-166679 A | 10/1983 |
| JP | 60-091572 | 5/1985 |
| WO | WO 95/15584 A1 | 6/1995 |
| WO | WO 99/26802 A1 | 6/1999 |

OTHER PUBLICATIONS

Christoglou et al., "Deposition of Cr, Al coatings on Ni by Means of a PB and FB CVD process" *J. Phys. IV France*, 11:1125-1130 (2001).

Diniz et al., "A comparative study of pulsed current formation for positive plates of automotive lead acid batteries" *J. Power Sources*, 109:184-188 (2002).

Ellis et al., "The performance of Ebonex® electrodes in bipolar lead-acid batteries" *J. Power Sources*, 136:366-371 (2004).

Fang et al., "Effect of Gap Size on Coating Extrusion of Pb-GF Composite Wire by Theoretical Calculation and Experimental Investigation" *J. Mater. Sci. Technol.*, 21:729-732 (2005).

Jay "The Horizon® Valve-Regulated Lead Acid Battery—Reengineering the Lead Acid Battery" Proceedings of the 31st Intersociety Energy Conversion Engineering Conference, Aug. 11-16, 1996, Washington, DC. vol. 2, 96227, pp. 1148-1152.

Karami et al., "Synthesis of Lead Dioxide Nanoparticles by the Pulsed Current Electrochemical Method" *Int. J. Electrochem. Sci.*, 4:1511-1527 (2009).
Keyser et al., "Charging Algorithms for Increasing Lead Acid Battery Cycle Life for Electric Vehicles" Presented at the 17th Electric Vehicle Symposium, Montreal, Canada, Oct. 16-18, 2000 (28 pages).
Kurisawa et al., "Development of positive electrodes with an $SnO_2$ coating by applying a sputtering technique for lead-acid batteries" *J. Power Sources*, 95:125-129 (2001).
Lam et al., "Pulsed-current charging of lead/acid batteries—a possible means for overcoming premature capacity loss?" *J. Power Sources*, 53:215-228 (1995).
Lam et al., "Novel technique to ensure battery reliability in 42-V PowerNets for new-generation automobiles" *J. Power Sources*, 144:552-559 (2005).
Loyns et al., "Bipolar batteries based on Ebonex® technology" *J. Power Sources*, 144:329-337 (2005).
Pulsetech Products Corp., "The U.S. Army Battery Maintenance Program" Training Slides [online]. Retrieved from the Internet: http://www.pulsetech.net/Assets/Misc/PPC%20BMMP%20-%20Jan%202012_sm.pdf, 56 pages (date unknown).
Ravichandran et al., "Analysis of shear banding in metallic glasses under bending" *Acta Materialia*, 53:4087-4095 (2005).
Torabi et al., "Study of Thermal-Runaway in Batteries. II. The Main Sources of Heat Generation in Lead-Acid Batteries" J. Electrochem. Soc., 160(2):A223-A234 (2013).
Yolshina et al., "A lead-film electrode on an aluminium substrate to serve as a lead-acid battery plate" *J. Power Sources*, 78:84-87 (1999).
A123 Systems, (2012), "Nanophosphate® Lithium Ion Prismatic Pouch Cell. AMP20m1HD-A" Datasheet, [online]. Retrieved from: http://info.a123systems.com/data-sheet-20ah-prismatic-pouch-cell, 2 pages.
Cairns et al., "Batteries for Electric and Hybrid-Electric Vehicles" *Annu. Rev. Chem. Biomol. Eng.*, 1:299-320 (2010).
Craven, "Horizon® sealed lead acid battery in electric vehicle application" 11th Annual Battery Conference on Applications and Advances, 1996, *IEEE Conference Publication*, Identifier No. 10.1109/BCAA. 1996.484987; pp. 159-162 (1996).
D'Alkaine et al., "Processes involved in charging of discharged lead-acid battery electrodes by pulse methods. I. Qualitative Analysis for flat negative electrodes" *J. Power Sources*, 158:997-1003 (2006).
Emmett, "A Battery for All Seasons?: VRLA batteries are a mainstay for remote power applications. But can they really hold up in harsh environments?" originally published in *Telephony*, 234(4):P8-P14 (Jan. 26, 1998), Retrieved online: www.connectedplanetonline.com.
Hund, "Capacity Loss in PV Batteries and Recovery Procedures" Photovoltaic System Applications Department, Sandia National Laboratories, 1999, 12 pages.
International Search Report and Written Opinion issued in International Patent Application No. PCT/US2013/20813, mailed May 20, 2013 (12 pages).
International Search Report and Written Opinion issued in International Patent Application No. PCT/US2013/21287, mailed May 21, 2013 (14 pages).
International Search Report and Written Opinion issued in International Patent Application No. PCT/US2013/030855; mailed May 24, 2013 (6 pages).
International Search Report and Written Opinion issued in International Patent Application No. PCT/US2013/040862, mailed Oct. 2, 2013 (7 pages).
James et al., "Application of pulse charging techniques to submarine lead-acid batteries" *J. Power Resources*, 162:878-883 (2006).
Kim et al., "Fast-charging of a lead-acid cell, effect of rest period and depolarization pulse" *J. Power Sources*, 89:93-101 (2003).
Lam et al., "Pulsed-current formation of tetrabasic lead sulfate in cured lead/acid battery plates" *J. Power Sources*, 42:55-70 (1993).
Lam et al., "Failure made of valve-regulated lead-acid batteries under high-rate partial-state-of-charge operation" *J. Power Sources*. 133:126-134 (2004).
*Handbook of Batteries*. Third Edition. D. Linden and T. Reddy (Eds.), McGraw-Hill, 2002; Chapters 22 and 23, pp. 22.3-23.88.
*Linden's Handbook of Batteries*. Fourth Edition, T. Reddy (Ed.), New York: McGraw-Hill, 2011; Chapter 29, pp. 29.3-29.48.
*Linden's Handbook of Batteries*. Fourth Edition. T. Reddy (Ed.), New York: McGraw-Hill, 2011; pp. 2.2-2.3.
Nolan et al., "EIS Modeling of Batteries Subjected to Interfacial Process Stimulation" Presented at Battery Congress 2011, Global Automotive Manadement Council (GAMC), Ann Arbor, Michigan, USA, Apr. 11-12, 2011. *Proceedings*. Curran Associates, Inc., Jul. 2011: vol. 60. pp. 44-58.
Saur et al., "Charging performance of automotive batteries—An underestimated factor influencing lifetime and reliable battery operation" *J. Power Sources*, 168:22-30(2007).
United States Environmental Protection Agency, "Final Rulemaking to Establish Light-Duty Vehicle Greenhouse Gas Emission Standards and Corporate Average Fuel Economy Standards. Regulatory Impact Analysis" EPA-420-R-10-009, Apr. 2010 [online]. Retrieved from the Internet: http://www.epa.gov/oms/climate/regulations/420r10009.pdf (474 pages).
Wikipedia, "Lead-Acid Battery" [online]. Retrieved from http://en.wikipedia.org/wiki/Lead_acid_battery 15 pages (2013).
Zhang et al. "The effects of pulse charging on inner pressure and cycling characteristics of sealed Ni/MH batteries" *J. Power Sources*, 136:180-185 (2004).
Co-pending U.S. Appl. No. 13/350,505, filed Jan. 13, 2012.
Co-pending U.S. Appl. No. 13/350,686, filed Jan. 13, 2012.
Co-pending U.S. Appl. No. 13/419,678, filed Mar. 27, 2012.
Co-pending U.S. Appl. No. 13/475,484, filed May 18, 2012.
Co-pending U.S. Appl. No. 13/588,623, filed Aug. 17, 2012.
Co-pending U.S. Appl. No. 13/626,426, filed Sep. 25, 2012.
Co-pending U.S. Appl. No. 13/768,192, filed Feb. 15, 2013.
Co-pending U.S. Appl. No. 13/770,230, filed Feb. 19, 2013.
Co-pending U.S. Appl. No. 13/842,777, filed Mar. 15, 2013.
Co-pending U.S. Appl. No. 13/843,373, filed Mar. 15, 2013.
Co-pending U.S. Appl. No. 13/843,953, filed Mar. 15, 2013.
Co-pending U.S. Appl. No. 14/145,640, filed Dec. 31, 2013.
Co-pending U.S. Appl. No. 14/145,692, filed Dec. 31, 2013.
Co-pending U.S. Appl. No. 14/145,899, filed Dec. 31, 2013.
Office Action (Final) mailed Dec. 18, 2013, in co-pending U.S. Appl. No. 13/419,678.
Office Action (Final) mailed Dec. 20, 2013, in co-pending U.S. Appl. No. 13/770,230.

\* cited by examiner

*Primary Examiner* — Yoshitoshi Takeuchi
(74) *Attorney, Agent, or Firm* — Finnegan, Henderson, Farabow, Garrett & Dunner LLP

(57) ABSTRACT

An electrochemical storage device comprises a plurality of layer electrodes, wherein each layer electrode includes a first charged sector and a second charged sector, wherein the second charged sector is charged oppositely compared to the first charged sector, and wherein the plurality of layer electrodes are assembled with respect to each other such that the first charged sector of a first plate of the plurality of layer electrodes is laid below the second charged sector of a second plate of the plurality of layer electrodes located immediately above the first plate, wherein the charges of the first charged sectors of the first and second plates have a first sign and the charges of the second charged sectors of the first and second plates have a second sign that is opposite the first sign; a separator sector located, and enabling ionic charge exchange between the first charged sector of the first plate and the second charged sector of the second plate.

9 Claims, 59 Drawing Sheets

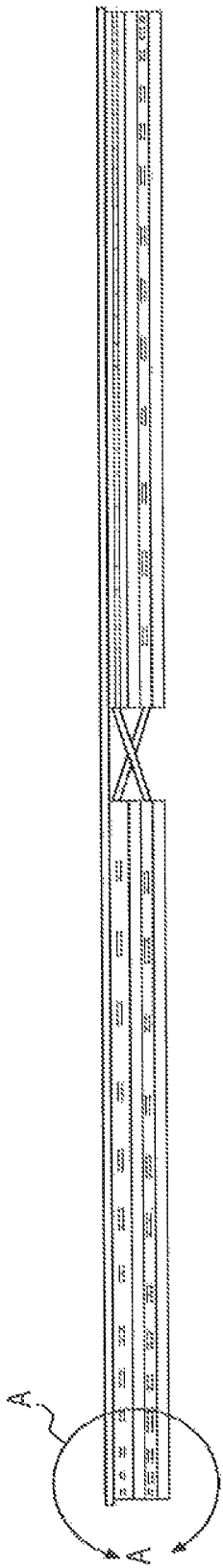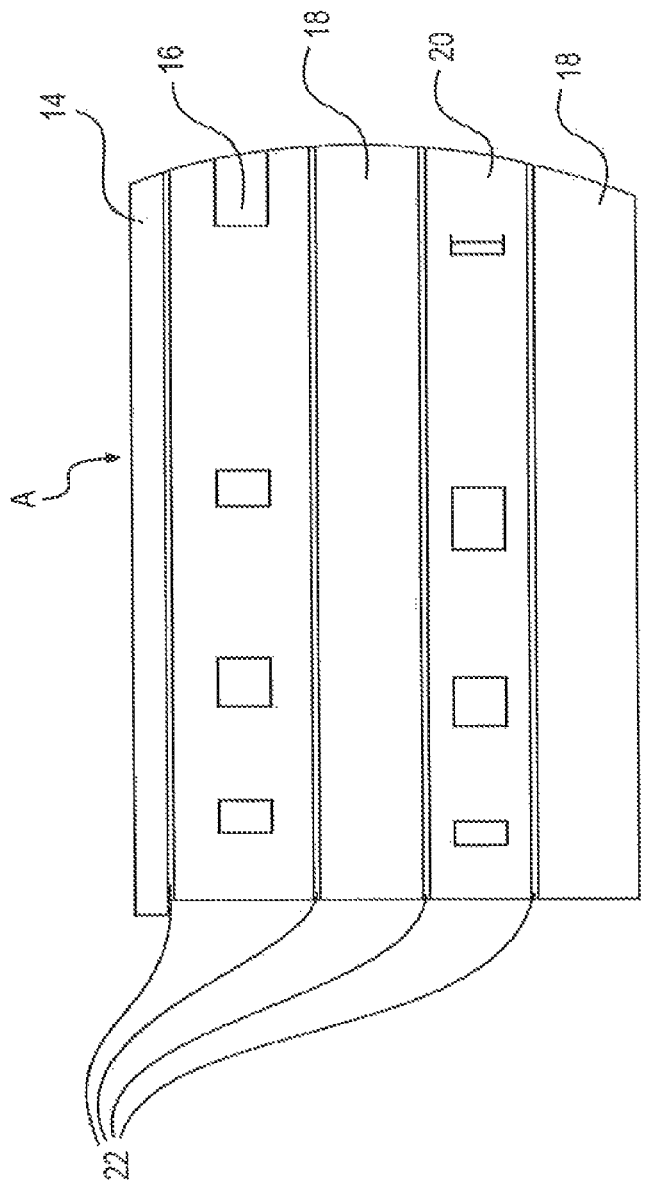
FIG. 3A
FIG. 3B

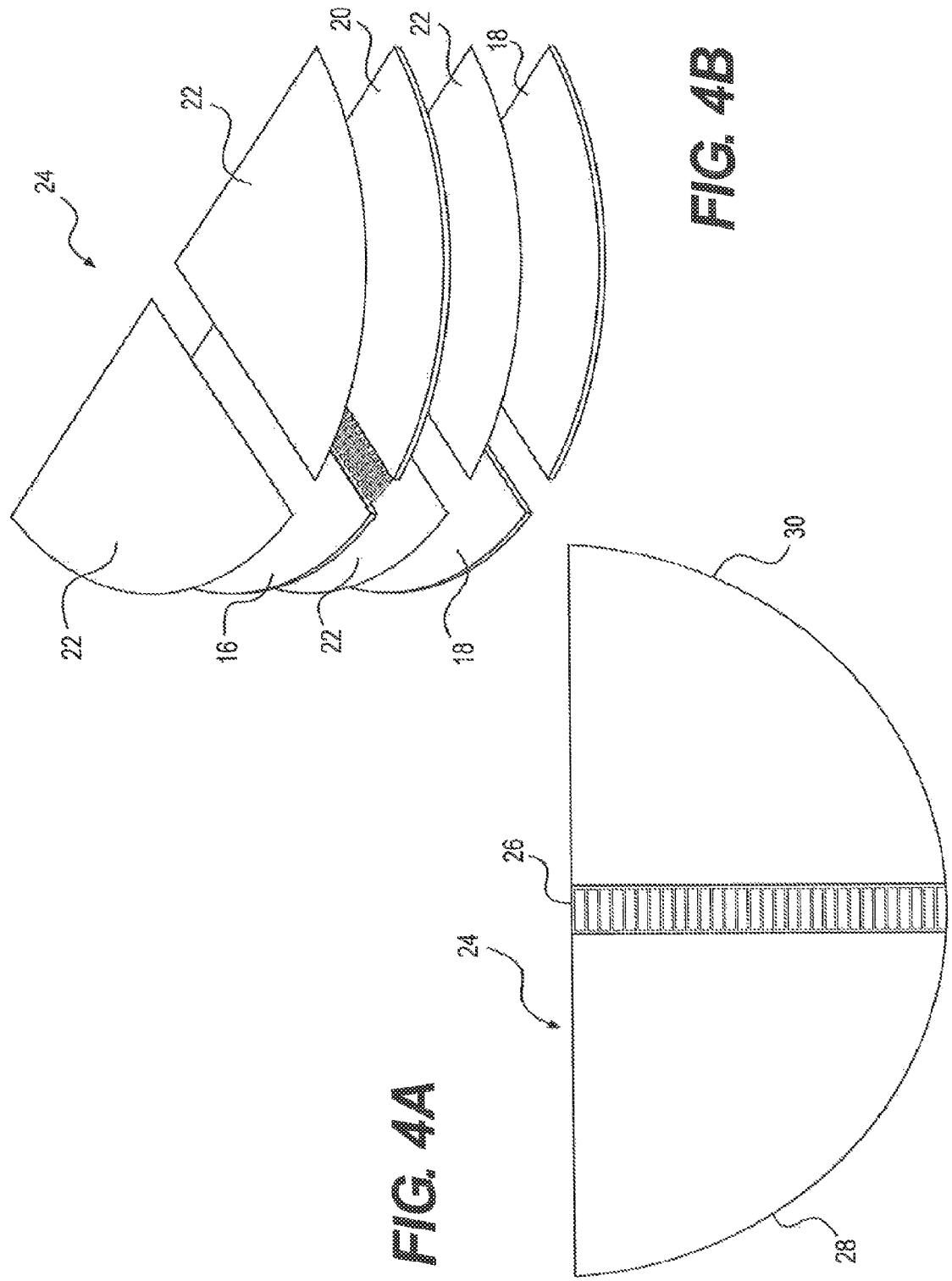

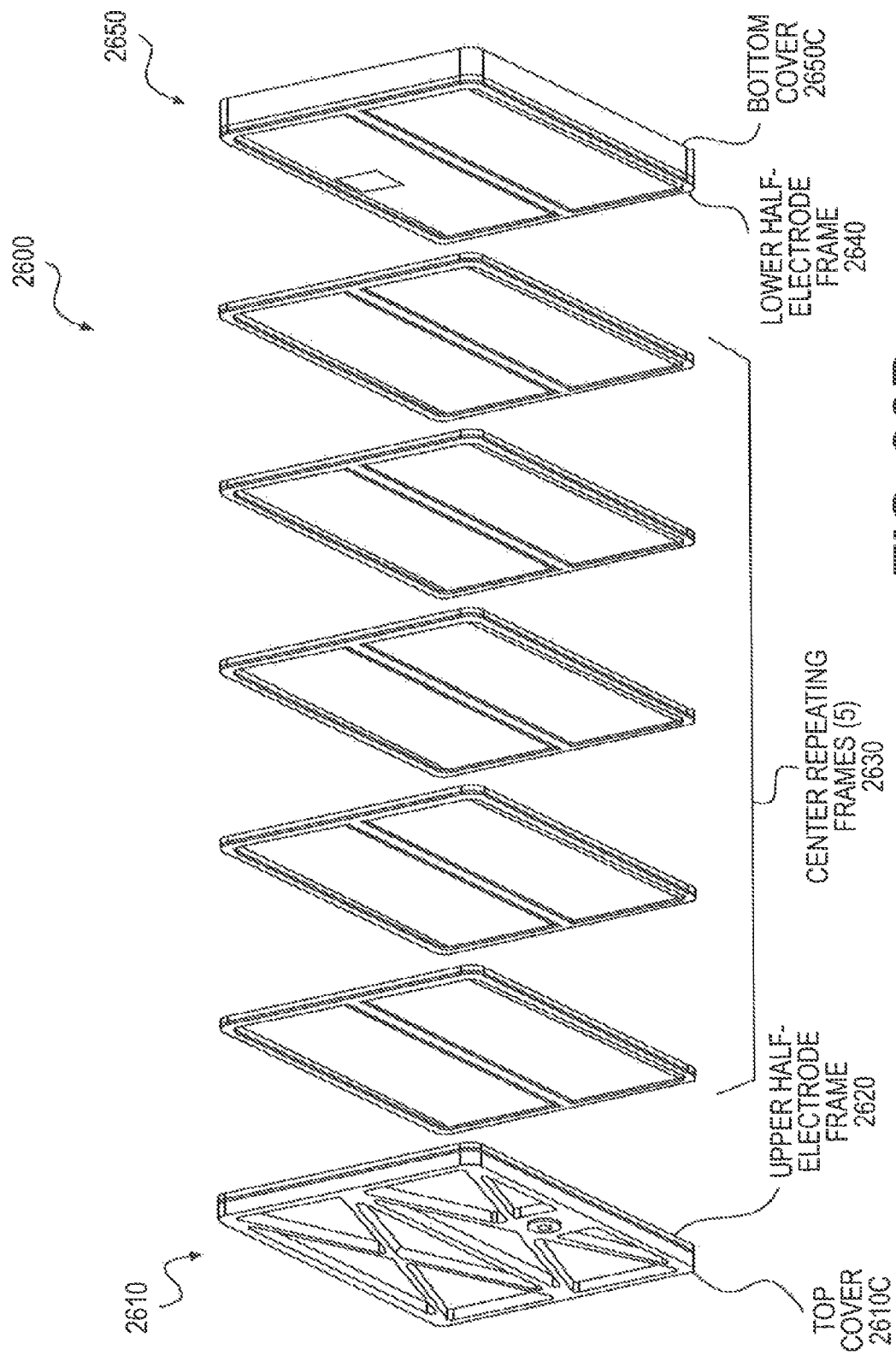

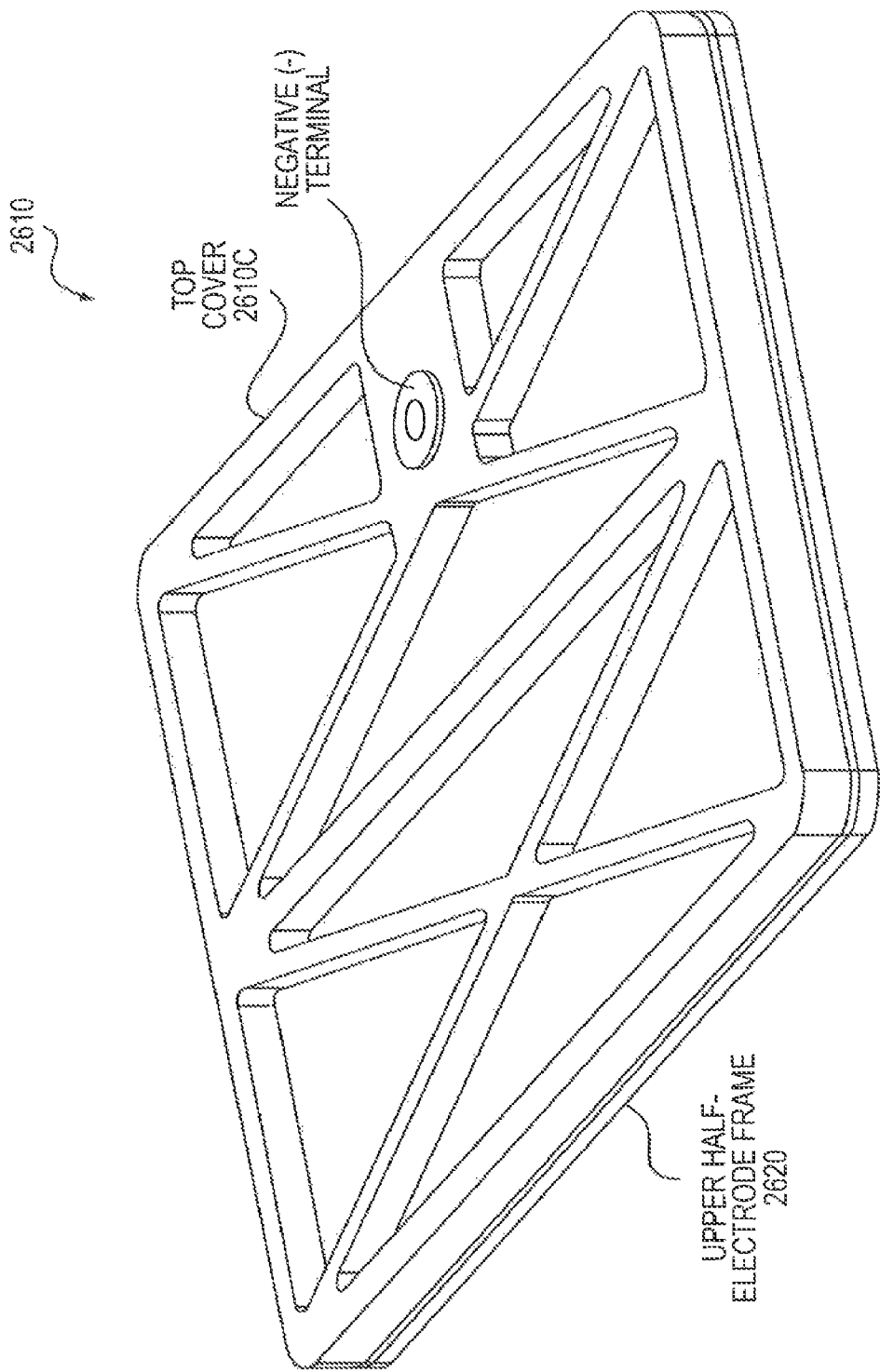

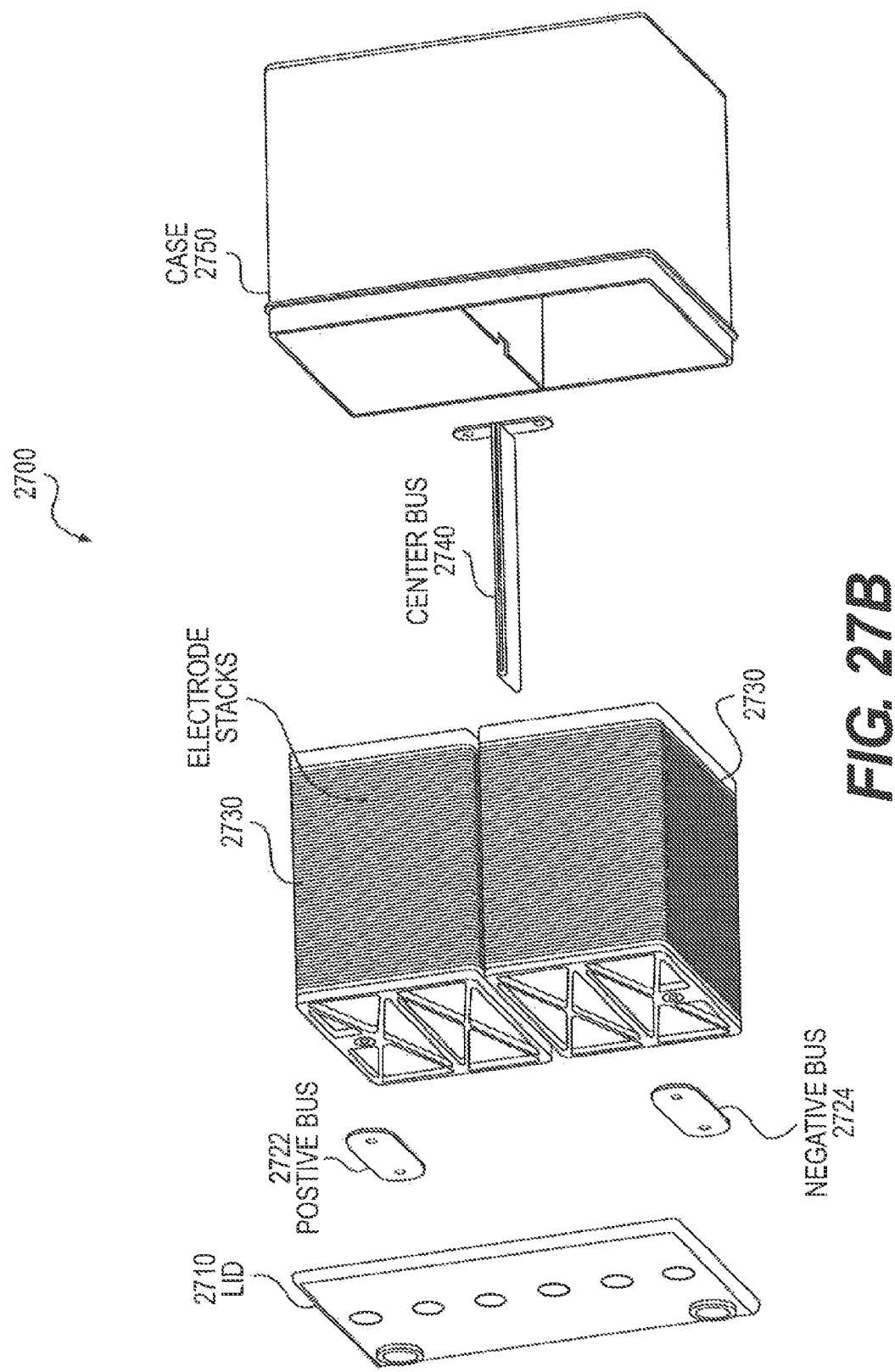

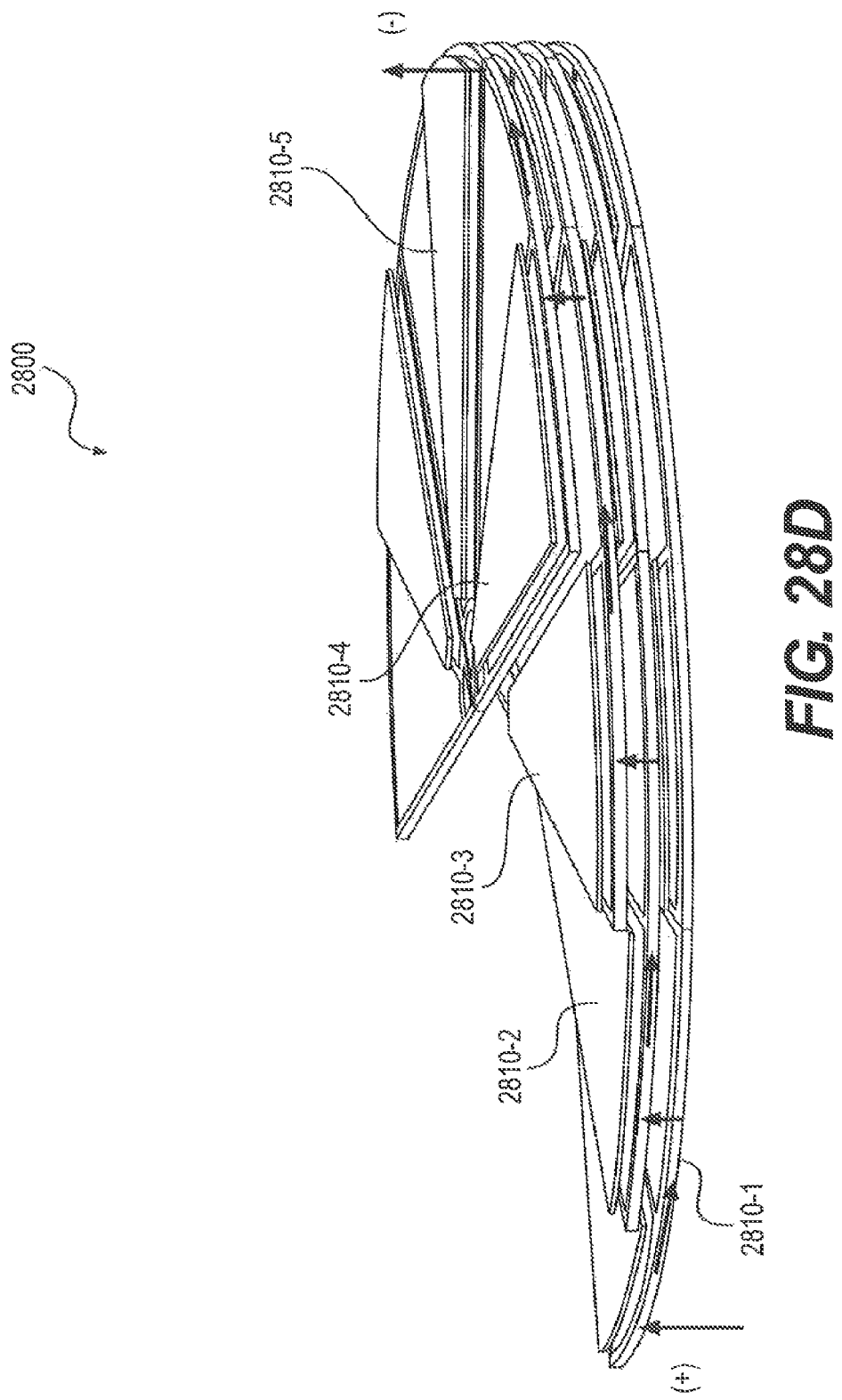

LEAD-ACID BATTERY DESIGN HAVING VERSATILE FORM FACTOR

RELATED APPLICATIONS

This application claims priority to PCT International Application No. PCT/US2013/021287, filed on Jan. 11, 2013, and is a continuation in part of application Ser. No. 13/626,426, filed on Sep. 25, 2012, entitled "Lead-acid battery design having versatile form factor," which is a continuation in part of application Ser. No. 13/350,686, filed Jan. 13, 2012, also entitled "Lead-acid battery design having versatile form factor," which incorporates the entire disclosure of the concurrently filed U.S. application Ser. No. 13/350,505 entitled, "Improved Substrate for Electrode of Electrochemical Cell." This application incorporates, by reference, the entire contents of all the above-listed applications.

TECHNICAL FIELD

Embodiments of the present disclosure relate generally to electrochemical cells. More particularly, embodiments of the present disclosure relate to a design of a lead-acid electrochemical cell.

BACKGROUND

Lead-acid electrochemical cells have been commercially successful as power cells for over one hundred years. For example, lead-acid batteries are widely used for starting, lighting, and ignition (SLI) applications in the automotive industry.

As an alternative to lead-acid batteries, nickel-metal hydride ("Ni-MH") and lithium-ion ("Li-ion") batteries have been used for hybrid and electric vehicle applications. Despite their higher cost, Ni-MH and Li-ion electro-chemistries have been favored over lead-acid electrochemistry for hybrid and electric vehicle applications due to their higher specific energy and energy density compared to lead-acid batteries.

While lead-acid, Ni-MH, and Li-ion batteries have each experienced commercial success, conventionally, each of these three types of chemistries have been limited to certain applications. FIG. 18 shows a Ragone plot of various types of electrochemical cells that have been used in automotive applications, depicting their respective specific powers and specific energies compared to other technologies.

Lead-acid battery technology is low-cost, reliable, and relatively safe. Certain applications, such as complete or partial electrification of vehicles and back-up power applications, require higher specific energy than traditional SLI lead-acid batteries deliver. As shown in Table 1, lead-acid batteries suffer from low specific energy due to the weight of the components. Thus, there remains a need for low-cost, reliable, and relatively safe electrochemical cells for various applications that require high specific energy, including certain automotive and back-up power applications.

Lead-acid batteries have many advantages. First, they are a low-cost technology capable of being manufactured in any part of the world. Accordingly, production of lead-acid batteries can be readily scaled-up. Lead-acid batteries are available in large quantities in a variety of sizes and designs. In addition, they deliver good high-rate performance and moderately good low- and high-temperature performance. Lead-acid batteries are electrically efficient, with a turnaround efficiency of 75 to 80%, provide good "float" service (where the charge is maintained near the full-charge level by trickle charging), and exhibit good charge retention. Further, although lead is toxic, lead-acid battery components are easily recycled. An extremely high percentage of lead-acid battery components (in excess of 95%) are typically recycled.

Lead-acid batteries suffer from certain disadvantages as well. They offer relatively low cycle life, particularly in deep-discharge applications. Due to the weight of the lead components and other structural components needed to reinforce the plates, lead-acid batteries typically have limited energy density. If lead-acid batteries are stored for prolonged periods in a discharged condition, sulfation of the electrodes can occur, damaging the battery and impairing its performance. In addition, hydrogen can be evolved in some designs.

In contrast to lead-acid batteries, Ni-MH batteries use a metal hydride as the active negative material along with a conventional positive electrode such as nickel hydroxide. Ni-MH batteries feature relatively long cycle life, especially at a relatively low depth of discharge. The specific energy and energy density of Ni-MH batteries are higher than for lead-acid batteries. In addition, Ni-MH batteries are manufactured in small prismatic and cylindrical cells for a variety of applications and have been employed extensively in hybrid electric vehicles. Larger size Ni-MH cells have found limited use in electric vehicles.

The primary disadvantage of Ni-MH electrochemical cells is their high cost. Li-ion batteries share this disadvantage. In addition, improvements in energy density and specific energy of Li-ion designs have outpaced advances in Ni-MH designs in recent years. Thus, although nickel metal hydride batteries currently deliver substantially more power than designs of a decade ago, the progress of Li-ion batteries, in addition to their inherently higher operating voltage, has made them technically more competitive for many hybrid applications that would otherwise have employed Ni-MH batteries.

Li-ion batteries have captured a substantial share not only of the secondary consumer battery market but a major share of OEM hybrid battery, vehicle, and electric vehicle applications as well. Li-ion batteries provide high-energy density and high specific energy, as well as long cycle life. For example, Li-ion batteries can deliver greater than 1,000 cycles at 80% depth of discharge.

Li-ion batteries have certain advantages. They are available in a wide variety of shapes and sizes, and are much lighter than other secondary batteries that have a comparable energy capacity (both specific energy and energy density). In addition, they have higher open circuit voltage (typically ~3.5 V vs. 2 V for lead-acid cells). In contrast to Ni—Cd and, to a lesser extent, Ni-MH batteries, Li-ion batteries suffer no "memory effect," and have much lower rates of self discharge (approximately 5% per month) compared to Ni-MH batteries (up to 20% per month).

Li-ion batteries, however, have certain disadvantages as well. They are expensive. Rates of charge and discharge above 1 C at lower temperatures are challenging because lithium diffusion is slow and it does not allow for the ions to move fast enough. Further, Li-ion batteries use liquid electrolytes to allow for faster diffusion rates, which results in formation of dendritic deposits at the negative electrode, causing hard shorts and resulting in potentially dangerous conditions. Liquid electrolytes also form deposits (referred to as an SEI layer) at the electrolyte/electrode interface, that can inhibit electron transfer, indirectly causing the cell's rate capability and capacity to diminish over time. These problems can be exacerbated by high-charging levels and elevated temperatures. Li-ion cells may irreversibly lose capacity if operated in a float condition. Poor cooling and increased internal resistance cause temperatures to increase inside the cell, further degrading battery life. Most important, however, Li-ion batteries may suffer thermal runaway, if overheated, overcharged, or over-discharged. This can lead to cell rupture, exposing the active material to the atmosphere. In extreme cases, this can cause the battery to catch fire. Deep discharge may short-circuit the Li-ion cell, causing recharging to be unsafe.

To manage these risks, Li-ion batteries are typically manufactured with expensive and complex power and thermal management systems. In a typical Li-ion application for a hybrid vehicle, two-thirds of the volume of the battery module may be given over to collateral equipment for thermal management and power electronics and battery management, dramatically increasing the overall size and weight of the battery system, as well as its cost.

In addition to the differing advantages and disadvantages of lead-acid, Ni-MH and Li-ion batteries, the specific energy, energy density, specific power, and power density of these three electro-chemistries vary substantially. Typical values for systems used in HEV-type applications are provided in Table 1 below.

TABLE 1

| Electro-chemistry Type | Specific Energy (Whr/kg) | Energy Density (Whr/l) | Specific Power (W/kg) |
|---|---|---|---|
| Lead-Acid[1] | 30-50 Whr/kg | 60-75 Whr/l | 100-250 W/kg |
| Nickel Metal Hydride (Ni-MH)[2] | 65-100 Whr/kg | 150-250 Whr/l | 250-550 W/kg |
| Lithium-Ion (Li-ion)[3] | up to 131 Whr/kg | 250 Whr/l | up to 2,400 W/kg |

[1]http://en.wikipedia.org/wiki/Lead_acid_battery, accessed Jan. 11, 2012.
[2]Linden, David, ed., Handbook of Batteries, 3$^{rd}$ Ed. (2002).
[3]http://info.a123systems.com/data-sheet-20ah-prismatic-pouch-cell, accessed Jan. 11, 2012.

Although both Ni-MH and Li-ion battery chemistries have claimed a substantial role in hybrid and electrical vehicles, both chemistries are substantially more expensive than lead-acid batteries for vehicular propulsion assist. The present inventors believe that the embodiments of the present disclosure can substantially improve the capacity of lead-acid batteries to provide a viable, low-cost alternative to Ni-MH and Li-ion electro-chemistries in all types of hybrid and electrical vehicle applications.

In particular, certain applications have proved difficult for Ni-MH and Li-ion batteries, such as certain automotive and standby power applications. Standby power application requirements have gradually been raised. The standby batteries of today have to be truly maintenance free, have to be low-cost, have long cycle-life, have low self-discharge, be capable of operating at extreme temperatures, and, finally, should have high specific energy and high specific power. Emerging smart grid applications to improve energy efficiency require high power, long life, and lower cost for continued growth in the market place.

Automobile manufacturers have encountered substantial consumer resistance in launching fleets of electric vehicles and hybrid vehicles, due to the increased cost of these vehicles relative to conventional automobiles powered by an internal combustion engine ("ICE"). Environmental and energy independence concerns have exerted greater pressures on manufacturers to offer cost-effective alternatives to internal combustion engine-powered vehicles. Although hybrids and electric vehicles can meet that demand, they typically rely on subsidies to defray the higher cost of the energy storage systems.

Table 2 below compares the application of various battery electro-chemistries and the internal combustion engine (ICE) and their current roles in certain automotive applications. As used in Table 2, "SLI" means starting, lighting, ignition; "HEV" means hybrid electric vehicle; "PHEV" means plug-in hybrid electric vehicle; "EREV" means extended range electric vehicle; and "EV" means electric vehicle.

TABLE 2

|  | SLI | Start/Stop | Power Assist | Regeneration | Mild Hybrid | HEV | PHEV | EREV | EV |
|---|---|---|---|---|---|---|---|---|---|
| Pb-Acid | ✓ | | | | | | | | |
| Ni-MH | | | ✓ | ✓ | ✓ | ✓ | | | |
| Li-ion | | | ✓ | ✓ | ✓ | ✓ | ✓ | ✓ | ✓ |
| ICE | ✓ | ✓ | ✓ | ✓ | ✓ | ✓ | ✓ | ✓ | |

As shown in Table 2, there remains a need for specific applications in which partial electrification of the vehicle may provide environmental and energy efficiency advantages, without the same level of added costs associated with hybrid and electric vehicles using Ni-MH and Li-ion batteries. Even more specifically, there is a need for a low cost, energy efficient battery in the area of start/stop automotive applications.

Specific points in the duty cycle of an internal combustion engine entail far greater inefficiency than others. Internal combustion engines operate efficiently only over a relatively narrow range of crankshaft speeds. For example, when the vehicle is idling at a stop, fuel is being consumed with no useful work being done. Idle vehicle running time, stop/start events, power steering, air conditioning, or other power electronics component operation entail substantial inefficiencies in terms of fuel economy, as do rapid acceleration events. In addition, environmental pollution from a vehicle at these "start-stop" conditions is far worse than from a running vehicle that is moving. The partial electrification of the vehicle in relation to these more extreme operating conditions has been termed a "micro" or "mild" hybrid application, including start/stop electrification. Micro- and mild-hybrid technologies are unable to displace as much of the power delivered by the internal combustion engine as a full hybrid or electric vehicle. Nonetheless, they may be able to substantially increase fuel efficiency in a cost-effective manner without the substantial capital expenditure associated with full hybrid or full electric vehicle applications.

Conventional lead-acid batteries have not yet been able to fulfill this role. Conventional lead-acid batteries have been designed and optimized for the specific application of SLI operation. The needs of a mild hybrid application are different. A new process, design, and production process need to be developed and optimized for the mild hybrid application.

One need for a mild hybrid application is low-weight battery. Conventional lead-acid batteries are relatively heavy. This causes the battery to have a low specific energy due to the substantial weight of the lead components and other structural components that are necessary to provide rigidity to the plates. SLI lead-acid batteries typically have thinner plates, providing increased surface area needed to produce the power necessary to start the engine. But the grid thickness is limited to a minimum useful thickness because of the casting process and the mechanics of the grid hang. The minimum grid thickness is also determined on the positive electrode by corrosion processes. Positive plates are rarely less than 0.08" (main outside framing wires) and 0.05" on the face wires because of the difficulties of casting at production rates and, more importantly, concern over poor cycle-life issues. These parameters limit power. Lead-acid batteries designed for deeper discharge applications (such as motive power for forklifts) typically have heavier plates to enable them to withstand the deeper depth of discharge in these applications.

In addition, in typical lead-acid batteries, the active material is usually formed as a paste that is applied to the grid in order to form the plates as a composite material. Although the paste adheres well to itself, it does not adhere well to the grid materials because of paste shrinkage issues. This requires the use of grids that are more substantial and contain additional structural components to help support the active material, which, in turn, puts an extra weight burden on the cell.

Further, during the manufacture of conventional lead-acid batteries, the components are subjected to a number of mechanical stresses. Pasting active material onto the grid can stress the latticework of the grid. Expanded metal grids are lighter than cast grids, yet, the formation of the expanded grid itself introduces stress at each of the nodes of the expanded grid. These various structural materials, being subjected to substantial mechanical stresses during electrode pasting, handling, and cell operation, tend to corrode more readily in the acid-oxidizing environment of the battery after activation, especially when thin plates are used to increase power.

For example, cast and expanded metal grids have non-uniform stress during the life of the battery due to the molar volume change of converting the lead metal to $PbO_2$. This volume change of the corrosion product puts huge stress on the grids in a non-uniform manner because of the irregular cross-sectional shapes of the grid wires in cast and expanded metals.

Another need for a mild hybrid application is that rechargeable batteries should be able to be charged and discharged with less than 0.001% energy loss at each cycle. This is a function of the internal resistance of the design and the over-voltage necessary to overcome it. The reaction should be energy-efficient and should involve minimal physical changes to the battery that might limit cycle life. Side chemical reactions that may deteriorate the cell components, cause loss of life, create gaseous byproducts, or loss of energy should be minimal or absent. In addition, a rechargeable battery should desirably have high specific energy, low resistance, and good performance over a wide range of temperatures and be able to mitigate the structural stresses caused by lattice expansion. When the design is optimized for minimum resistance, the charge and discharge efficiency will dramatically improve.

Lead-acid batteries have many of these characteristics. The charge-discharge process is essentially highly reversible. The lead-acid system has been extensively studied and the secondary chemical reactions have been identified. And their detrimental effects have been mitigated using catalyst materials or engineering approaches. Although its energy density and specific energy are relatively low, the lead-acid battery performs reliably over a wide range of temperatures, with good performance and good cycle life. A primary advantage of lead-acid batteries remains their low-cost.

A typical lead-acid electrochemical cell uses lead dioxide as an active material in the positive plate and metallic lead as the active material in the negative plate. These active materials are formed in situ. Typically, a charged positive electrode contains $PbO_2$. The electrolyte is sulfuric acid solution, typically about 1.2 specific gravity or 37% acid by weight. The basic electrode process in the positive and negative electrodes in a typical cycle involves formation of $PbO_2$/Pb via a dissolution-precipitation mechanism, causing non-uniform stresses within the positive electrode structure. The first stage in the discharge-charge mechanism is a double-sulfate formation reaction. Sulfuric acid in the electrolyte is consumed by discharge, producing water as the product. Unlike many other electrochemical systems, in lead-acid batteries the electrolyte is itself an active material and can be capacity-limiting.

In conventional lead-acid batteries, the major starting material is highly purified lead. Lead is used for the production of lead oxides for conversion first into paste and ultimately into the lead dioxide positive active material and sponge lead negative active material. Pure lead is generally too soft to be used as a grid material because of processing issues, except in very thick plates or spiral-wound batteries. Lead is typically hardened by the addition of alloying elements. Some of these alloying elements are grain refiners and corrosion inhibitors but others may be detrimental to grid production or battery performance generally. One of the mitigating factors in the corrosion of lead/lead grids is the high hydrogen over-potential for hydrogen evolution on lead. Since most corrosion reactions are accompanied by hydrogen evolution as the cathode reaction, reduced hydrogen evolution may inhibit anodic corrosion as well.

The purpose of the grid is to form the support structure for the active materials and to collect and carry the current generated during discharge from the active material to the cell terminals. Mechanical support can also be provided by non-metallic elements such as polymers, ceramics, and other components. But these components are not electrically conductive. Thus, they add weight without contributing to the specific energy of the cell.

Lead oxide is converted into a dough-like material that can be fixed to grids forming the plates. The process by which the paste is integrated into the grid is called pasting. Pasting can be a form of "ribbon" extrusion. The paste is pressed by hand trowel, or by machine, into the grid interstices. The amount of paste applied is regulated by the spacing of the hopper above the grid or the type of troweling. As plates are pasted, water is forced out of the paste.

The typical curing process for SLI lead-acid plates is different for the positive and negative plates. Typically water is driven off the plate in a flash dryer until the amount of water remaining in the plate is between about 8 to 20% by weight. The positive plate is hydro-set at low temperature (<55 C+/−5 C) and high humidity for 24 to 72 hours. The negative plate is hydro-set at about the same temperature and humidity for 5 to 12 hours. The negative plate may be dried to the lower end of the 8 to 20% range and the positive plate to the upper end of the range. More recently, manufacturers use curing ovens where temperature and humidity are more precisely controlled. In the conventional process steps, the "hydro-set process" causes shrinkage of the "paste" active material that, in turn, causes it to break away from the grid in a non-uniform manner. The grid metal that is exposed is corroded preferentially and, since it is not in contact locally with the active material, results in increased resistance as well as formation, and life issues.

A simple cell consists of one positive and one negative plate, with one separator positioned between them. Most practical lead-acid electrochemical cells contain between 3 and 30 plates with separators between them. Leaf separators are typically used, although envelope separators may be used as well. The separator electrically insulates each plate from its nearest counter-electrode but must be porous enough to allow acid transport in or out of the plates.

A variety of different processes are used to seal battery cases and covers together. Enclosed cells are necessary to minimize safety hazards associated with the acidic electrolyte, potentially explosive gases produced on overcharge, and electric shock. Most SLI batteries are sealed with fusion of the case and cover, although some deep-cycling batteries are heat sealed. A wide variety of glues, clamps, and fasteners are also well-known in the art.

Typically, formation is initiated after the battery has been completely assembled. Formation activates the active materials. Batteries are then tested, packaged, and shipped.

A number of trade-offs must be considered in optimizing lead-acid batteries for various standby power and transportation uses. High-power density requires that the initial resistance of the battery be minimal. High-power and energy densities also require the plates and separators be highly porous. High cycle life, in contrast, requires optimized separators, shallow depth of discharge, and the presence of alloying elements in the substrate grids to reduce corrosion. Low-cost, in further contrast, requires both minimum fixed and variable costs, high-speed automated processing, and that no premium materials be used for the grid, paste, separator, or other cell and battery components.

A number of improvements have been made in the basic design of lead-acid electrochemical cells. Many of these have involved improvements in the characteristics of the substrate, the active material, as well as the bus bars or collector elements. For example, a variety of fibers or metals have been added to or embedded in the substrate material to help strengthen it. The active material has been strengthened with a variety of materials, including synthetic fibers and other additions. Particularly with respect to lead-acid batteries, these various approaches represent a trade-off between durability, capacity, and specific energy. The addition of various non-conductive strengthening elements helps strengthen the supporting grid but replaces conductive substrate and active material with non-conductive components.

In order to reduce the weight of the lead-acid electrochemical cells relative to their specific energy, various improvements have been disclosed. One approach has been to coat a light-weight, high-tensile strength fiber with sufficient lead to make a composite wire that could be used to support the grid of the electrode. Robertson, U.S. Pat. No. 275,859 discloses an apparatus for extrusion of lead onto a core material for use as a telegraph cable. Barnes, U.S. Pat. No. 3,808,040 discloses strengthening a conductive latticework to serve as a grid element by depositing strips of synthetic resin. Specifically, Barnes '040 patent discloses a lead-coated glass fiber. These approaches, however, have been unable to produce a material with sufficient properties of high-corrosion resistance and high-tensile strength to be able to fabricate a commercially viable lead-acid battery that can survive chemical attack from the electrolyte.

Blayner, et al., have disclosed further improvements in the composition of the substrate to reduce the weight of the electrodes and to increase the proportion of conductive material. Blayner, U.S. Pat. Nos. 5,010,637 and 4,658,623. Blayner discloses a method and apparatus for coating a fiber with an extruded, corrosion-resistant metal. Blayner discloses a variety of core materials that can include high-tensile strength fibrous material, such as an optical glass fiber, or highly-conductive metal wire. Similarly, Blayner discloses that the extruded, corrosion-resistant metal can be any of a number of metals such as lead, zinc, or nickel.

Blayner discloses that a corrosion-resistant metal is extruded through die. The core material is drawn through the die as the metal is extruded onto the core material. Continuous lengths of metal wire or fiber are coated with a uniform layer of extruded, corrosion-resistant metal. The wire is then used to weave a screen that acts as a substrate for the active material. There are no fusion points at the intersections of the woven wires. The electrode may be constructed using such a screen as a grid with the active material being applied onto the grid. Rechargeable lead-acid electrochemical cells are constructed using pairs of electrodes.

Blayner discloses further improvements regarding the grain structure of the metal coating on the core material. In particular, Blayner discloses that the extruded corrosion-resistant metal has a longitudinally-oriented grain structure and uniform grain size. U.S. Pat. Nos. 5,925,470 and 6,027,822.

Fang, et al., disclose in their paper, *Effect of Gap Size on Coating Extrusion of Pb-GF Composite Wire by Theoretical Calculation and Experimental Investigation*, J. Mater. Sci. Technol., Vol. 21, No. 5 (2005), optimizing the gap in extruding lead-coated glass fiber. Although Blayner does not disclose the relationship between gap size and extrusion of the lead coated composite wire, Fang characterizes gap size as a key parameter for the continuous coating extrusion process. Fang reports that a gap between 0.12 mm and 0.24 mm is necessary, with a gap of 0.18 mm being optimal. Fang further reports that continuous fiber composite wire can enhance load and improve energy utilization.

The present inventors have found that, despite improvements in lead-acid electrochemical cells for automotive applications, prior known lead-acid batteries have not been able to achieve the same performance as Li-ion or Ni-MH cells for similar applications. There remains a need, therefore, for further improvements in the design and composition of lead-acid electrochemical cells to meet the specialized needs of the automotive and standby power markets. Specifically, there remains a need for a reliable replacement for lithium-ion electrochemical cells in certain applications that do not entail the same safety concerns raised by Li-ion electrochemical cells. Similarly, there remains a need for a reliable replacement for Ni-MH and Li-ion electrochemical cells with the added benefits of low-cost and reliability of lead-acid electrochemical cells. In addition, there remains a need for substantial improvement in battery production capacity to meet the growing needs of the automotive and standby power segments.

The United States Department of Energy (USDOE) has issued Corporate Average Fuel Efficiency (CAFE) guidelines for automotive fleets. Previously, SUVs and light trucks were excluded from the CAFE averages for motor vehicles. More recently, however, integrated guidelines have emerged specifying fuel efficiency standards for passenger vehicles, light trucks, and SUVs. These guidelines require an average fuel efficiency of 31.4 miles per gallon by 2016. http://www.epa.gov/oms/climate/regulations/420r10009.pdf.

Anticipated improvements in internal combustion engine technology do not appear to be able to reach this goal. Similarly, the manufacturing capacity for pure hybrids and pure electric vehicles does not appear sufficient to be able to reach this goal. Thus, it is anticipated that some combination of micro-hybrids or mild hybrids, in which electrochemical cells provide some of the power for either stop/start or certain acceleration applications, will be necessary in order to meet the CAFE standards.

Lead-acid battery systems may provide a reliable replacement for Li-ion or Ni-MH batteries in these applications, without the substantial safety concerns associated with Li-ion electrochemistry and the increased cost associated with both Li-ion and Ni-MH batteries.

Further, the improved batteries of the present invention may be combined in hybrid systems with other types of electrochemical cells to provide electric power that is tailored to the unique automotive application. For example, a lead-acid battery of the present invention which features high-power can be combined with a Lithium-ion ("Li-ion") or Nickel metal hydride ("Ni-MH") electrochemical cell offering high energy, to provide a composite battery system tailored to the needs of the particular automotive standby or stationary power application, while reducing the relative sizes of each component.

SUMMARY

An aspect of the present disclosure includes an electrochemical cell having an electrode assembly, wherein the electrode assembly may include a plurality of electrode plates. Each electrode plate may include a current collector having a first portion and a second portion, and wherein each first and second portion may have a first surface and a second surface opposing the first surface. The first and second surfaces of the first portion may include a positively charged active material, and the first and second surfaces of the second portion may include a negatively charged active material. The plurality of electrode plates may include at least three electrode plates, such that the electrochemical cell may be arranged with a first portion of one plate of the at least three electrode plates electrochemically connected to a second portion of a second plate of the at least three electrode plates, and a first portion of the second plate of the at least three electrode plates electrochemically may be connected to a second portion of a third plate of the at least three electrode plates.

In various embodiments, the electrochemical cell may include the following features, either alone or in combination: each electrode plate may include a plurality of electrode connectors connecting the first portion to the second portion; each electrode plate may include shunt current mitigating means; the current collector may include a uniform current density; a first separator may be attached to the first surface of the first portion and a second separator may be attached to the first surface of the second portion; a plurality of electrode assemblies may be stacked in series for building voltage; an insulator may be connected to the top electrode plate, and the insulator may include at least one slit therein with an electrode plate extending there through; the electrochemical cell may be a lead-acid electrochemical cell; the electrode assembly may be connected to tabs; at least two electrode assemblies may be stacked in parallel for building capacity; there may be at least one power bus assembly including at least one bolt for building capacity; at least two of the electrode plates may be electrochemically connected at a ninety degree angle relative to one another; and the electrochemical cell may include a cross-sectional shaped selected from one of circular, rectangular, square, L-shaped, or U-shaped.

In some embodiments, an electrochemical storage device comprises a plurality of layer electrodes, wherein each layer electrode includes a first charged sector and a second charged sector, wherein the second charged sector is charged oppositely compared to the first charged sector, and wherein the plurality of layer electrodes are assembled with respect to each other such that the first charged sector of a first plate of the plurality of layer electrodes is laid below the second charged sector of a second plate of the plurality of layer electrodes located immediately above the first plate, wherein the charges of the first charged sectors of the first and second plates have a first sign and the charges of the second charged sectors of the first and second plates have a second sign that is opposite the first sign; a separator sector located, and enabling ionic charge exchange between the first charged sector of the first plate and the second charged sector of the second plate.

In some embodiments, the second charged sector of the first plate is laid below the first charged sector of the second plate, the electrochemical device further comprising an insulator sector located, and preventing ionic or conductive charge exchange, between the second charged sector of the first plate and the first charged sector of the second plate. In some embodiments, each of the plurality of the layer electrodes in circular.

In some embodiments, each sector has a semi-circle shape sized to about half of the corresponding layer electrode. In some embodiments, each plate of the plurality of layer electrodes further comprises a frame which houses the first charged sector and the second charged sector of the corresponding plate. In some embodiments, the electrochemical storage device further comprises a first cap and a second cap for encasing the plurality of layer electrodes. In some embodiments, the electrochemical storage device further comprises a conductive substrate for providing a conductive connection between the first charge sector and the second charged sector.

In some embodiments, each of the plurality of the layer electrodes has a rectangular shape. In some embodiments, each sector has a half-rectangle shape sized to about half of the corresponding layer electrode.

In some embodiments, an electrochemical storage device comprises a first electrochemical cell and a second electrochemical cell disposed in a common casing and each comprising an anode and a cathode, wherein the anode of the first electrochemical cell is disposed opposite the cathode of the second electrochemical cell; a separator disposed between the anode of the first electrochemical cell and the cathode of the second electrochemical cell, wherein he anode of the first electrochemical cell and the cathode of the second electrochemical cell are electrically insulated and in communication through an ionically conductive medium adsorbed in the separator; a common current collector disposed on the anode of the first electrochemical cell and the cathode of the second electrochemical cell, wherein the first and second electrochemical cells are electrically connected and insulated from ionic conduction and wherein the ionic separation of said first and second electrochemical cells mitigates shunt currents.

In some embodiments, the device further comprises said current collector providing substantially uniform current collection granting uniform current density. In some embodiments, the device further comprises a hydrophobic coating disposed on the portion of the common current collector between said anode and said cathode. In some embodiments, the device further comprises a physical barrier to ionically insulate said first and second electrochemical cells. In some embodiments, the device further comprises one positive and one negative terminal connection. In some embodiments, the device further comprises an insulation frame for disposing anodes and cathodes of two or more electrochemical cells in substantially the same plane.

In some embodiments, a spiral wound electrochemical storage device comprises a cylindrical cell pack including a cell stack, wherein the cell stack includes a cell strip rolled from a flat configuration to form the cylindrical cell stack; and a cylindrical case for housing the cylindrical cell pack. In some embodiments, the cell stack is a first cell stack of a plurality of cell stacks included in the cylindrical cell pack, and wherein the plurality of cell stacks are connected in series. In some embodiments, the cell stack includes a plurality of strips including a positive half electrode strip, a negative half electrode strip, and a separator half part strip, and wherein the plurality of half strips are laid over each other to form the cell stack. Some embodiments further comprise a center mandrel, wherein the cell stack is rolled around the center mandrel.

In some embodiments, a method of manufacturing a spiral wound electrochemical storage device comprises providing a flat cell strip; rolling the flat cell strip in the form of a cylindrical cell stack; connecting the cylindrical cell stack to a positive terminal and to a negative terminal; and inserting the cylindrical cell stack in a cylindrical case. In some embodiments, the flat cell strip is a first cell strip of a plurality of cell strips, and the method further comprises laying the plurality of cell strips flat to form a plurality of cell stacks; connecting the plurality of cell stacks in series; and rolling the plurality of cell stacks to form the cylindrical cell pack. In some embodiments, the cell stack includes a plurality of strips including a positive half electrode strip, a negative half electrode strip, and a separator half part strip, and the method comprises laying the plurality of half strips over each other to form the cell stack. Some embodiments comprise providing a center mandrel; and rolling the flat cell strip around the center mandrel to form the cylindrical cell stack.

In some embodiments, an electrochemical storage device comprises an electrochemical cell pack, wherein the electrochemical cell pack terminates in a tab; and a power bus formed from a sheet of metal, wherein the power bus electrically connects the tab to a device terminal, and wherein the power bus is attached to the tab by welding the sheet of metal to the tab. In some embodiments, the sheet of metal is attached to the tab by ultrasonic welding. In some embodiments, the sheet of metal is folded to form a top surface, a front surface, and a back surface, and wherein the top surface is electrically connected to the device terminal and the front surface is welded around the tab. In some embodiments, the tab is one tab of a plurality of tabs and wherein the power bus is attached to each of the plurality of tabs by welding the sheet of metal to the corresponding tab. In some embodiments, the power bus has a varying resistivity at different points to provide balanced total resistances between each of the plurality of tabs and the device terminal. In some embodiments, the power bus has a varying resistivity at different points by having a varying thickness at different points. In some embodiments, the power bus has a varying resistivity at different points by forming holes at some locations of the power bus.

In some embodiments, a method of manufacturing electrochemical storage device comprises providing an electrochemical cell pack, wherein the electrochemical cell pack terminates in a tab; providing a power bus section which includes a flat sheet of metal; folding and welding the flat sheet of metal to the tab; and electrically connecting the power bus to a device terminal. In some embodiments, welding the flat sheet of metal to the tab includes ultrasonic welding of the sheet of metal to the tab. In some embodiments, folding the flat sheet of metal includes forming a top surface, a front surface, and a back surface, wherein the top surface is electrically connected to the device terminal and the front surface is welded around the tab. In some embodiments, the tab is one tab of a plurality of tabs, wherein the power bus is attached to each of the plurality of tabs by welding the sheet of metal to the corresponding tab. Some embodiments further comprise providing balanced total resistances between each of the plurality of tabs and the device terminal by varying resistivity of the power bus at different points. In some embodiments, varying the resistivity of the power bus at different points includes varying thickness of the power bus at different points. In some embodiments, varying the resistivity of the power bus at different points includes forming holes at some locations of the power bus.

In some embodiments, an electrochemical storage device comprises a plurality of layer electrodes, wherein each layer electrode includes a first charged sector and a second charged sector, wherein the second charged sector is charged oppositely compared to the first charged sector, and wherein the plurality of layer electrodes are assembled with respect to each other such that the first charged sector of a first plate of the plurality of layer electrodes is laid below the second charged sector of a second plate of the plurality of layer electrodes located immediately above the first plate, wherein the charges of the first charged sectors of the first and second plates have a first sign and the charges of the second charged sectors of the first and second plates have a second sign that is opposite the first sign; a separator sector located, and enabling ionic charge exchange between the first charged sector of the first plate and the second charged sector of the second plate.

In some embodiments, the second charged sector of the first plate is laid below the first charged sector of the second plate, the electrochemical device further comprising an insulator sector located, and preventing ionic or conductive charge exchange, between the second charged sector of the first plate and the first charged sector of the second plate. In some embodiments, each of the plurality of the layer electrodes in circular. In some embodiments, each sector has a semi-circle shape sized to about half of the corresponding layer electrode. In some embodiments, each plate of the plurality of layer electrodes further comprises a frame which houses the first charged sector and the second charged sector of the corresponding plate.

Some embodiments further comprise a first cap and a second cap for encasing the plurality of layer electrodes. Some embodiments further comprise a conductive substrate for providing a conductive connection between the first charge sector and the second charged sector. In some embodiments, each of the plurality of the layer electrodes has a rectangular shape. In some embodiments, each sector has a half-rectangle shape sized to about half of the corresponding layer electrode.

In some embodiments, an electrochemical storage device comprises a first electrochemical cell and a second electrochemical cell disposed in a common casing and each comprising an anode and a cathode, wherein the anode of the first electrochemical cell is disposed opposite the cathode of the second electrochemical cell; a separator disposed between the anode of the first electrochemical cell and the cathode of the second electrochemical cell, wherein he anode of the first electrochemical cell and the cathode of the second electrochemical cell are electrically insulated and in communication through an ionically conductive medium adsorbed in the separator; a common current collector disposed on the anode of the first electrochemical cell and the cathode of the second electrochemical cell, wherein the first and second electrochemical cells are electrically connected and insulated from ionic conduction and wherein the ionic separation of said first and second electrochemical cells mitigates shunt currents.

In some embodiments, the current collector provides substantially uniform current collection granting uniform current density. Some embodiments further comprise a hydrophobic coating disposed on the portion of the common current collector between the anode and the cathode. Some embodiments further comprise a physical barrier configured to ionically insulate the first and second electrochemical cells. Some embodiments further comprise one positive and one negative terminal connection. Some embodiments further comprise an insulation frame for disposing anodes and cathodes of two or more electrochemical cells in substantially the same plane. In some embodiments, the conductive substrate is made of amorphous material. In some embodiments, the conductive substrate is a wire mesh that includes elongated straight wires extending in a direction pointing from the first sector to the second sector. In some embodiments, each of rectangular plurality of the layer electrodes has a width in a direction that points from the first sector to the second sector and a length that is perpendicular to, and larger than, the width. Some embodiments further comprise an internal section, a base and an insert, wherein the internal section includes the plurality of layer electrodes and the separator, and wherein the base is configured to form an external surface of the electrochemical device, and wherein the insert is configured for insertion between the base and the internal section and is further configured to add to a rigidity of the base.

Additional objects and advantages of the disclosure will be set forth in part in the description which follows, and in part will be apparent from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiments of the disclosure and together with the description, serve to explain the principles of the disclosure.

BRIEF DESCRIPTION OF THE DRAWINGS

FIGS. 3A and 3B are side views of the electrode assembly of FIG. 2A.

FIG. 4A is a schematic top view of an electrode plate of the electrode assembly of FIG. 2A.

FIG. 4B is an exploded isometric view of the electrode plate of FIG. 4A with accompanying separator and pasting papers.

FIGS. 26A-26H show a battery having a rectangular form factor in accordance with some embodiments.

FIGS. 27A and 27B show a rectangular battery having a 192V voltage configuration according to one embodiment.

FIGS. 28A-28D show a battery having a circular sector electrode design according to some embodiments.

DETAILED DESCRIPTION

Figure 1:
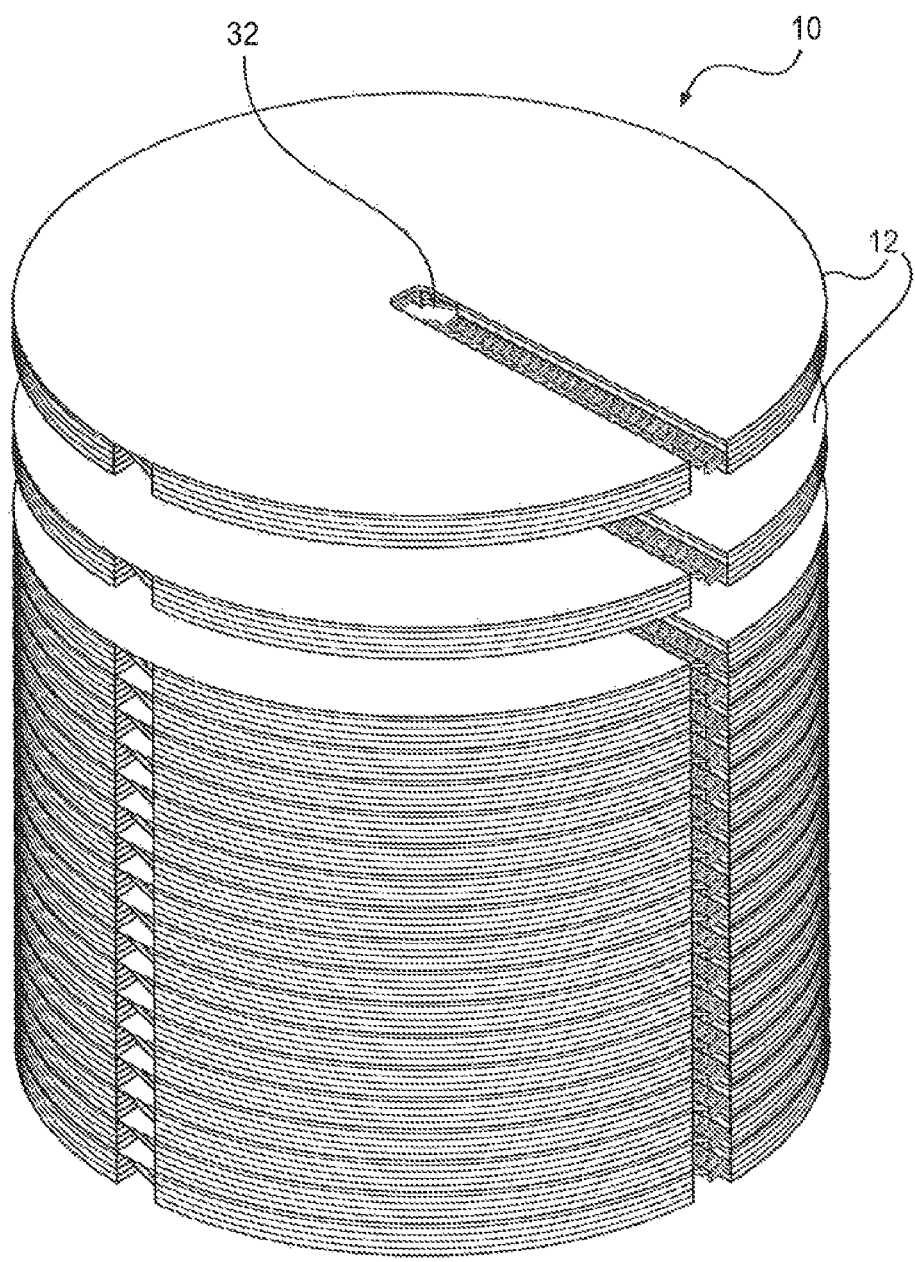
FIG. 1 is a schematic isometric view of a portion of a lead-acid electrochemical cell showing a plurality of electrode assemblies connected in a spiral configuration according to an embodiment of the present disclosure.

The following detailed description refers to the accompanying drawings. Wherever possible, the same reference numbers may be used in the drawings and the following description to refer to the same or similar parts. Also, similarly-named elements may perform similar functions and may be similarly designed. Numerous details are set forth to provide an understanding of the embodiments described herein. In some cases, the embodiments may be practiced without these details. In other instances, well-known techniques and/or components may not be described in detail to avoid obscuring described embodiments. While several exemplary embodiments and features are described herein, modifications, adaptations, and other implementations are possible, without departing from the spirit and scope of the invention. Accordingly, the following detailed description does not limit the invention. Instead, the proper scope of the invention is defined by the appended claims.

Embodiments of the present disclosure generally relate to a design of a lead-acid electrochemical cell. Lead-acid electrochemical cells typically are in the form of stacked plates with separators between the plates. Accordingly, embodiments of the present disclosure relate to improved stacking of electrode plates in a variety of form factors. The improved stacking and variety of form factors of the lead-acid electrochemical cell design may enable lead-acid electrochemical cells to be used as part of lead-acid batteries, which, in turn, may be used in automobiles to aid in increasing fuel efficiency.

More specifically, embodiments of the present disclosure may include improvements to the design of a lead-acid electrochemical cell which may include improvements to the orientation of electrode plates as well as improvements for mitigating shunt currents. The improvements may result in a lead-acid electrochemical cell that may have a higher voltage while maintaining a lower weight and size. Alternatively, it also enables production of cells having higher capacity at the same relative voltage.

Embodiments of the present disclosure may allow for the use of lead-acid batteries in micro and mild-hybrid applications of vehicles, either alone or in combination with Ni-MH or Li-ion batteries. Some embodiments use other electrochemical batteries having a specific energy above 50 Wh/kg and a specific power above 500 W/kg. It should be emphasized, however, that embodiments of the present disclosure are not limited to transportation and automotive applications. Embodiments of the present disclosure may be of use in any area known to those skilled in the art where use of lead-acid batteries is desired, such as stationary power uses and energy storage systems for back-up power situations. Further, the present inventors intend that the elements or components of the various embodiments disclosed herein may be used together with other elements or components of other embodiments.

FIG. 1 depicts a lead-acid electrochemical cell 10 according to a first embodiment of the present disclosure. The lead-acid electrochemical cell 10 may include a plurality of electrode assemblies 12. Each electrode assembly 12 may include a plurality of electrode plates positioned in electrochemical contact with each other. The electrode assemblies 12 may be connected in a spiral configuration to build voltage within the lead-acid electrochemical cell. In particular, the spiral configuration may enable a lead-acid electrochemical cell to build voltage while maintaining constant capacity. The number of electrode assemblies that make up the spiral configuration, as well as the configuration of each electrode assembly, may vary depending on the desired shape and desired voltage of the lead-acid electrochemical cell.

In addition, as shown in FIG. 1, the spiral configuration may have an opening 32 formed in the center of the stacked electrode assemblies, by virtue of the shapes of electrode assemblies 12. The central opening 32 may extend through the entire spiral configuration, forming a central bore allows for the main positive and negative leads to run through each electrode assembly 12 and be connected to the top of the spiral configuration.

Figure 2A:
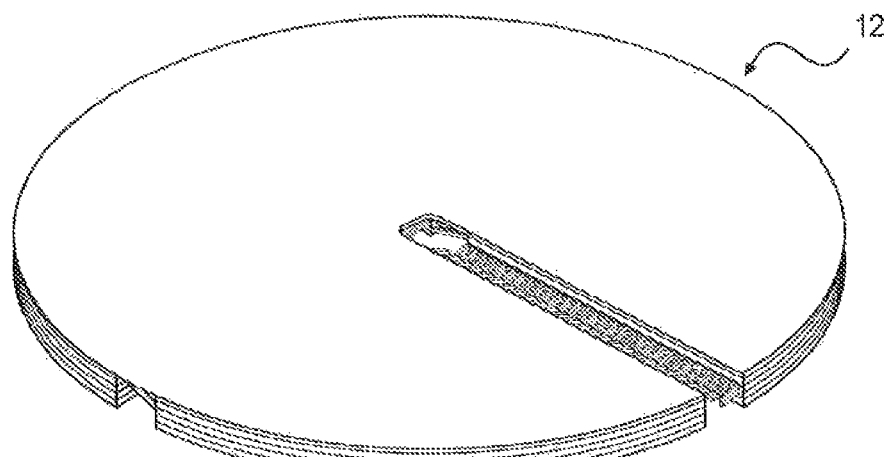
FIG. 2A is a schematic isometric view of a portion of an electrode assembly according to an embodiment of the present disclosure.
Figure 2B:
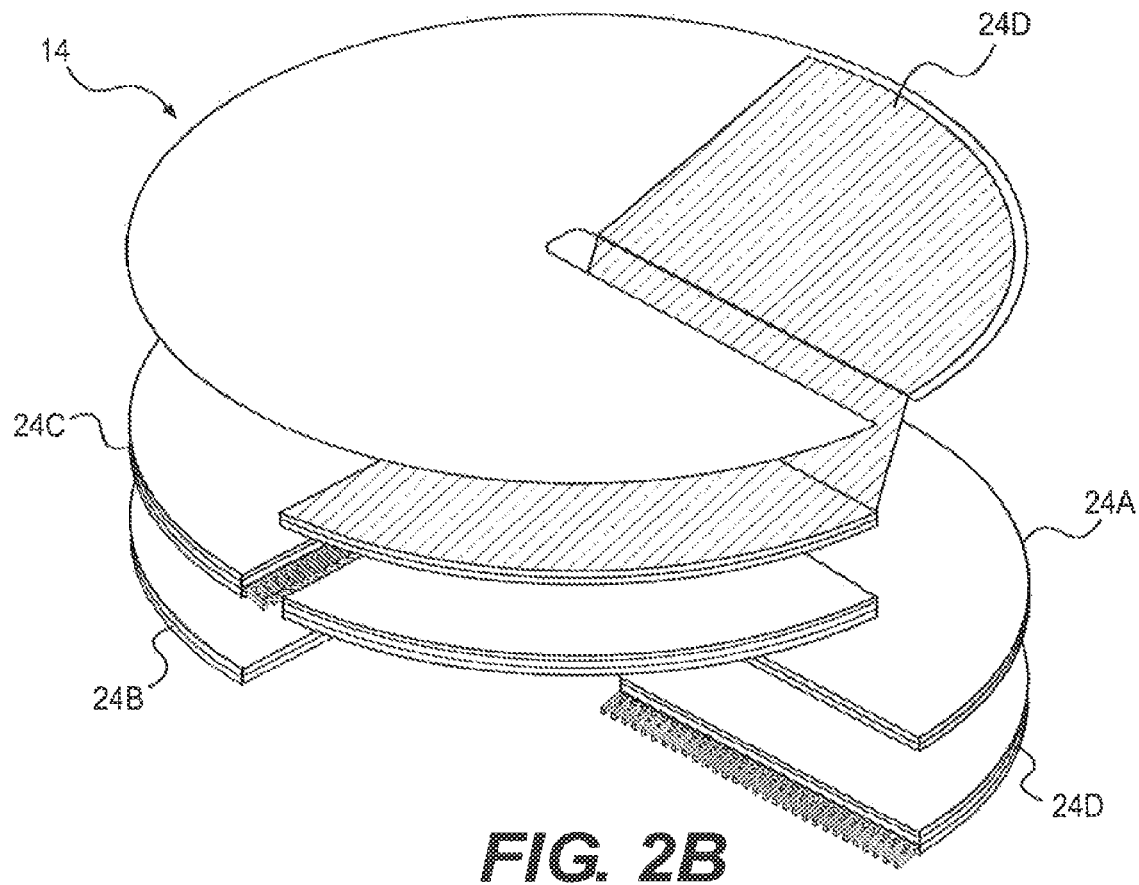
FIG. 2B is an exploded isometric view of a portion of the electrode assembly of FIG. 2A.

Each electrode assembly 12 in the lead-acid electrochemical cell may be separated by an insulator 14 (FIG. 2B). The insulator may be the cross-sectional shape of the electrode assembly and may include a radial slit 15. For example, in the embodiment of FIG. 1, the cross-sectional shape of each electrode assembly 12 may be semi-circular. Accordingly, the insulator 14 may include a circular shape and a slit 15 along a radius. As shown in FIG. 2B, the insulator 14 may further include a bottom surface and a top surface. Further, each electrode assembly 12 may include multiple electrode plates 24 with a top plate 24D in contact with both the top and bottom surfaces of insulator 14. For example, as shown in FIG. 2B, the top plate 24D of one electrode assembly may include a first portion in contact with the bottom surface of the insulator, and a second portion in contact with the top surface of the insulator. The spiral configuration of the lead-acid electrochemical cell may be achieved by connecting the second portion of the top electrode plate 24D in one electrode assembly 12 to the first portion of a bottom electrode plate 24A in another electrode assembly 12.

FIG. 2A and FIG. 2B of the present disclosure depict schematic views of an electrode assembly 12 of the lead-acid electrochemical cell of FIG. 1. As shown in FIG. 2B, the electrode assembly may include four electrode plates 24A-D. Each electrode plate may be in the shape of half of a semi-circular section, as shown in FIG. 4A and FIG. 4B.

As shown in FIG. 4A, each electrode plate 24 may include a first portion 28 and a second portion 30. The first and second portions 28 and 30 may be connected by a plurality of electrode connectors 26. Each portion may include a substrate, which may be a current collector (not shown). As described above, the electrode substrate may be of the type disclosed in U.S. application Ser. No. 13/350,505 for Improved Substrate for Electrode of Electrochemical Cell, filed concurrently herewith by Subhash Dhar, et al., the entire disclosure of which is incorporated herein by reference.

Thus, the substrate may include a grid-like structure formed of conductive material, with spaces there between for supporting active material. Accordingly, the substrate may include a sheet of material having aligned dimple-like spaces or a plurality of through-holes in linear patterns. Alternatively, the substrate may include a plurality of pieces of material, such as wires, woven together to form a mesh. In a further embodiment, the substrate may include an expanded sheet of material with holes there through. The substrate may include material that may result in an increased adhesion between the substrate and the active material, as well as increased surface conductivity and reduced corrosion of the electrode plate.

As shown in FIGS. 4A and 4B, the positive and negative portions of each electrode plate are depicted as 90° sections. It will be apparent to persons of ordinary skill in the art that sections of various alternative geometries may be employed, without departing from the scope or spirit of the invention as claimed. For example, sections could be 30°, or 45°, 60°, or any other appropriate geometry. If 90° sections are employed, four pairs of positive and negative electrodes may comprise each layer; if 60° sections are employed, 6 pairs; if 45° sections are used, 8 pairs; if 30° sections are used, 12 pairs; and so forth. Persons of ordinary skill will appreciate that, as the number of sections per layer increases, the area of the active material in each section decreases, proportionately, at a constant radius. This decrease can be offset by increasing the radius of the electrode to provide more active material surface area as the number of sections increases.

Figure 5:
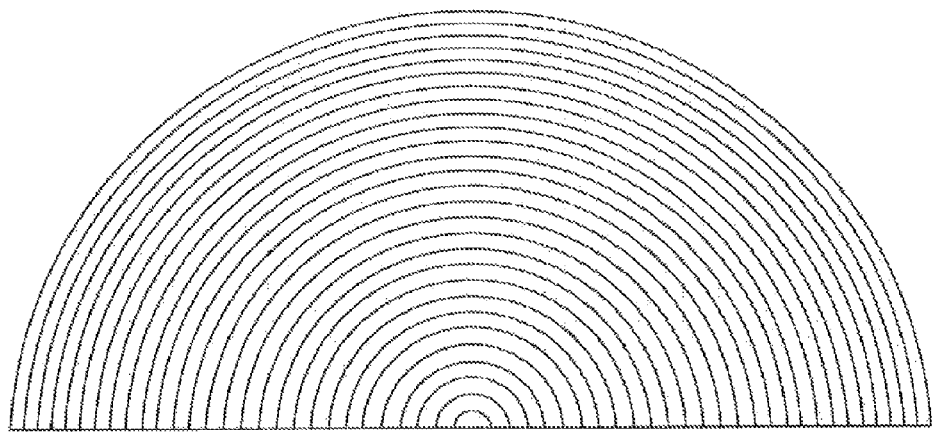
FIG. 5 is a schematic top view of an alternative embodiment of an electrode plate of the electrode assembly of FIG. 2A depicting the current collector.

The substrate may further be formed such that a relatively constant current density may be maintained throughout each electrode plate. For example, in the first embodiment of the electrode plate of FIG. 4A, the electrode plate 24 may include a substantially semi-circular shape. Accordingly, the substrate of the electrode plate 24 may include a substantially semi-circular shape as well. Constant current density throughout the substrate may be achieved by spacing the current collector elements of the substrate closer together in the radial direction at the outer radius of the electrode plate than at the inner diameters, and farther apart at the inner radial extent of the plate, as shown in FIG. 5.

The active material may be placed onto each portion of the substrate such that a pseudo bi-polar electrode plate may be formed. The pseudo bi-polar design may be accomplished by disposing both positive and negative active materials in alternating fields on a common substrate. In one embodiment shown in FIG. 4A, for example, the pseudo bi-polar design may include placing positive active material onto the first portion 28 of the substrate; and placing negative active material onto the second portion 30 of the substrate. This pseudo bi-polar design may offer lower resistance and higher power of the lead-acid electrochemical cell. Further, it may enable the lead-acid electrochemical cell to operate at a lower temperature, which may reduce the need for collateral cooling equipment. As shown in FIG. 4A and FIG. 4B, the first portion 28 of each electrode plate 24 may be positive 16, and the second portion 30 of each electrode plate 24 may be negative 20, with the electrode connectors 26 between the negative and positive regions of the electrode plate.

Each positive portion 16 and negative portion 20 of each electrode plate may further include a top surface and a bottom surface. As shown in FIG. 4B, a thin layer of pasting paper 22 may be disposed on the top and bottom surfaces of each portion of the electrode plate. Additionally, a separator 18 may be disposed adjacent the pasting paper on the bottom surface of each portion.

As previously disclosed, each electrode assembly 12 may include four electrode plates 24A-D as shown in FIGS. 2A and 2B. The electrode assembly 12 may be formed by stacking each plate 24 at a ninety degree angle relative to one another such that a positive portion 16 of one plate may be connected to a negative portion 20 of another plate. In one embodiment, for example, a first electrode plate 24A having a positive portion 16 and a negative portion 20 may be the bottom plate of the electrode assembly. A second electrode plate 24B having a positive portion 16 and a negative portion 20 may then be stacked onto the first electrode plate 24A. This may be accomplished by turning the second electrode plate 24B ninety degrees relative to the first electrode plate and placing the positive portion 16 of the second plate 24B on top of the negative portion 20 of the first plate 24A (FIG. 2B). A third electrode plate 24C having a positive portion 16 and a negative portion 20 may be stacked upon the second plate 24B in the same manner as previously discussed; and a fourth electrode plate 24D may then be stacked upon the third electrode plate 24C. The fourth electrode plate 24D may be the top electrode plate of the electrode assembly 12 (FIG. 2B).

Upon placement of the fourth electrode plate 24D, insulator 14 may be placed on the electrode assembly. As previously discussed, and shown in FIG. 2B, the positive portion 16 of the fourth, i.e., top electrode plate 24D may be connected to the negative portion 20 of the third electrode plate 24C. The insulator 14, including the slit 15, may be placed on the electrode assembly such that the top of positive portion 16 of the fourth plate 24D may be in contact with the bottom surface of the insulator 14, and the bottom of the negative portion 20 of the fourth plate 24D may be in contact with the top surface of the insulator 14. Accordingly, the negative portion 20 of the fourth plate 24D may be stacked with a free, positive portion 16 of a first plate 24A of another electrode assembly 12, which may thereby form the spiral configuration of the lead-acid electrochemical cell shown in FIG. 1.

Alternatively, the electrode assembly may be formed such that the free portion of the fourth plate 24D is a positive portion and the free portion of the first plate 24A is a negative portion. In addition, the free portion of the fourth plate 24D of the top electrode assembly in the spiral configuration may be connected to a single portion plate in order to complete the circuit. In an alternative embodiment, the top plate 24D of the top electrode assembly may only be a single portion plate, thereby completing the circuit with the connection to the third plate 24D.

In some embodiments the electrode assembly is formed by solid-state plates, wherein the positive and the negative portion of the plates include thin-film active material produced through solid state deposition processes. Processes suitable to form active materials include but are not limited to physical vapor deposition, chemical vapor deposition, spray deposition, dip coating, spin coating, electroless deposition, electroplating and any combination of suitable processes to form thin-film coatings. Suitable forms of the film materials include materials formed in a high vacuum process, under an inert gas environment and in room atmosphere and pressures.

In some embodiments, the separator material is a thin film membrane that allows for ionic diffusion and transfer of hydrogen, oxygen and sulfate ions, e.g. H+, OH—, SO4- at rates that are comparable to liquid electrolyte diffusion. In some embodiments, the separator membrane is a polymeric membrane e.g. Nafion material.

In some embodiments the substrate material of the plates is a suitable thin film electrically conductive medium in a form of a foil or a solid film, In some embodiments, the thin film is a woven material selected from the group including metals, e.g. lead, conductive polymers, e.g. aniline based polymer, conductive ceramics, e.g. ebonex or conductive tin or titanium oxides. In various embodiments, the substrate material has a polished surface with a suitable attachment layer or a patterned surface to promote adhesion of the active material including holes, ridges, dimples interlocking features and stress mitigating features.

In various embodiments, the suitable electrolyte is fully solid or in the form of a gel or a liquid and dispersed with the positive and active materials in stoichiometric quantities or impregnated in the separator membrane or other parts of the electrode assembly acting as electrolyte reservoirs;

Alternatively, in some embodiments, the positive and negative electrode assembly constitutes a fuel cell relying on separation principles of a ionically conductive membrane. In some embodiments, a suitable fuel fluid is a gas, e.g. hydrogen or other suitable fuel.

The pseudo bi-polar design of each electrode plate may allow for the spiral configuration to build voltage in the lead-acid electrochemical cell to any desired value (e.g., 24V, 36V, 42V, or 48V) at a constant capacity, while maintaining a low weight of the lead-acid electrochemical cell. The low weight may be due to the sizes of the components of the electrode assembly, as well as the material-make up of each electrode plate. In addition, the stacking of the electrode plates at a ninety degree angle relative to one another may allow for thinner components. For example, in one embodiment, the electrode assembly 12 may include a diameter of about 8 inches and may be about 0.3 inches thick. More specifically, the positive portion 16 of the electrode may be about 0.082 inches thick; the negative portion 20 of the electrode may be about 0.06 inches thick; the separators 18 may be about 0.06 inches thick; and the pasting paper 22 may be about 0.004 inches thick.

Persons of ordinary skill in the art will understand that stacking of the electrode plates may be accomplished in any of a variety of ways. For example, the plates can be stacked so that the plates build, one upon the other, in a step-wise manner with each positive 16 and negative 20 portion and their accompanying connections 26, lying in the same plane, as shown in FIG. 2. Alternatively, connectors 26 may be angled so that they are offset by the thickness of a plate, pasting papers and separator, to facilitate the rise in the plates as they are stacked. As a further alternative, the electrode plates can be formed having a helical geometric shape, to facilitate stacking the plates in a helical pattern, mitigating step discontinuities and reducing stresses on the connector 26.

The lead-acid electrochemical cell may further include means for mitigating shunt currents due to leakage of electrolyte fluid from the electrodes and separators onto the electrode connectors, which may cause the electrodes to self-discharge. In one embodiment, the electrode connectors 26 and inner portion of a container proximate the electrode plates may be treated with a hydrophobic coating, which may prevent excess electrolyte fluid from wetting the electrodes, or electrode connectors 26, or casing. In other alternative embodiments, the electrode connectors 26 may be blocked from leaking electrolyte fluid due to barriers formed on the edges of the positive and negative portions 16, 20 of each electrode plate. The barrier may be a coating or other material, including frame material or even excess active material that may frame each positive and negative portion and contain the electrolyte. Alternatively, in a further embodiment, the insulator may have a diameter that is larger than the diameter of both the electrode assembly the container in which the spiral configuration resides, such that the insulator may form a barrier with the container wall and soak up leaking electrolyte fluid.

Figure 6:
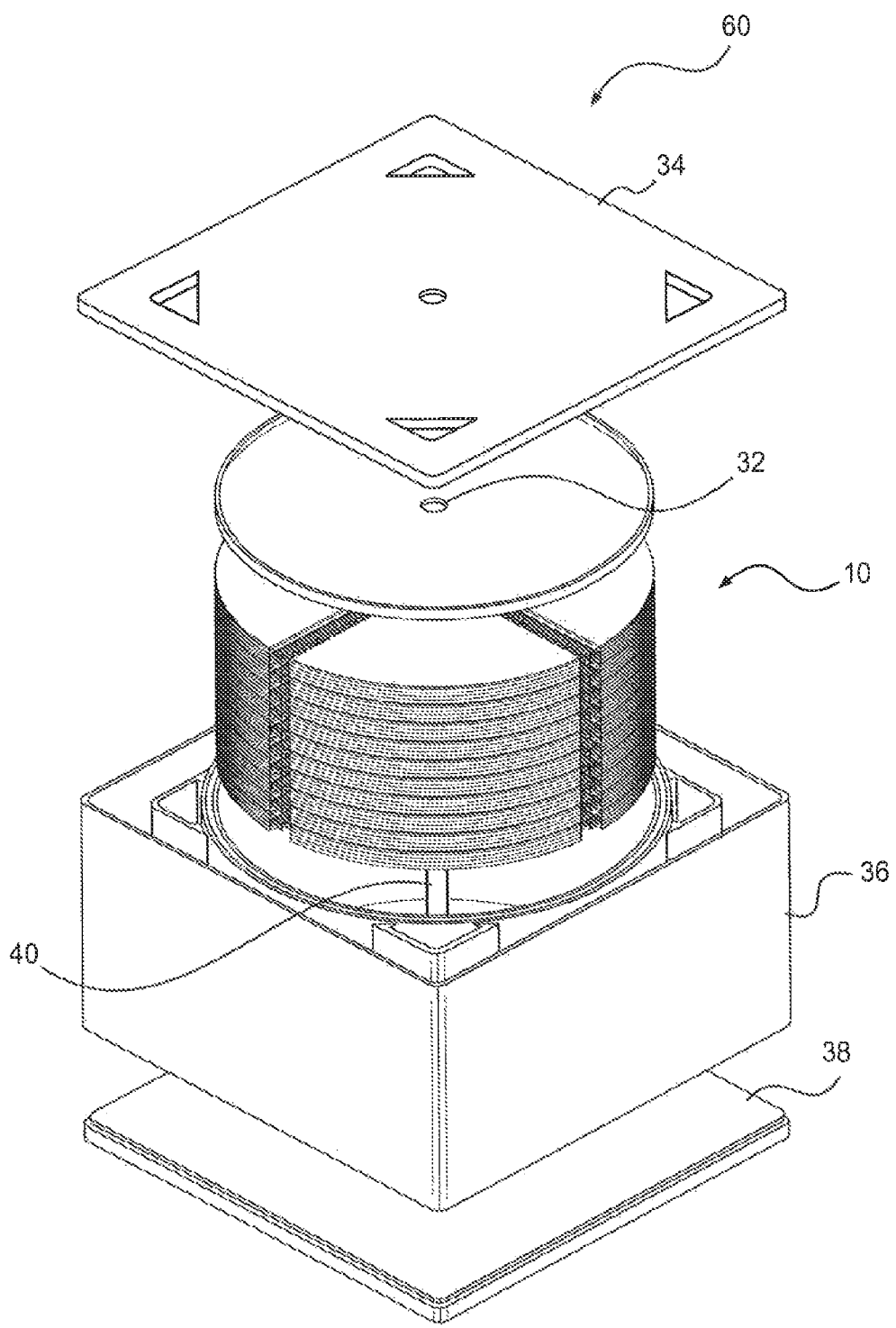
FIG. 6 is an exploded isometric view of a lead-acid electrochemical cell module and package according to an embodiment of the present disclosure.

FIG. 6 depicts a lead-acid electrochemical module 60 according to an embodiment. The module 60 may include a top portion 34, a bottom portion 38, and a casing 36. Top and bottom portions 34, 38 may enclose the lead-acid electrochemical cell 10 within the casing 36. Casing may include an inner opening 40, which may be substantially the same diameter and height of the lead-acid electrochemical cell 10, such that the lead-acid electrochemical cell may be fully disposed within the casing 36 and covered by the top and bottom portions 34, 38. The module 60 may further include positive and negative terminals (not shown in FIG. 5) attached to the lead-acid electrochemical cell, such that the module may be used to provide energy and power.

As previously disclosed, the spiral configuration may connect electrode assemblies 12 in order to build voltage while maintaining a constant capacity of the lead-acid electrochemical cell. In a second, alternative embodiment, the electrode assemblies 12 may be stacked such that the voltage of the lead-acid electrochemical cell remains constant while building capacity. Accordingly, in this second embodiment, instead of the top plate 24D of one electrode assembly 12 being connected to the bottom plate 24a of another electrode assembly 12, the top and bottom plates of a single electrode assembly may be connected to complete the circuit. Each electrode assembly 12 may be connected to a tab 50, which may further be connected to a power bus assembly 500 for capacity building.

Figure 14A:
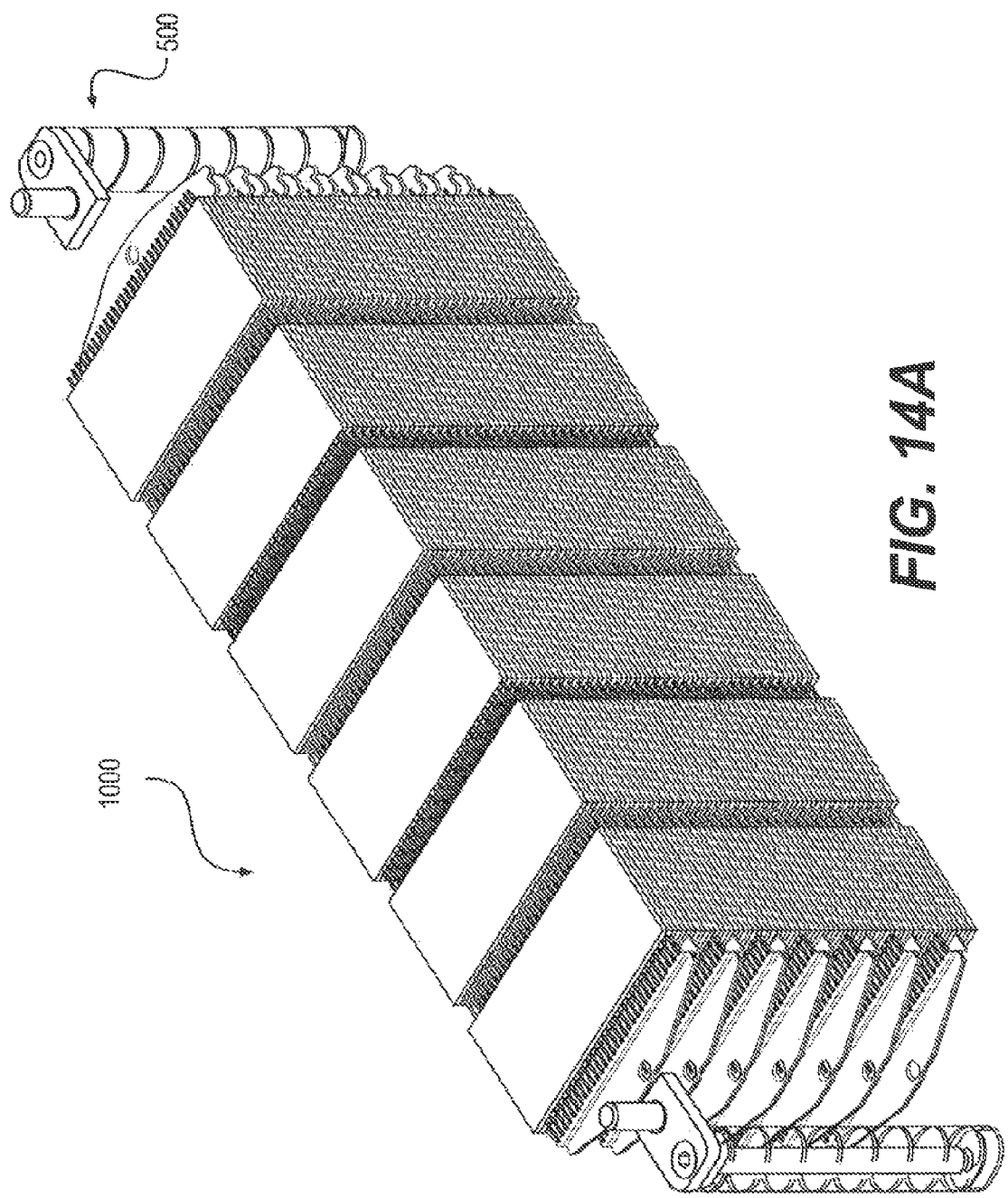
FIG. 14A is a schematic isometric view of the lead-acid electrochemical cell of FIG. 13 connected to a power bus.
Figure 14B:
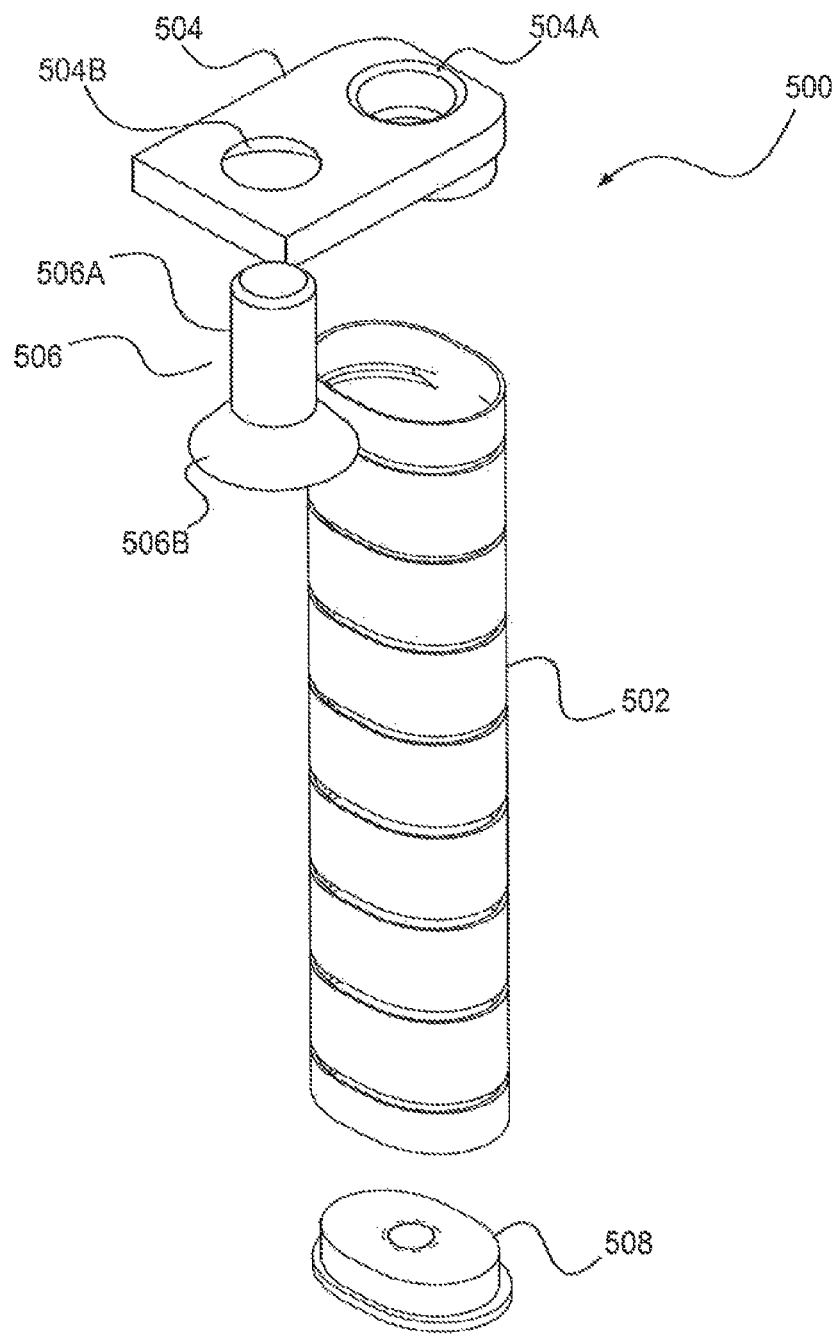
FIG. 14B is an exploded isometric view of the power bus of FIG. 14A.

FIG. 14B illustrates the components of one embodiment of the power bus assembly 500. Power bus assembly 500 may include a power bus 502, a terminal 506, a connector piece 504, and a nut 508. In addition, as shown in FIG. 14B, a bolt 510 may be connected to the connector piece 504, extend through the power bus 502, and attach to the nut 508. Bolt 510, when connected to the connector portion 502 and nut 508, may complete the connection of the bus system 500, which may thereby building capacity.

As shown in FIG. 14B, connector 504 may include a first through-hole 504a and a second through-hole 504b formed therein. First through-hole 504a may connect to the bolt 510, and second through-hole 504b allow top portion of terminal 506a to extend there through. Terminal 506 may additionally include a bottom portion 506b, that may sit atop a top surface of the lead-acid electrochemical cell 1000. Top portion of terminal 506b may be an elongate member having a cross section that is substantially the same shape as the second opening 504b. The bottom portion of terminal may be flat. Alternatively, as shown if FIG. 14A, the bottom portion of terminal 506b may have a concave inner surface.

Power bus 502 may include an elongate member having a length that is substantially the same as the height of the lead-acid electrochemical cell. Power bus 502 may further have slits disposed along its length, the slits being configured to receive connections from electrode plates, where the connections are solidified by compressing the power bus 502 in compression. Further, as shown in FIG. 14B, a top surface of the power bus 502 may be in contact with a bottom surface of the connector piece 504, such that the connector piece 504 may carry current from the power bus 502 to the terminal 506. Consequently, power bus 502 may be made of any material known to those skilled in the art that allows for the carrying of current and the building of capacity.

Some embodiments utilize an ultrasonically welded power bus. FIGS. 15A-15D show electro-chemical cells 1500 including welded power buses 1510 according to some embodiments. Cell 1500 further includes a plurality of cell packs 1522, which terminate in a plurality of tabs 1524. In some embodiments, electro-chemical cell 1500 is a battery or a battery module.

Figure 15A:
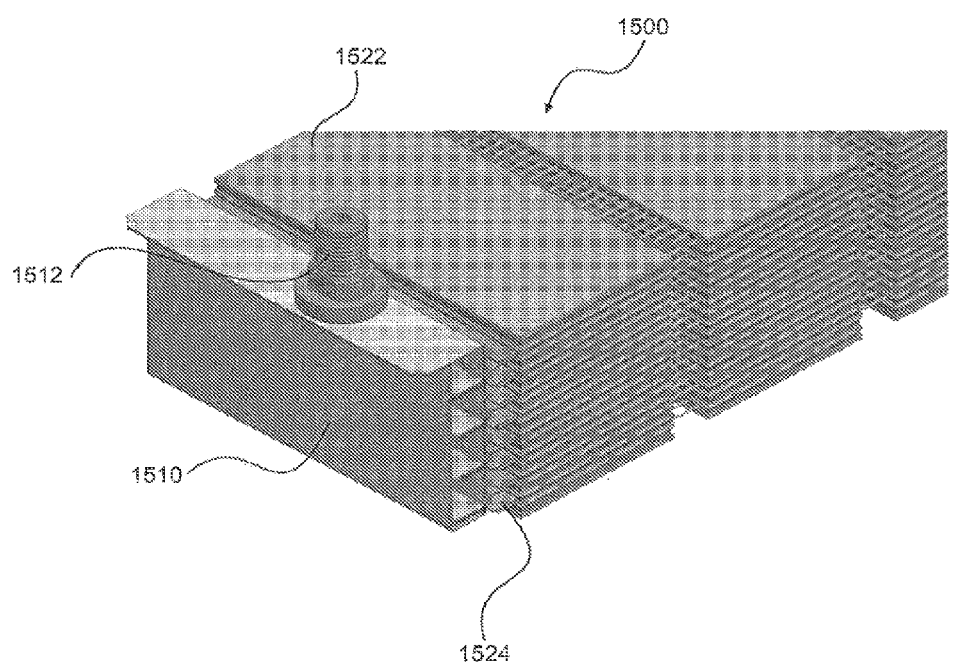
FIGS. 15A-15D show electro-chemical cells including welded power buses according to some embodiments.
Figure 15B:
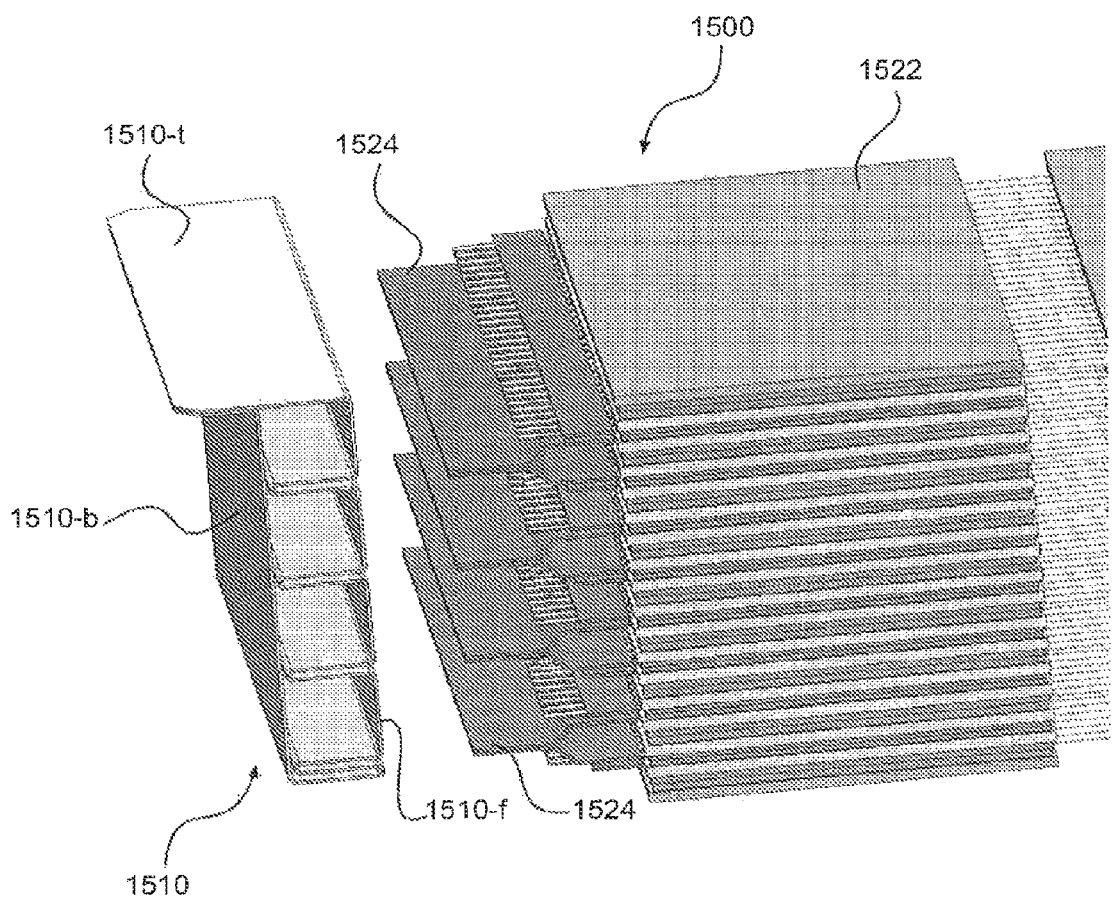

In some embodiments, the power busses are welded to the cell's end tabs. In some embodiments, the welding is an ultrasonic welding. FIG. 15A is an assembled view of one end of cell 1500 showing one power bus 1510 welded to tabs 1524. FIG. 15B is an exploded view of one end of cell 1500 showing one power bus 1510 separate from tabs 1524, which are welded together when assembled. In various embodiments, ultrasonic welding of the power bus to the tabs, as compared to other types of joining, reduces the creation of oxidized metals. Reduced oxidation, in turn, reduces vulnerability of the power bus to corrosion.

In various embodiments, power bus 1510 includes a folded sheet of metal. In various embodiments, power bus 1510 is made from a sheet of lead, or a sheet of copper. In some embodiments, the power bus transfers current from the end-cell 'tabs' to the battery terminal. In some embodiments, such as the 'ribbon' style power bus the embodiment of FIG. 15A-15D, the power bus is designed to have low mass, low electrical resistance, and high environmental or sulfuric acid corrosion resistance.

Figure 15C:
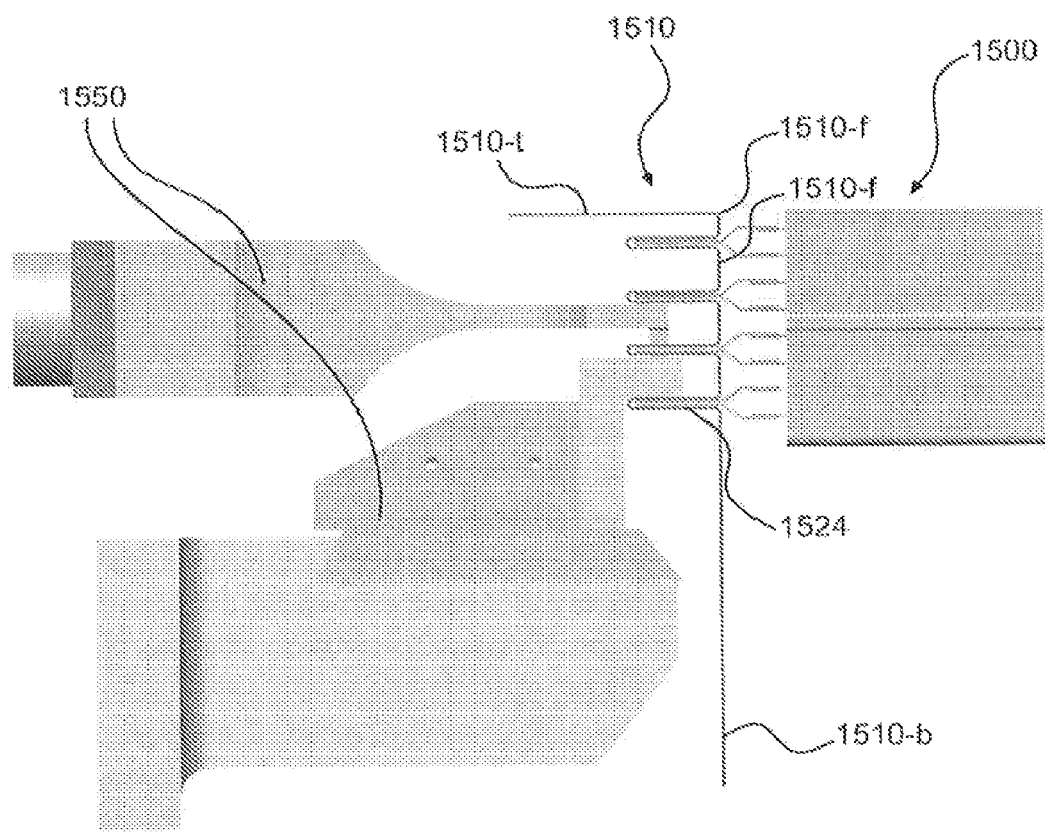

FIG. 15C is a side view of cell 1500 during the welding process by welding tools 1550, according to some embodiments. In some embodiments, power bus 1510 starts as a flat sheet of metal. During the welding process, the sheet of metal is folded and welded to tabs 1524 by ultrasonic welding tools 1550, as shown in FIG. 15C.

Figure 15D:
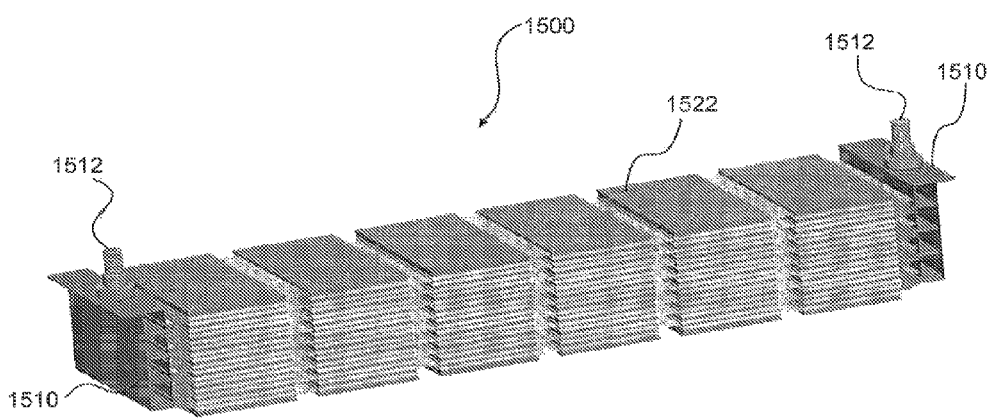

One of the folds, a cross section of which is shown as corner 1510-*f*1, forms a top portion 1510-*t* and separates it from the rest of the bus. Further, a front face 1510-*f* of the power bus is formed when all tabs on the one side are welded to the folded power metal sheet. Once the formation of front face 1510-*f* is compete and it embeds all tabs, the lower tail of the metal sheet is folded back to form a back face 1510-*b* of the power bus. The competed power bus includes, front and back faces 1510-*f* and 1510-*b*, and top surface 1510-*t*. FIG. 15D shows an assembled cell 1500 with two power busses 1510 welded to the tabs on its two ends.

In various embodiments, power bus 1510 provides a balanced path for conducting electrons from each cell to the battery terminals. As seen in FIGS. 15A, 15B, and 15D, for example, in some embodiments each top surface 1510-*t* is connected to a terminal 1512. Front and back surfaces 1510-*f* and 1510-*b* provide electron paths from tabs 1524 to top surface 1501-*t* and terminal 1512. In some embodiments, power bus 1510 is designed with a non-uniform resistivity along its surface, to provide a balanced, or an approximately equal, total resistance between each tab 1524 and the corresponding terminal 1512. In some embodiments, the resistivity of the front or back surfaces are varied as functions of the distance from the top surface. In some embodiments, for example, the resistivity of front surface 1510-*f* decreases for points that are farther from top surface 1510-*t*. In some embodiments, the resistivity of back surface 1510-*b*, which provides a shorter path for lower tabs compared to the upper paths, is higher than front surface 1510-*f*. In various embodiments, the resistivity of an area of the power bus is increased by removing some parts of the surface to create holes or by decreasing the thickness of the foil forming the bus. In various embodiments, a desired value of a resistivity as a function of the location on the power bus foil is determined by modeling various paths of electrons between the tabs and the terminals.

Figure 15E:
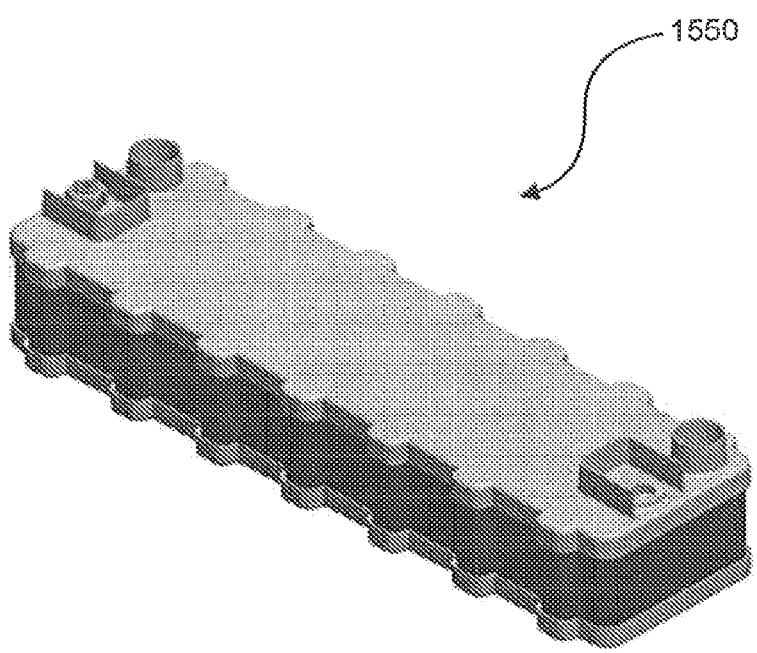
FIGS. 15E-15H show depicts lid and base inserts according to some embodiments.
Figure 15F:
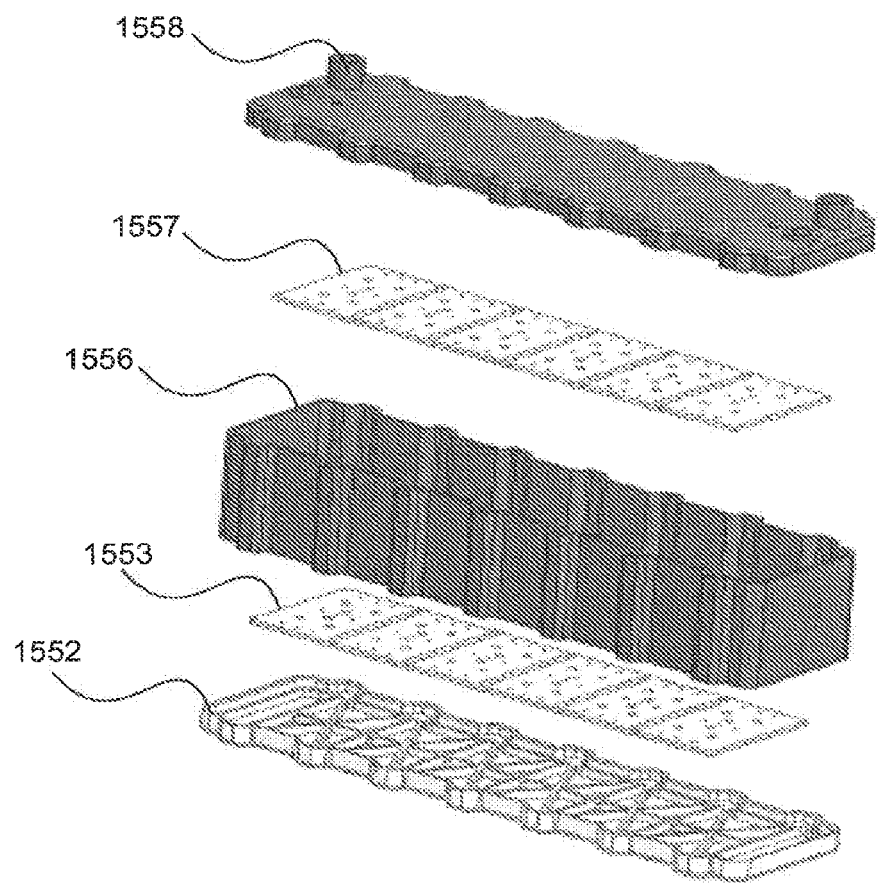

In some embodiments, the base and lid of the casing for a module include inserts that help increase the stiffness of the upper and lower surfaces of the casing. FIGS. 15E-15H show a module 1550 with such inserts according to some embodiments. In particular, FIG. 15E shows an assembled view of module 1550 and FIG. 15F shows an exploded view of module 1550. Further, FIGS. 15G and 15H respectively show assembling views of a bottom tray 1554 and a lid assembly 1559 of module 1550.

As seen in FIG. 15F, module 1550 includes an external base 1552, a lower insert 1553, a skirt 1556, an upper insert 1557, and an external lid 1558. Lower insert 1553 is used as an insert for base 1552, and upper insert 1557 is used as an inserted for lid 1558. Inserts 1553 and 1557 add stiffness to the base and lid, respectively. In some embodiments, the inserts increase the stiffness of the casing with little additional material and weight. In some embodiments, the added stiffness helps the module resist against deformation or bulging of the case. In various embodiments, without the added stiffness, such bulging can occur due to the normal cycling of the battery and the resulting increase of gas pressure inside the battery, which can deform the casing and cause the bulge. The bulging could result in a loss of compression as well as non-uniform compression of the electrode stacks.

Figure 15G:
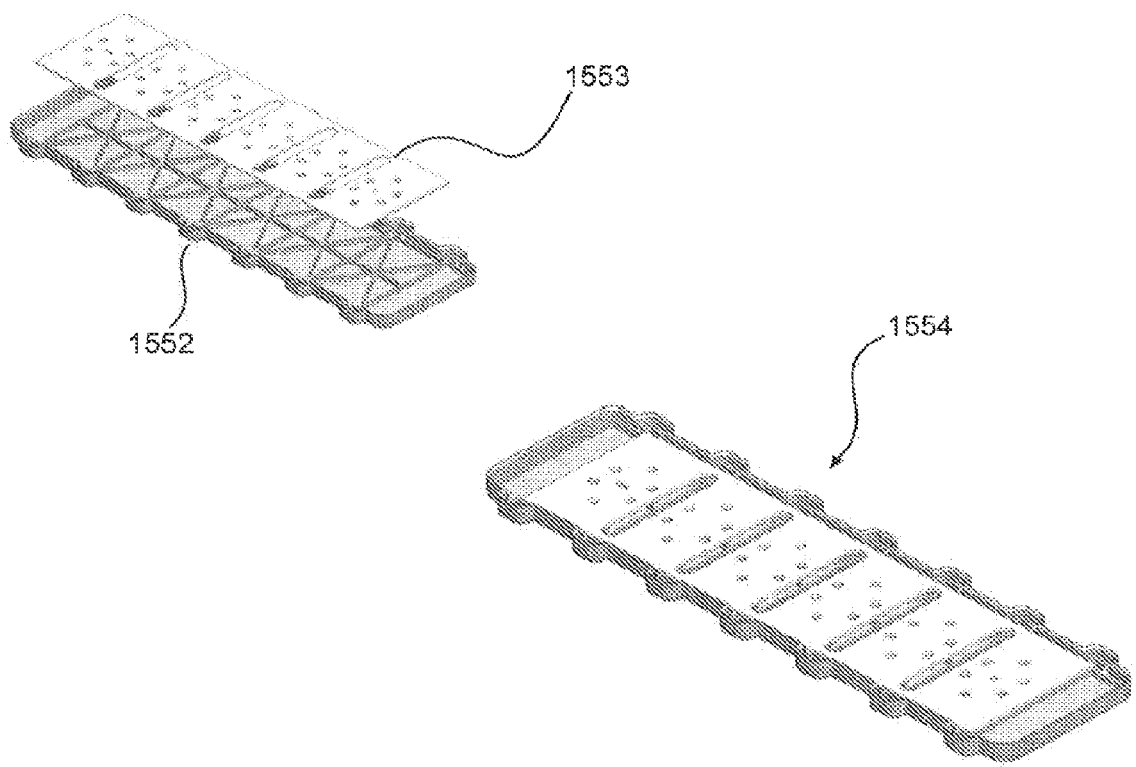

As seen in FIG. 15G the bottom tray assembly 1554 is formed by assembling lower insert 1553 in the external base 1552. Similarly, FIG. 15H shows that lid assembly 1559 is formed by assembling upper insert 1557 and external lid 1558.

Figure 15H:
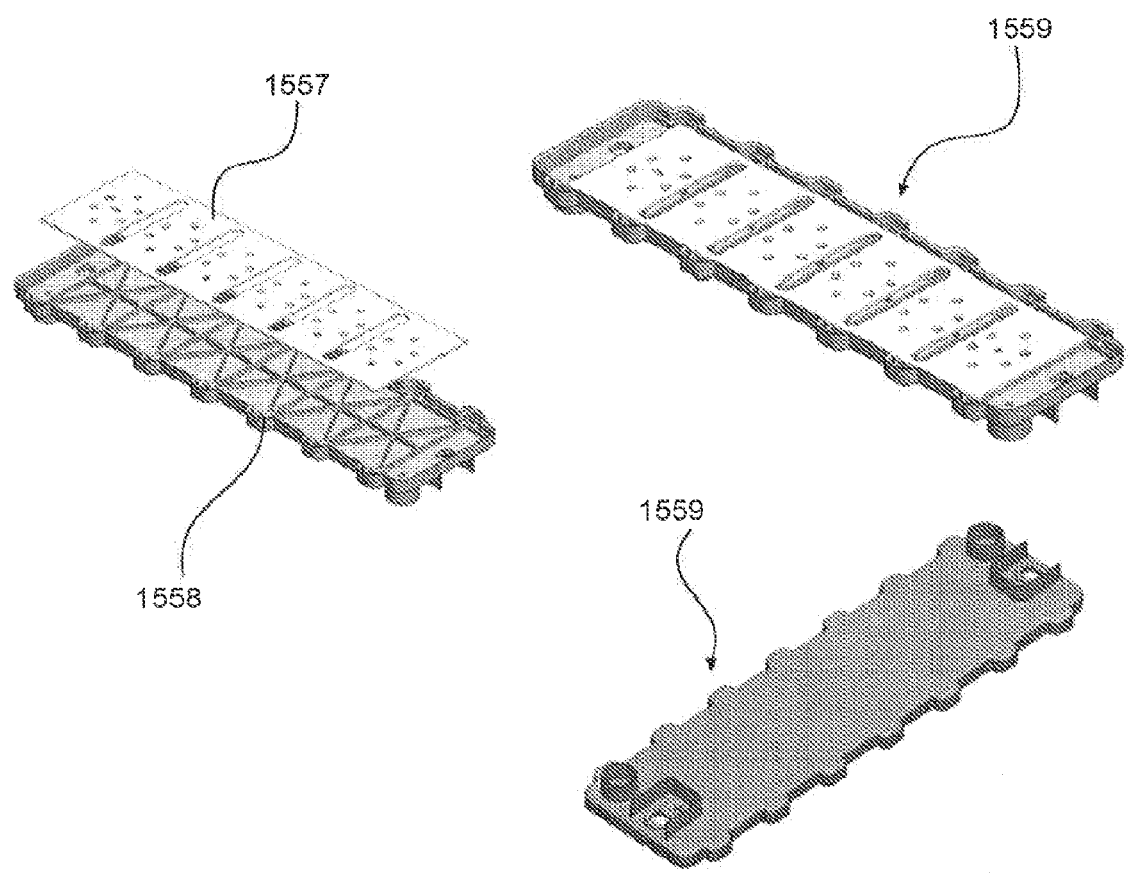

FIGS. 15G and 15H also show the formation of the inserts and their positioning with respect to the other parts, according to some embodiments. In some embodiments, the inserts include alignment holes formed therein for proper positioning. In some embodiments, adhesives are applied to the ribs of the base or the lid to secure the inserts against them. In some embodiments, the inserts are bonded to the ribbing in the internal surfaces of the base or the lid, forming a dual skin assembly. This dual-skin assembly resists bending loads that may be caused by stack compression and internal gas pressure.

In some embodiments, inserts 1553 and 1557 are made of the same material as the casing 1556. Such material permits a high degree of flexibility in bonding the parts. In some embodiments, the inserts are made from polypropylene sheet.

In some embodiments, the inserts are punched, cut, molded, formed by other suitable forming techniques. Alternatively, in some embodiments, the inserts are made from high impact polystyrene (HIPS); acrylonitrile butadiene styrene (ABS); polyvinyl chloride (PVC), any suitable composite, or other thermoplastic material that is acid-resistant, high-strength, and easily formed. In various embodiments, the inserts provide shielding against electrolyte leakage.

In various embodiments, the inserts prevent loss of compression of the electrodes and maintain even levels of compression across the electrode stacks. Further, the inserts help prevent shorting by providing gaps between the electrode stacks that prevent liquid pathways from forming between adjacent electrode stacks that may otherwise may cause shorting.

In some embodiments, the inserts include apertures formed therein. The apertures permit excess liquid electrolyte to drain from the electrode stacks to the bottom trench formed in the base. In addition, the apertures provide pathways for the escape of gas from the electrode stacks. The inserts can also be formed to establish pads for positioning the electrode stacks within the battery.

Figure 7:
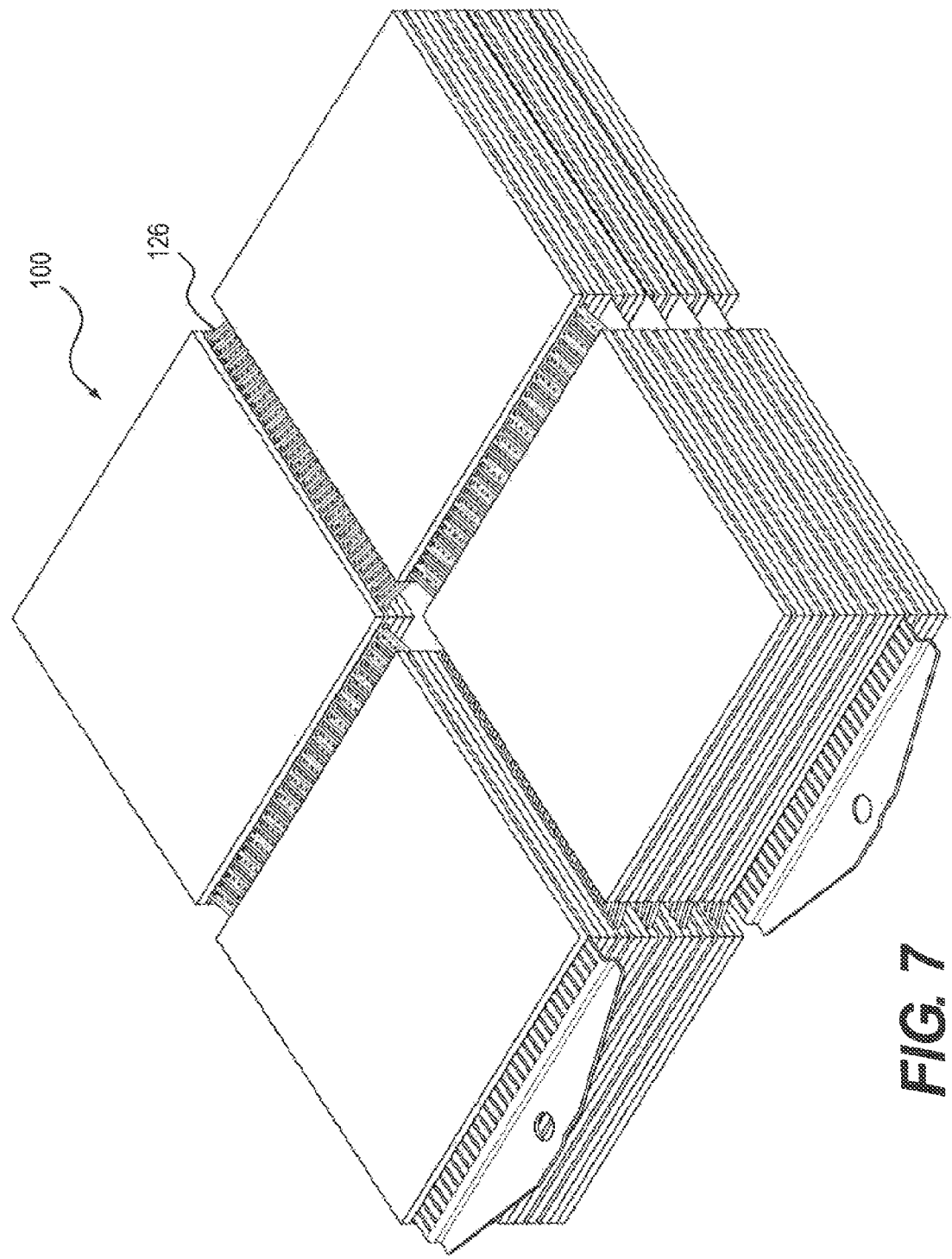
FIG. 7 is a schematic isometric view of a plurality of electrode assemblies connected in a spiral configuration according to another embodiment of the present disclosure.

In a third embodiment of the present disclosure, the electrode plates may be rectangular in shape. The rectangular plates may be similar in area to the semi-circular electrode plates and may used to form similar-sized electrode assemblies and modules. For example, FIG. 7 shows a lead-acid electrochemical cell 100 according to a third embodiment of the present disclosure. The embodiment of FIG. 7 depicts stacking of rectangular electrode plates at a ninety degree angle relative to one another to form electrode assemblies, and connecting the electrode assemblies in the spiral configuration. As shown in FIG. 7, rectangular electrode plates may be connected to form electrode assemblies, and thereby a spiral configuration having a square cross-sectional shape.

Figure 8:
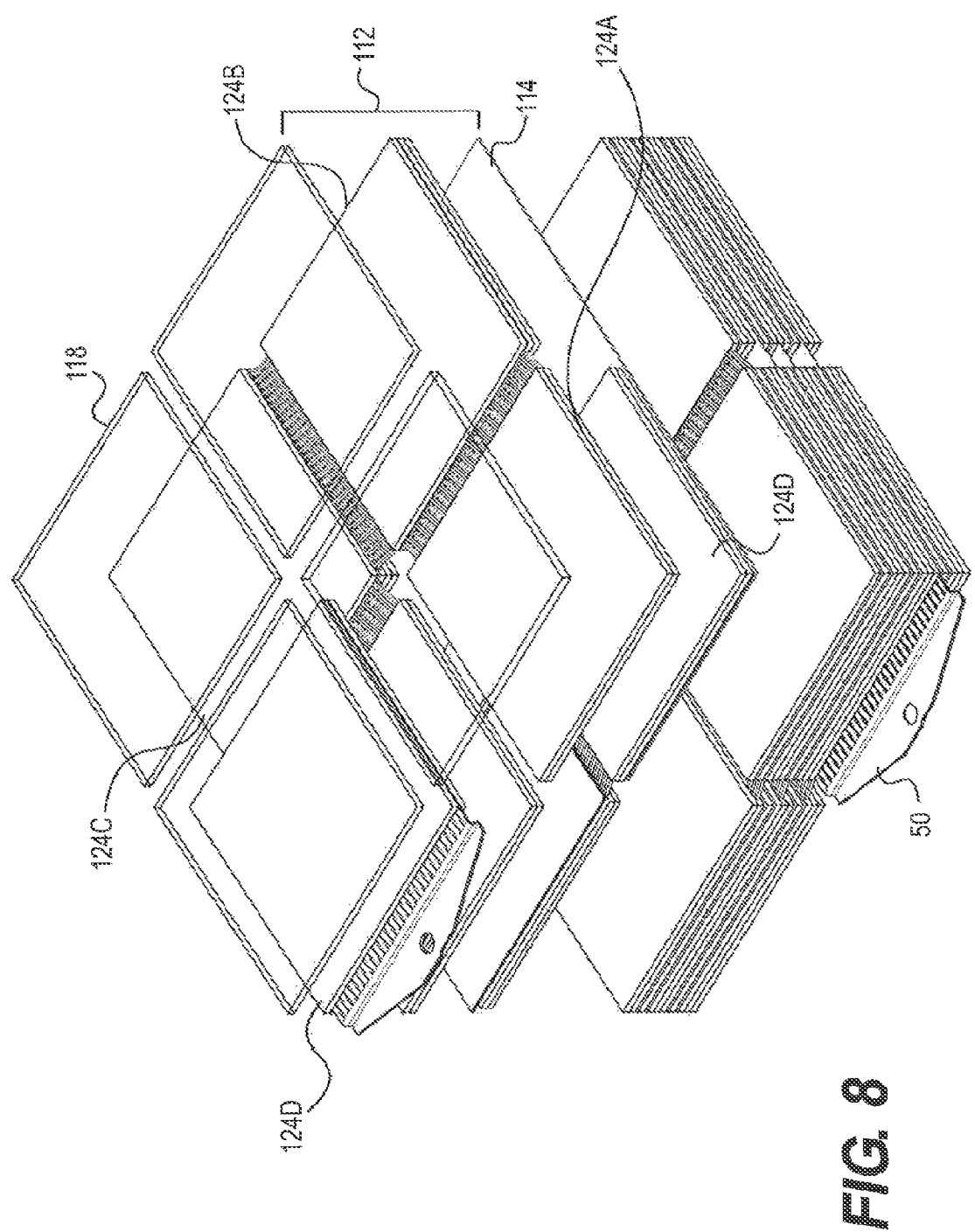
FIG. 8 is an exploded isometric view of a portion of an electrode assembly of the lead-acid electrochemical cell of FIG. 7.

Similar to the electrode assembly 12 of FIG. 1, the electrode assembly 112 of FIG. 8 may include four rectangular electrode plates 124A-D. Each electrode plate 124A-D may include positive and negative portions connected by electrode connectors 126. In addition, each electrode plate may include pasting paper and separators 118. Further, as shown in FIG. 8, each electrode assembly 112 may be separated by an insulator 114, which may include the same cross-sectional shape as that of the electrode assembly 112, and while further may include a radial slit (not shown).

Figure 9:
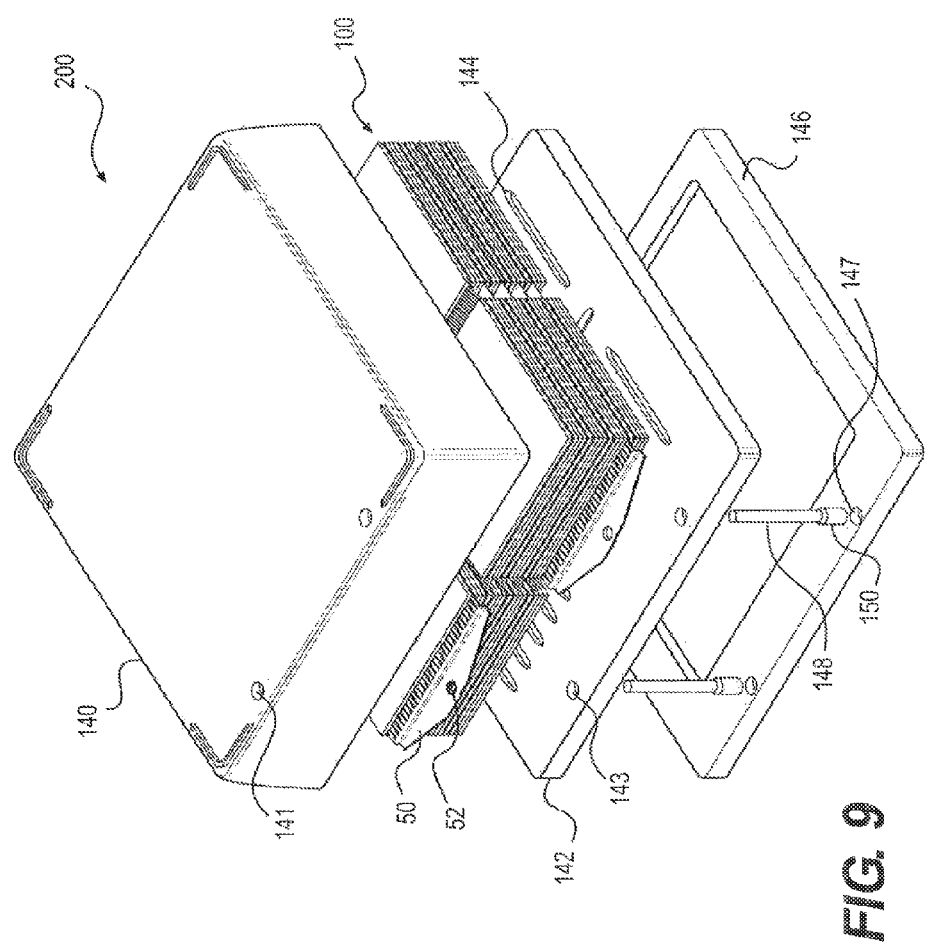
FIG. 9 is an exploded isometric view of a portion of a lead-acid electrochemical cell module according to another embodiment of the present disclosure.

FIG. 9 depicts a lead-acid electrochemical cell module 200 according to a third embodiment of the present disclosure. Module 200 may include a casing 140, a slotted tray 142, and a drip tray 146. Slotted tray 142 may include a plurality of slots 144, which may allow excess electrolyte fluid to flow through the slotted tray 142 and into a collection portion on the drip tray 144. The drip tray 146 may include outer edges 145, which may be secured to inner edges of casing 140, such that casing 140 and drip tray 146 may enclose the lead-acid electrochemical cell 100 sitting atop slotted tray 142. Casing 140 and drip tray 146 may be secured via any means known to those skilled in the art. For example, in one embodiment, casing 140 and drip tray 146 may be held together via plastic ultrasonic welding.

The lead-acid electrochemical cell 100 may further include a tab 50 connected to a positive end and a tab 50 connected to a negative end of the spiral configuration. Tabs 50 may be securely connected to the positive and negative ends via any means known to those skilled in the art. For example, tabs 50 may be connected via soldering or ultrasonic welding. Tabs 50 may each contain a through-hole 52, which may allow for passage of posts 148. In addition, openings 141, 143, 147 in each of the casing 140, slotted tray 142, and drip tray 146, respectively, may also allow for posts 148 to pass there through.

Figure 10:
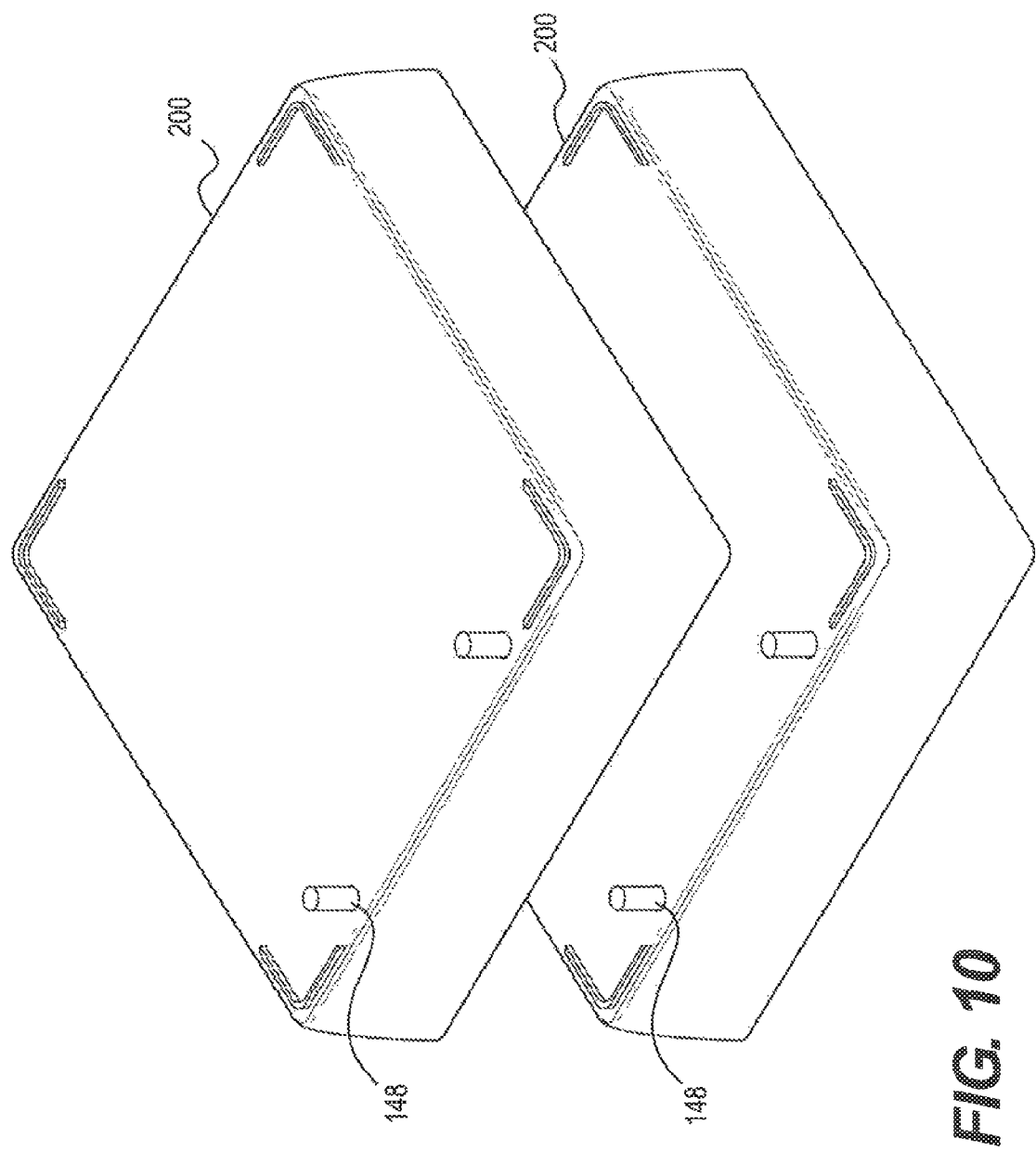
FIG. 10 is a schematic isometric view of two stacked lead-acid electrochemical cell modules of FIG. 9 connected in series.

As shown in FIG. 10, posts 148 may extend out from respective openings 141 in the casing 140 so that they may act as positive and negative terminals for the lead-acid electrochemical cell module. Posts 148 may further include an end portion 150 with an opening therein. The opening in the end portion 150 may allow for individual lead-acid electrochemical cell modules 200 to be stacked upon one another (FIG. 10).

A fourth embodiment may employ the square electrode assembly 112 geometry of the third embodiment to build capacity at a constant voltage, rather than building voltage as in the third embodiment. Similar to that disclosed in relation to the second embodiment, this fourth embodiment may include connecting the free portion of the top plate 124D with the free portion of the first plate 124A in order to complete the circuit and therefore form a 12V electrode assembly 112. The electrode assemblies may 112 then be stacked and connected to the power bus assembly 500 in order to build capacity while maintaining a constant 12V of the lead-acid electrochemical cell. The fourth embodiment of the lead-acid electrochemical cell may further include a module that may be similar to that of the third embodiment.

The electrode plates may further be used form electrode assemblies, and thereby lead-acid electrochemical cell configurations, having a variety of cross-sectional shapes, in addition to circular and square. This variety of cross-sectional shapes may allow for stacked or spiral configurations of the lead-acid electrochemical cell to be placed in a variety of locations (e.g., in a vehicle) with little or no modification of the design of the location (e.g., vehicle frame) to accommodate the lead-acid electrochemical cell system. In these further embodiments, for example, each electrode assembly may include more than four plates. In addition, formation of these electrode assemblies may include stacking of the electrode plates linearly relative to one another, as well as at a ninety degree angle relative to one another. For example, in one embodiment, rectangular plates may be used to form a spiral configuration with a rectangular cross-section. Accordingly, there may be more electrode plates along the length of each electrode assembly than along the width.

In one embodiment, electrode plates may be oriented such that resulting electrochemical cells may provide volumetric efficiency in three orthogonal directions. For instance, the orientation of the electrochemical cells may provide improved dimensions in an x-direction, a y-direction, and/or a z-direction, where the xyz axes are not oriented in any particular way relative to an electrochemical cell casing. Alternatively, the orientation of the electrochemical cells may provide improved dimensions in an x-direction, a y-direction, and/or a z-direction, where the xyz axes are oriented relative to an electrochemical cell casing. As described above and below, the electrochemical cells may be united through ionic connections and a common current collector in such as way as to build voltage or capacity in the direction of one of the orthogonal directions x, y, z.

A fifth embodiment of the present disclosure may include formation of electrode plates into an electrode assembly, where the electrode assembly may include an L-shaped cross-section. Each electrode assembly may include electrode plates with positive and negative portions connected by electrode connectors. In addition, each electrode plate may include pasting paper and separators. Further, each electrode assembly may be separated by an L-shaped insulator having at least one slit to enable spiral connection of the L-shaped electrode assemblies. In addition, each electrode plate may further include means for mitigating shunt currents (e.g., hydrophobic coating on electrode connectors, hydrophobic framing of the plates, or an oversized insulator for soaking up electrolyte fluid).

The L-shaped lead-acid electrochemical cell may further include an L-shaped module. Similar to the circular and square modules, the L-shaped module may include a casing, slotted tray, and drip tray for collecting leaking electrolyte fluid. There may further be a tab connected to positive and negative ends of the L-shaped spiral configuration, such that the tabs may be connected to shafts that form terminals of the L-shaped lead-acid electrochemical cell.

An alternative, sixth embodiment of the L-shaped electrode assemblies may further include a capacity building geometry, similar to the other capacity-building embodiments disclosed herein. The L-shaped electrode assemblies in the sixth embodiment may each be connected in parallel, with each assembly terminating in a tab, with each of the respective tabs connected to the power bus assembly 500. The capacity-building L-shaped electrochemical cell may be housed within a module that is similar to the L-shaped module for the spiral configuration.

Figure 17:
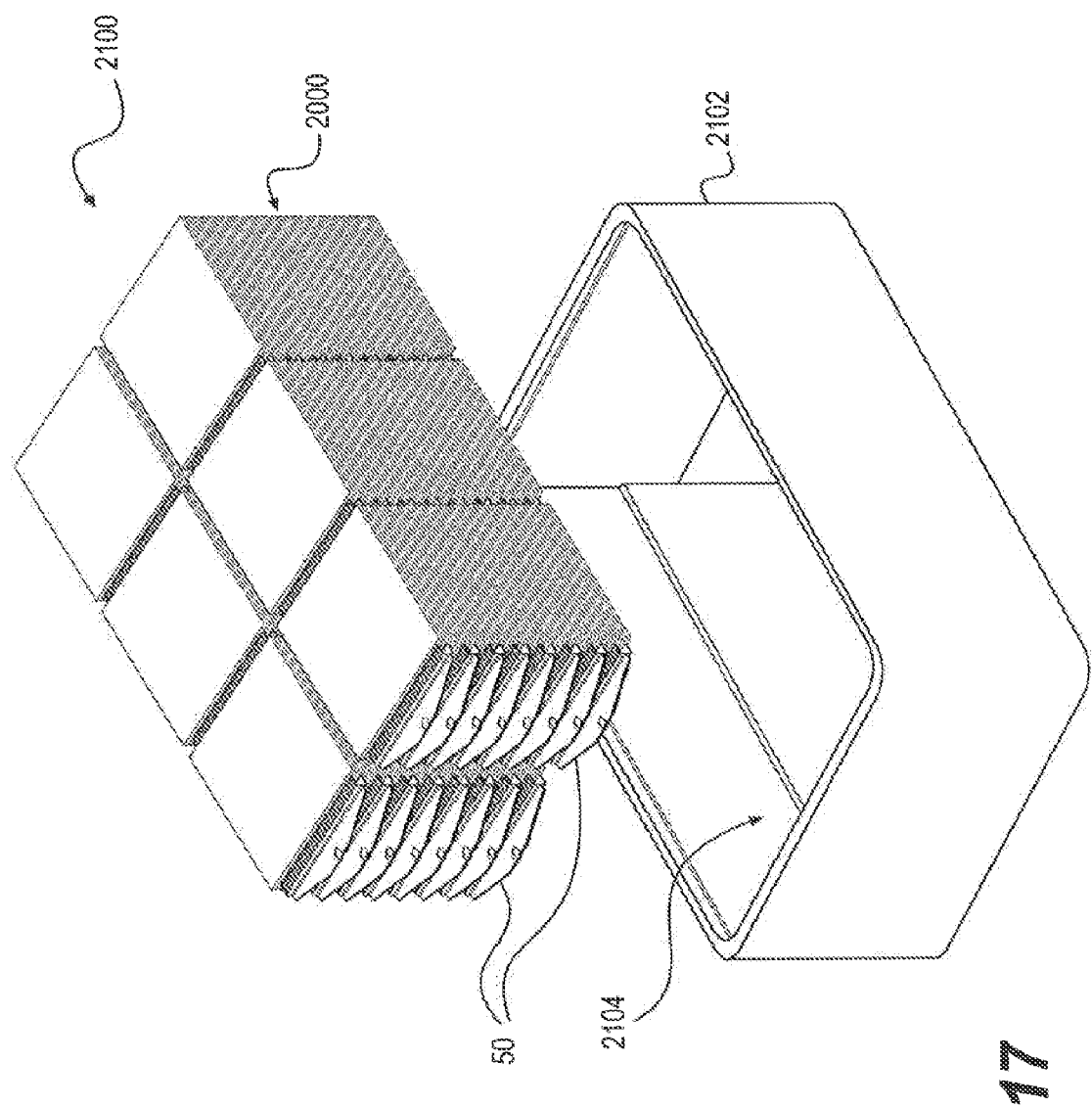
FIG. 17 is a schematic isometric view of a lead-acid electrochemical cell with a plurality of electrode assemblies in a stacked configuration according to another embodiment of the present disclosure.
Figure 18:
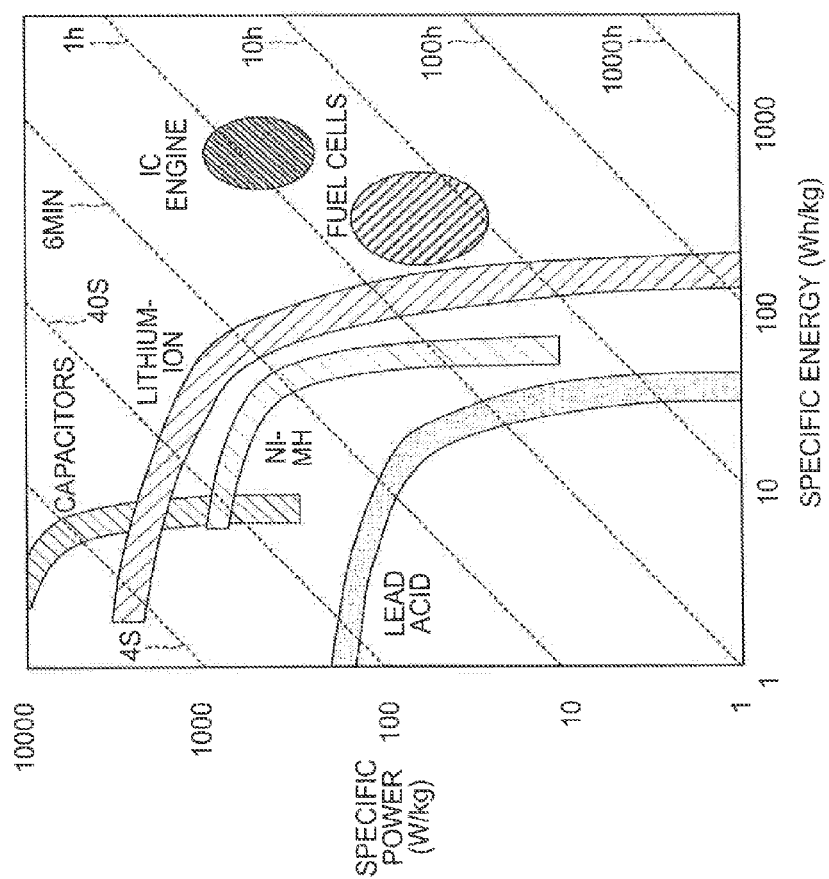
FIG. 18 shows a Ragone plot of various types of electrochemical cells.

A seventh embodiment of the present disclosure may an electrode assembly having a U-shaped cross-sectional shape. The seventh embodiment may build voltage at a constant capacity, as disclosed herein. Alternatively, an eighth embodiment may include a U-shaped electrode assembly disposed to build capacity. FIG. 17 illustrates a lead-acid electrochemical cell 2000 according to an eighth embodiment of the present disclosure. The lead-acid electrochemical cell 2000 may include a plurality of electrode assemblies 2012 stacked, such that voltage may remain constant while capacity may be built. Each electrode assembly 2012 includes the U-shaped configuration, such that the lead-acid electrochemical cell 2000 may fit within a module that may include an intermediate separator 2104. The lead-acid electrochemical cell 2000 may further include a power bus 500 on each end to build capacity.

Figure 11:
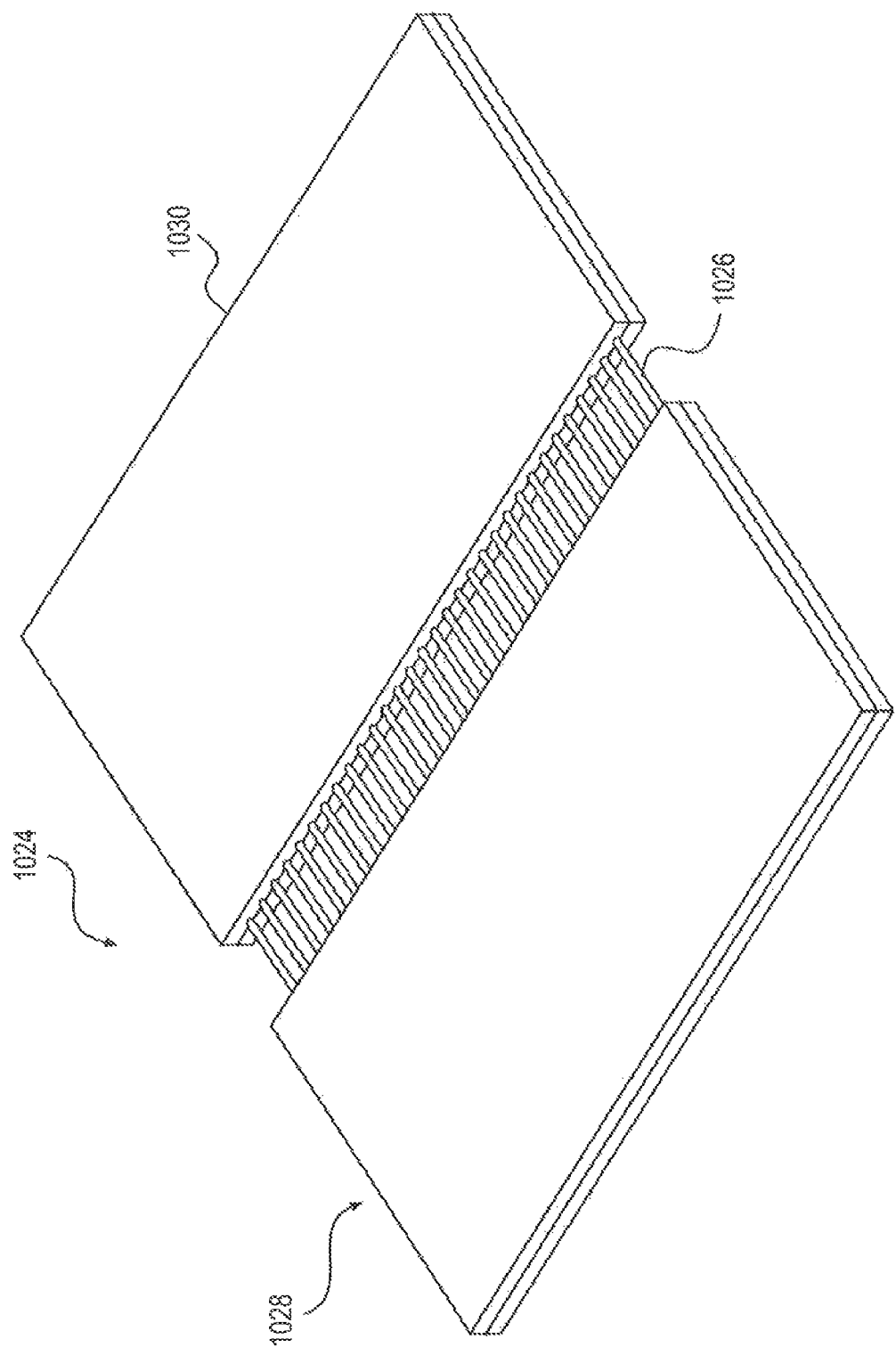
FIG. 11 is a schematic isometric view of an electrode plate according to another embodiment of the present disclosure.

As a further alternative, the electrochemical cell may be configured in an elongated rectangular shape. FIG. 11 illustrates an electrode plate 1024 of a lead-acid electrochemical cell according to a ninth embodiment of the present disclosure. Similar to the electrode plates 24, 124 in FIG. 4A and FIG. 8, the electrode plate 1024 may include a first, positive portion 1028 and a second, negative portion 1030, with electrode connectors 1026 there between. In various embodiments, each electrode plate portion 1028 or 1030 has a width 1028-W in the direction of electron flow and a length 1028-L perpendicular to that direction. In various embodiments, each electrode plate has an aspect ratio, that is, a ratio of its length to its width (the length of 1028-L over the length of 1029-W)

that is larger than one. In some embodiment, the ratio of length to width is about 1.5. In some other embodiments this ratio is about 2.0. Such aspect ratios increase the efficiency of the batter cells as, for the same total surface of the electrode pates, the electron requires to travel a shorter path.

Figure 12:
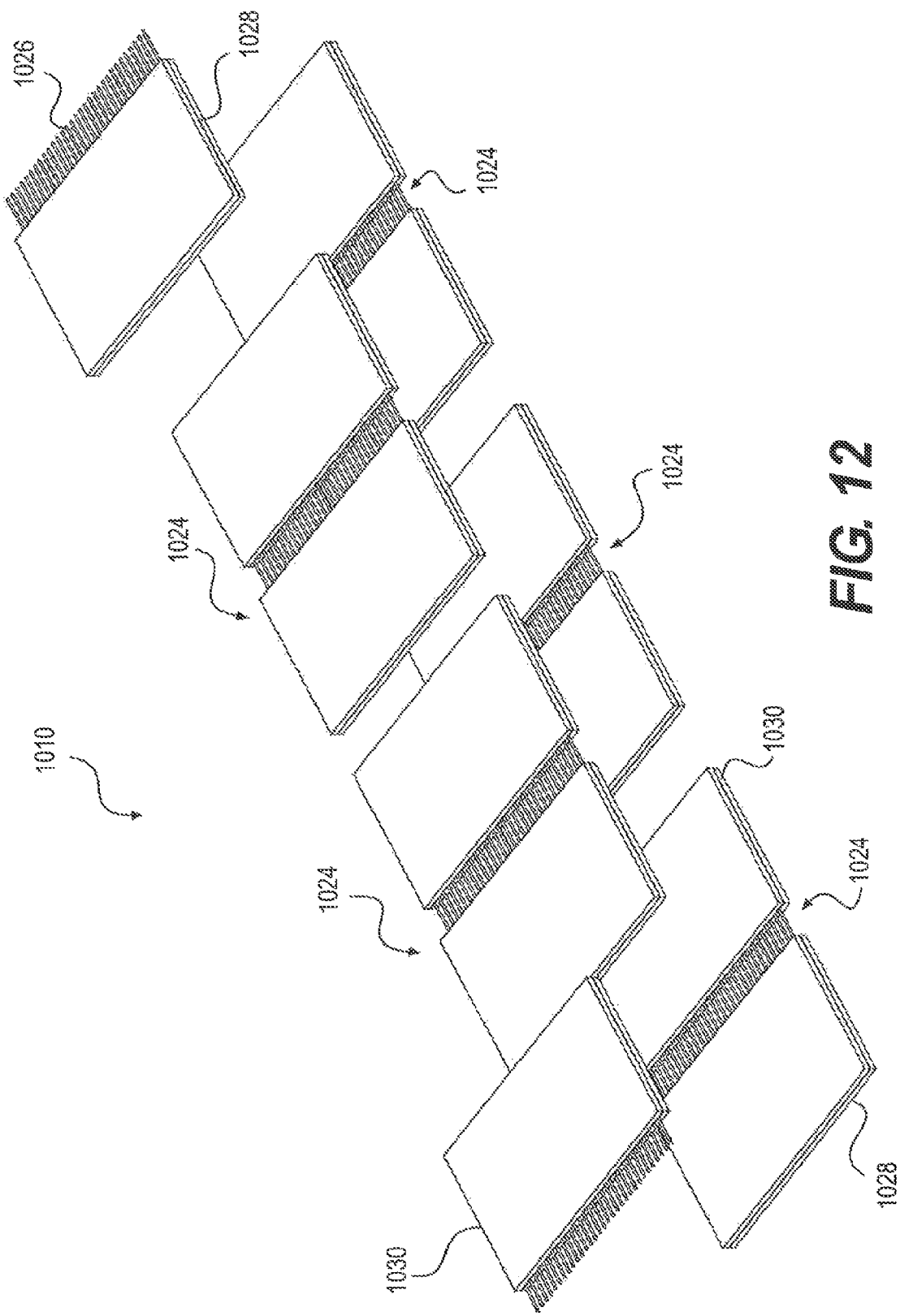
FIG. 12 is an exploded isometric view of a partial electrode assembly according to another embodiment of the present disclosure.

In the ninth embodiment, as shown in FIG. 12, the electrode assembly may be disposed in parallel in a capacity-building configuration. As shown in FIG. 12, electrode assemblies may be formed by aligning a desired number of electrode plates 1024, which may form the bottom portion of the electrode assembly. The top portion of the electrode assembly may be formed by aligning a positive portion 1028 of a top plate with a negative portion 1030 of a bottom plate, and so on. Separators may be located between each of the stacked positive and negative portions. In addition, formation of the electrode assembly may result in a free positive portion 1028 of a bottom electrode plate 1024 at one end, and a free negative portion 1030 of a bottom electrode plate 1024 at the opposite end. Individual negative and positive portions, respectively may be placed on these free ends in order to complete the circuit. Electrode assemblies may be formed of any desired voltage. For example, the electrode assembly 1010 of FIG. 12 may be 12 volt assembly.

Figure 13:
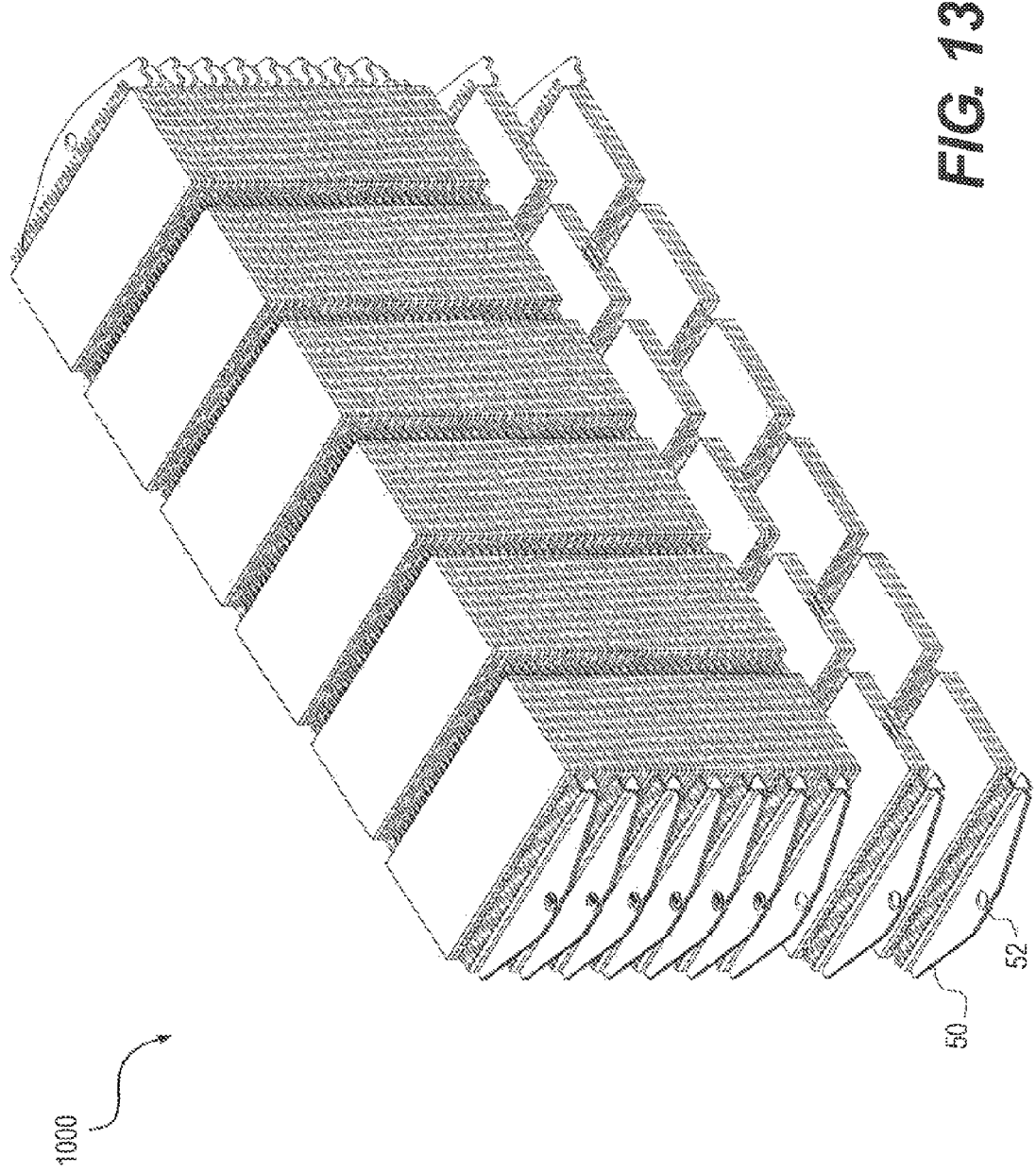
FIG. 13 is a schematic isometric view of a portion of a lead-acid electrochemical cell with a plurality of electrode assemblies in a stacked configuration according to another embodiment of the present disclosure.

FIG. 13 illustrates a lead-acid electrochemical cell 1000, which may include the stacked electrode assemblies 1024 of FIG. 12. The lead-acid electrochemical cell 1000 may include tabs 50. Similar to the tabs 50 in the lead-acid electrochemical cell 100 of FIG. 7, each tab may include a through-hole 52 and may be connected via soldering or ultrasonic welding to a positive end and a negative end of each electrode assembly. FIG. 13, however, illustrates that tab 50 may be connected to two electrode assemblies, as opposed to only one.

FIG. 14A further illustrates that each end of the lead-acid electrochemical cell 1000 may be connected to a power bus assembly 500, which may allow for the individual electrode assemblies 1024 to be connected in parallel in order to build capacity of the lead-acid electrochemical cell 1000.

Figure 16:
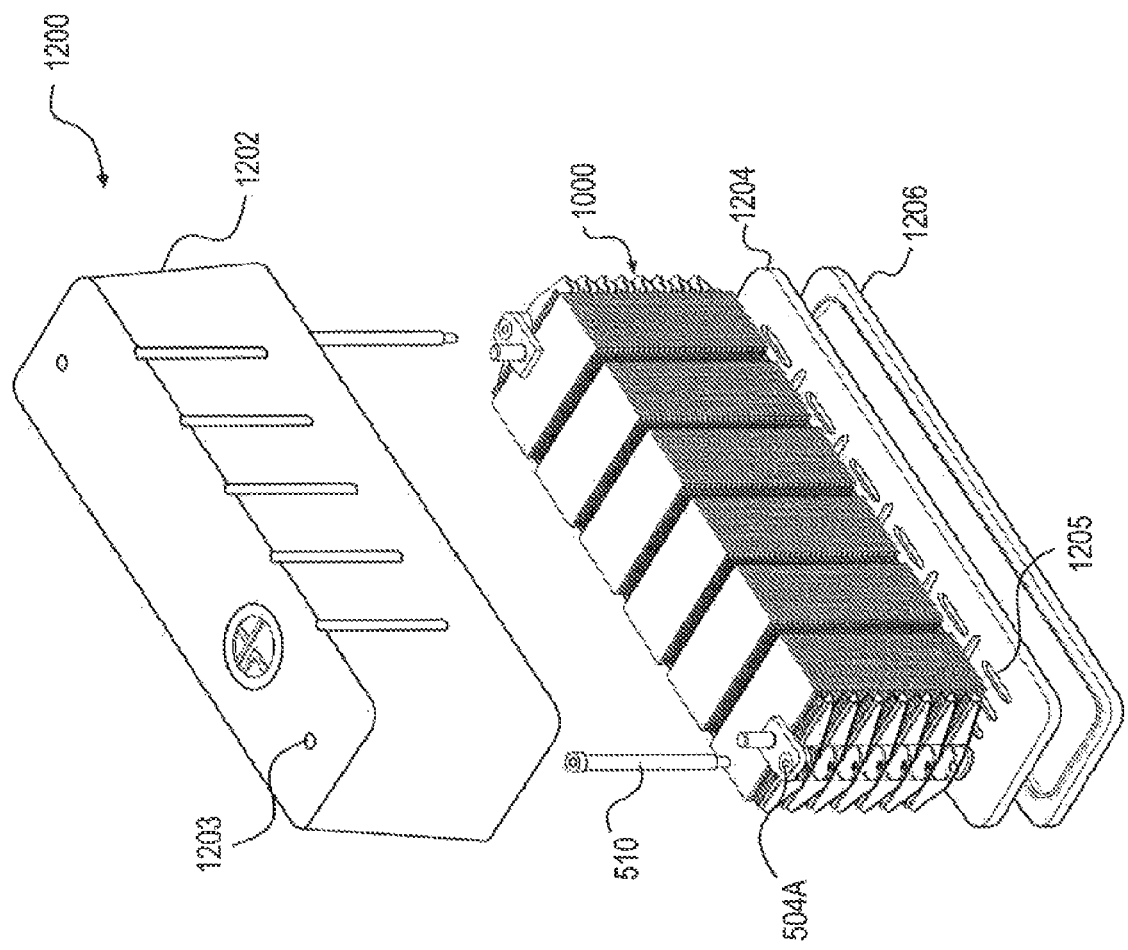
FIG. 16 is an exploded isometric view of a partial lead-acid electrochemical cell module, power bus, and package according to another embodiment of the present disclosure.

FIG. 16 illustrates a lead-acid electrochemical cell module 1200 including the lead-acid electrochemical cell 1000 of FIG. 14A. Similar to the lead-acid electrochemical cell module 200 of FIG. 9, the lead-acid electrochemical cell module 1200 may include a casing 1202, a slotted tray 1204 with a plurality of slots 1205, and a drip tray 1206 for collecting electrolyte fluid that seeps through the slots 1205 of the slotted tray. The casing 1202, slotted tray 1204, and drip tray 1206 may include a length, width, and height that are slightly larger than the dimensions of the lead-acid electrochemical cell 1000, such that the casing 1202 and drip tray 1206 may completely enclose the lead-acid electrochemical cell 1000. Further, similar to the module 200 of FIG. 10, the casing 1202 and the drip tray 1206 may be held together via any process known to those skilled in the art, including, but not limited to plastic ultrasonic welding.

Figure 19A:
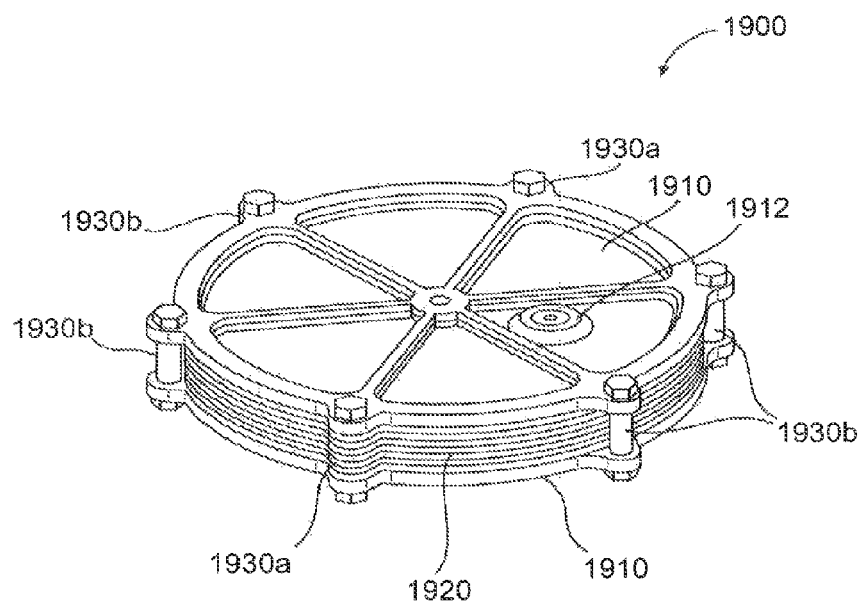
FIGS. 19A-19F shows a circular plate module in accordance with some embodiments of the present disclosure.

Various embodiments use novel shapes for the electrode plates and accordingly increase the charge capacity or efficiency of the battery. FIG. 19A shows a circular plate module 1900 in accordance with some embodiments of the present disclosure. Circular plate module 1900 includes two caps 1910 at the top and bottom; a plurality of circular plates 1920 between the two caps; and a plurality of nuts and bolts assemblies 1930 (labeled as two end-nuts-and-bolts assemblies 1930a and four side-nuts-and-bolts assemblies 1930b). Top and bottom caps 1910 are tightened by the plurality of nuts and bolts assemblies 1930 on the two sides of the plurality of circular plates 1920, and hold those plates together. Moreover, top and bottom caps 1910 each includes a terminal 1912 (visible in FIG. 19A for top cap only) through which the module connects to a terminal of the battery or another module.

Figure 19B:
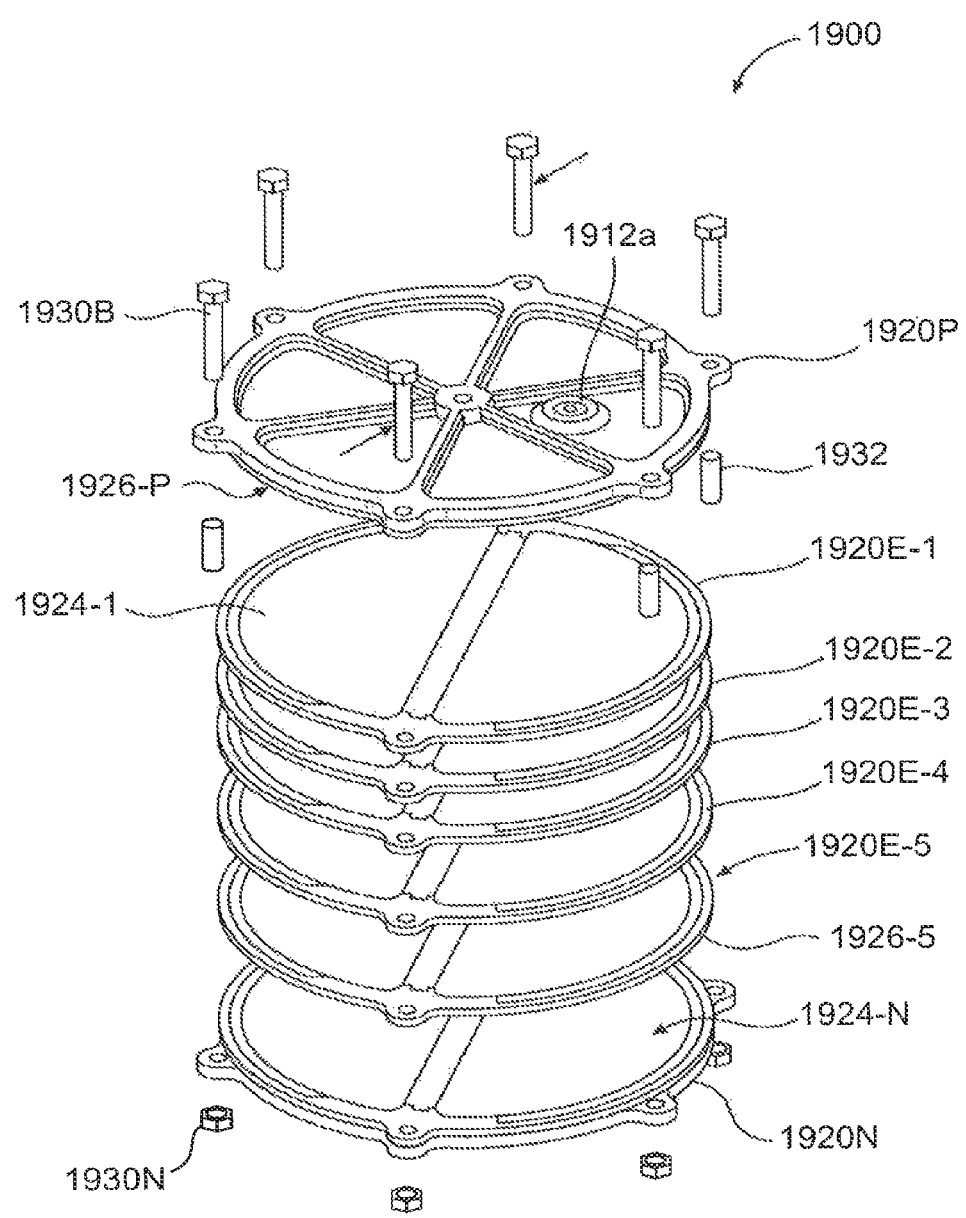

FIG. 19B shows a disassembled view of circular plate module 1900 and its various parts in accordance with some embodiments. In particular, in FIG. 19B, module 1900 includes one layer positive terminal 1920P, one layer negative terminal 1920N, five layer electrodes 1920E, six bolts 1930B, six nuts 1930N (of which four are visible), and four bushings 1932 (of which three are visible).

In the embodiments of FIGS. 19A and 19B, the disassembled parts shown in FIG. 19B combine into assembled module 1900 of FIG. 19A. In particular, when assembling the parts shown in FIG. 19B into assembled module 1900 of FIG. 19A, the bolts 1930B pass through designated holes in layer positive terminal 1920P, either designated holes in layer electrodes 1920E or bushings 1932, and designated holes in layer negative terminal 1920N, and then engage nuts 1930N. More specifically, two of the bolts, marked by arrows, correspond to end-nuts-and-bolts assemblies 1930a in FIG. 19A, and pass through the holes in layer electrodes 1920E. The other four bolts correspond to side-nuts-and-bolts assemblies 1930b in FIG. 19A and pass through bushings 1932.

When assembling the module shown in FIG. 19B, layer electrodes 1920E and layer negative or positive terminals are positioned on top of each other with a half turn for each layer compared to the previous, such that the positive half layers of one plate is positioned right below the negative half layer of the next plate, or vice versa.

Various embodiments use different combinations of layer electrodes and layer negative or positive terminals to result in various battery powers for the module. For example, in some embodiments such as the one shown in FIG. 19B, module 1900 includes five layer electrodes 1920E placed between one layer positive terminal 1920P and one layer negative terminal 1920N. In some embodiments, such a combination of electrodes provides a twelve volt battery module.

Figure 19C:
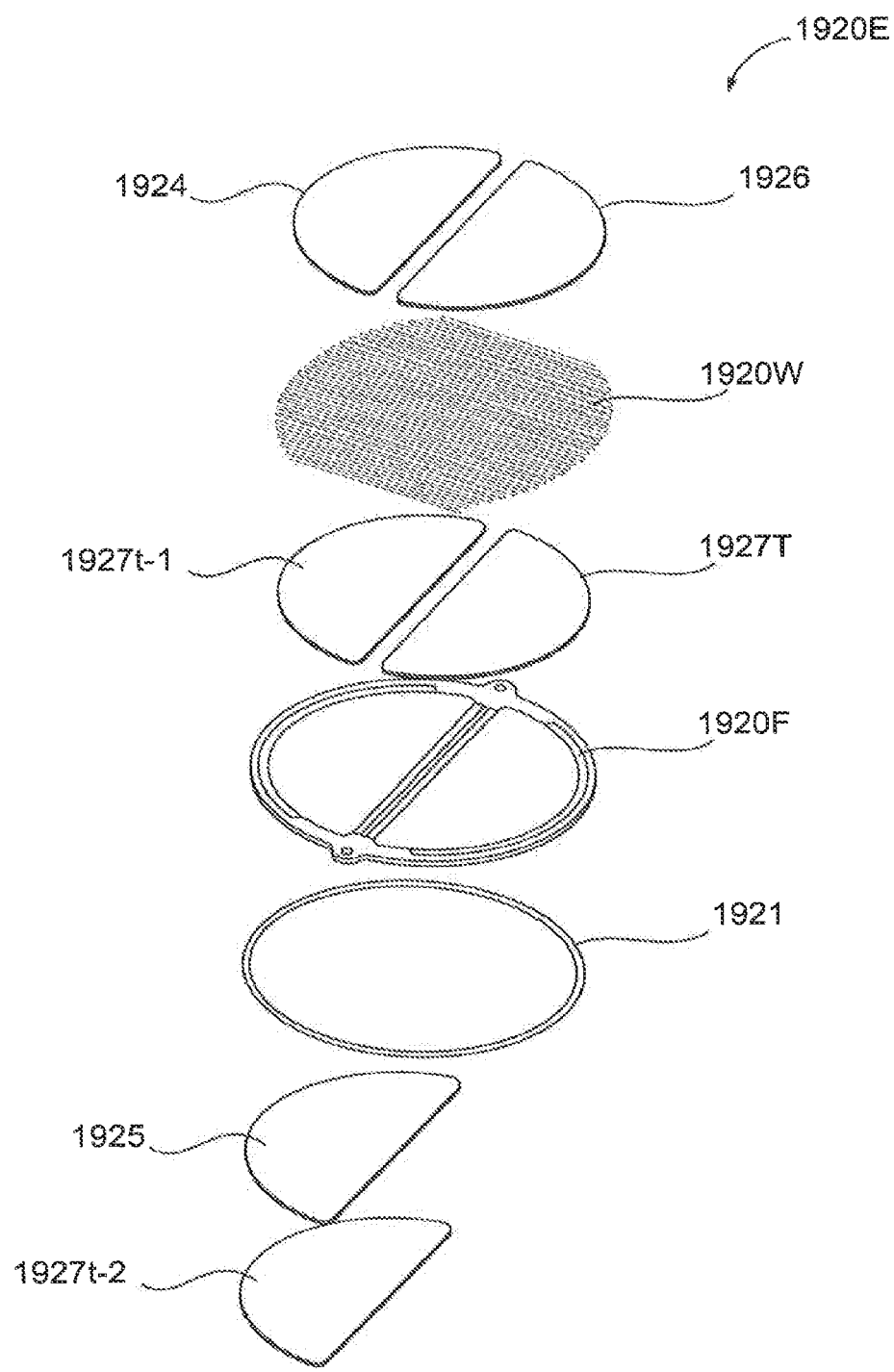

FIG. 19C shows a detailed structure of layer electrode 1920E according to some embodiments. In FIG. 19C, layer electrode 1920E includes negative half layer 1924, positive half layer 1926, wire substrate 1920W, two thin separator half layers 1927t-1 and 1927t-2, thick separator half layer 1927T, circular frame 1920F, frame o-ring 1921, and insulator half layer 1925.

These parts are assembled in the order and orientations shown in FIG. 19C to generate one layer electrode 1920E shown in FIG. 19B, in accordance to some embodiments. In particular wire substrate 1920W is strung over circular frame 1920F to create a wire mesh. This mesh is then embedded in the active materials included in negative and positive half layers 1924 and 1926 to form an active material layer. An o-ring 1921 is included for sealing the gap between two subsequent electrode layers. Negative half layer 1924 is then covered underneath by, in order, thin separator half layer 1927t-1, insulator half layer 1925, and thin separator half layer 1927t-2. Positive half layer 1926, on the other hand, is covered underneath with a thick separator half layer 1927T.

In various embodiments, layer electrodes 1920E are assembled such that negative and positive half layers of abutting layer electrodes come in contact. In particular, when a second layer electrode 1920E is positioned over a first layer electrode to form a module 1900, such as that seen in FIG. 19B, the second one is rotated with respect to the first one by 180 degrees around its central axis. In this manner, the negative half layer of the second layer electrode is positioned on top of the positive half layer of the first layer electrode and the positive half layer of the second layer electrode is positioned on top of the negative half layer of the first layer electrode, in each case with some separators or insulators coming between them. For example, in one set-up, the exploded view shown FIG. 19C represents the first layer electrode sandwiched between a second layer electrode on top and a third layer electrode at the bottom. The second and third layer electrodes, not shown, will be oriented similar to each other, but rotated by 180 degrees with respect to the first layer electrode. In this exemplary set-up, negative half layer 1924 of the first layer is sandwiched between the positive half layers of the second and third layer electrodes, with a thick separator half layer coming before the positive half layer above it, and thin separator 1927*t*–1, insulator 1925, and thin separator 1927*t*–2 respectively coming before the positive half layer below it. In a similar manner, positive half layer 1926 of the first layer electrode is sandwiched between negative half layers of the second and third layer electrodes, with a thin separator half layer, an insulator half layer, and another thin separator half layer coming before the negative half layer above it, and the thick separator 1927T coming before the negative half layer below it.

In various embodiments, the insulator half layer is an insulating layer that prevents the active half layers on its two sides from exchanging charges. In the above described exemplary set-up, for instance, the insulator half layer of the second layer electrode prevents positive half layer 1926 of the first layer electrode from exchanging charges with the negative half layer of the second layer electrode located above it. Similarly, insulator half layer 1925 prevents negative half layer 1924 from exchanging charges with the positive half layer of the third layer electrode located below it.

In various embodiments, the separator half layer is an ionically conductive layer that is in contact with one or two active half layers. In some embodiments, the separator half layer preserves some of the electrolyte in the active half layer to which it contacts. Further, in various embodiments, the separator half layer is in contact with two active half layers on its two sides, enables ionic charge exchanges between those half layers, thus forming a unit cell. In the above described exemplary set-up, for instance, thin separator half layer 1927*t*–1 is in contact with negative active material 1924 above it and preserves and exchanges ions with that negative half layer. Similarly, thin separator half layer 1927*t*–2 is in contact with a positive active material located below it. Thick separator half layer 1927T, on the other hand, enables ionic charge exchanges between positive half layer 1926 of the first layer electrode and the negative half layer of the third layer electrode below. Similarly, the thick separator half layer of the second layer electrode enables ionic charge exchanges between negative half layer 1924 and the positive half layer electrode of the second layer electrode. This combination of positive half layer, separator half layer, and negative half layer creates a unit cell inside module 1900. Thus in FIG. 19C, for example, negative half layer 1924 forms a unit cell with the positive half layer above it, while being insulated from the positive half layer below it. Similarly, positive half layer 1926 forms a second unit cell with the negative half layer below it, while being insulated from the negative half layer above it. These unit cells of the module are connected to each other in series via wire substrate 1920W.

In various embodiments, the wire substrate is a mesh created by a single-direction conductive wire, which enables conductive electron exchanges between the two active half layers that it connects. The wire substrate thus connects within the same layer electrode the positive half layer of one unit cell to the negative half layer of another unit cell. In various embodiments, the wire substrate has a composition and a design that increases the efficiency of the battery. In some embodiments, such as that shown in FIG. 19C, the wiring is a mesh of directional wires that extend from one electrode to the other electrode. Further, in various embodiments, the wire substrate is made of a non-crystalline amorphous material that does not have a long range order. Such materials provide a better resistance against corrosion and thus are more suitable to be used in contact with the electrolytes.

In the above-described exemplary set-up, for instance, in the first layer electrode shown in FIG. 19C, wire substrate 1920W connects negative half layer 1024, belonging to the first unit cell, to positive half layer 1926, belonging to the second unit cell.

In various embodiments, circular plate module 1900 includes a set of unit cells connected in series. In some embodiments, each unit cell the middle is formed between two abutting layer electrodes, in the manner detailed above. Further, two end unit cells are formed between a layer electrode and an abutting layer positive terminal or layer negative terminal. For example, in the embodiment shown in FIG. 19B, the first layer electrode terminal 1920E-1 includes a negative half layer 1924-1, which forms a unit cell with positive half layer 1926-P in layer positive terminal 1920P. The fifth layer electrode 1920E-5, on the other hand, includes a positive half layer 1926-5, which forms a unit cell with negative half layer 1924-N in layer negative terminal 1920N.

Figure 19D:
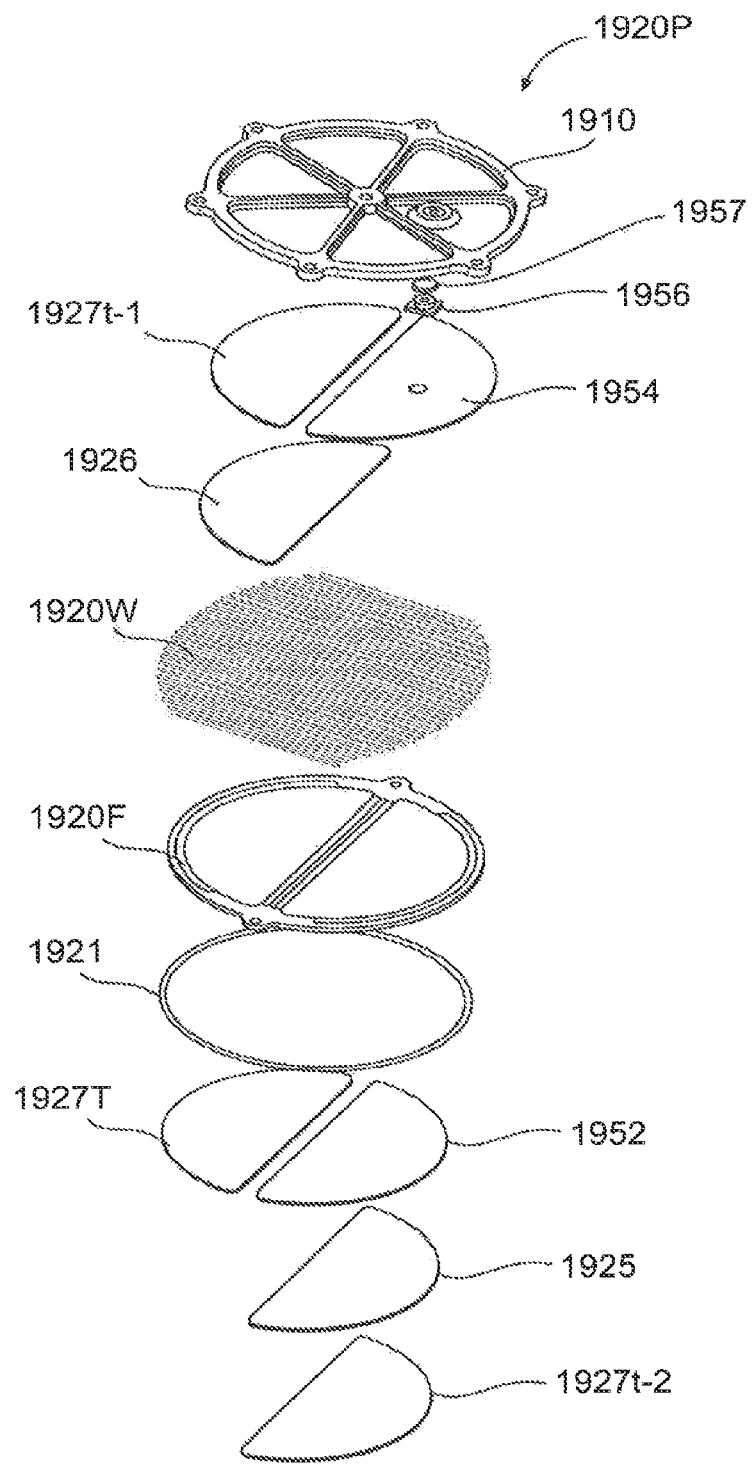
Figure 19E:
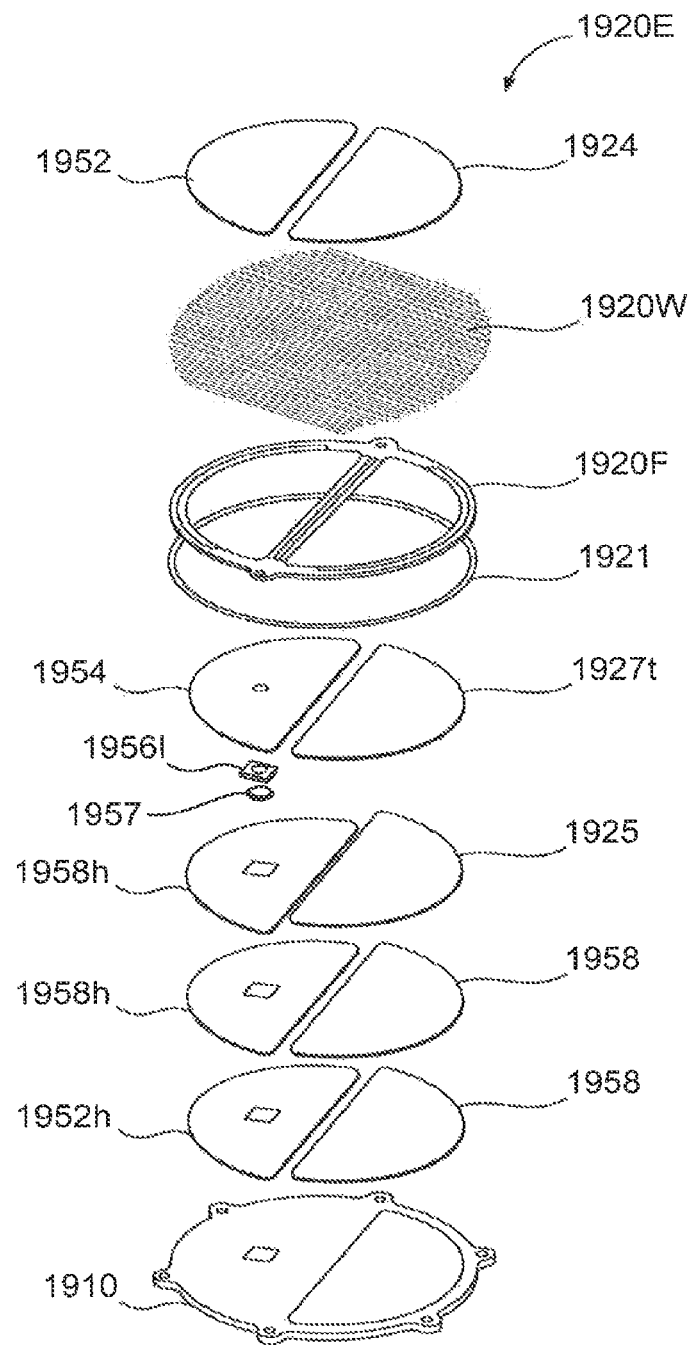

FIGS. 19D and 19E show the structure of the layer positive terminal and the layer negative terminal in more detail and in accordance with some embodiments. FIG. 19D shows that layer positive terminal 1920P includes, in consecutive layers starting from top, cap 1910; thin separator half layer 1027*t*–1 along with a lead sheet half layer 1954; positive half layer 1926; wire substrate 1920W; thick separator half layer 1927T along with a gasket half layer 1952; and insulator 1925 and thin separator half layer 1027*t*–2. Layer positive terminal 1920P also includes circular frame 1920F, frame o-ring 1921, a terminal 1956 and a terminal o-ring 1957.

FIG. 19E shows that layer negative terminal 1920N includes, in various layers starting from bottom, cap 1910; PVC half layer 1958 along with holed gasket half layer 1952*h*; another PVC half layer 1958 along with holed PVC half layer 1958*h*; insulator 1925 along with another holed PVC half layer 1958*h*; thin separator half layer 1927*t* along with lead sheet half layer 1954; wire substrate 1920W; and negative half layer 1924 along with gasket half layer 1952. Layer negative terminal 1920N also includes circular frame 1920F, frame o-ring 1921, a long terminal 1956L and terminal o-ring 1957.

In some embodiments PVC is used to manufacture circular frame 1920F, insulator half layer 1925, cap 1910, and PVC half layers 1958 and 1958*h*. Moreover, lead is used to manufacture wire substrate 1020W, terminals 1956 and 1956L. Further, EPDM rubber of 70 A durometer is used in manufacturing o-rings 1921 and 1957, and gasket half layers 1952 and 1952*h*.

Parts 1924 and 1926 are respectively the negative and positive active materials. Thin and thick separators 1927*t* and 1927T are made of fiberglass mats of different thicknesses. In particular, in the embodiment shown in FIGS. 19C-19E, thick separator half layer 1927T is thicker than thin separator half layer 1927*t*. Moreover, positive active material 1926 is thicker than negative active material 1924. In these embodiments, thin separator half layer 1927*t* is included on the side that also includes negative half layer 1924 to compensate for the smaller thickness of negative half layer 1924 compared to positive half layer 1926. Moreover, as explained, separator half layers 1927 preserve the electrolyte of the active layer with which they contact.

Figure 19F:
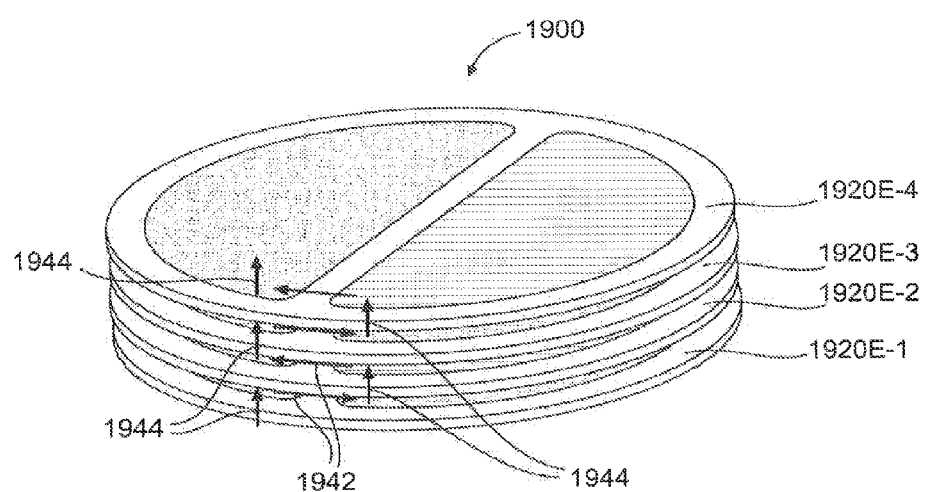

In various embodiments, the layer electrodes are assembled into a circular plate module in a manner that provide a continuous charge path among the plates. FIG. 19F shows the charge path of an assembly of layer electrodes, including layer electrodes 1920E-1 to 1920E-4, in a circular module 1900 in accordance with some embodiments. In FIG. 19F, vertical and horizontal arrows indicate direction of charge transfer. Specifically, horizontal arrows 1942 indicate a conductive electron transfer from one unit cell to the next unit cell in the assembly, through a wire substrate. Vertical arrows 1944, on the other hand, indicate ionic charge transfer within a unit cell. an ionic charge transfer through a separator from the left hand side (positive) half layer of layer electrode 1920E-2 to the left hand side (negative) half layer of layer electrode 1920E-3. In some embodiments, the voltage produced by a unit cell is around two volts. In the embodiment shown in FIG. 19B, for example, module 1900 assembles six unit cells and the total voltage generated by module 1900 is around twelve volts.

Figure 21:
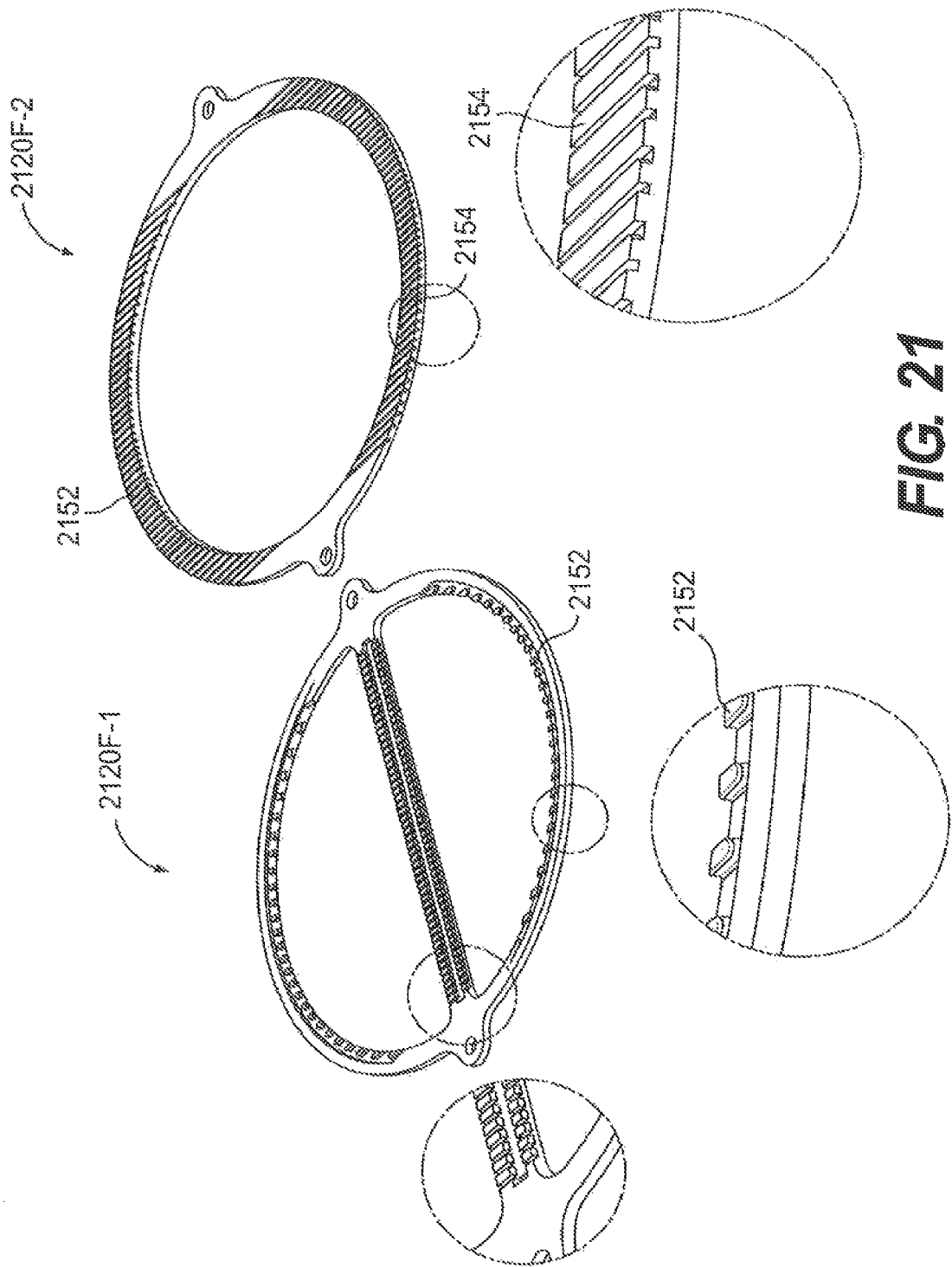
FIG. 21 shows two circular frames in accordance with some embodiments.

In various embodiments, layer electrodes 1920E or layers for positive and negative terminals are manufactured by assembling its various parts in some specific order. In the embodiment shown in FIG. 19C, for example, when manufacturing layer electrode 1920E, wire substrate 1920W can be strung into the grooves etched on the upper face of circular frame 1920F to create a wired-frame assembly. This wired-frame assembly can then be covered on the one side with negative active material to form negative half layer 1924 and on the other side with positive active material to form positive half layer 1926. Insulator and separator half layers 1925 and 1927 can then be attached on the appropriate faces of the negative and positive half layers Different embodiments use different structures for the wired-frame assembly or for combining the wired-frame assembly with the remaining parts of a an layer electrode. FIG. 21 shows two circular frames 2120E-1 and 2120E-2 in accordance with two different embodiments. Circular frame 2120E-1 has wire grooves 2152 etched on a section of its perimeter in a manner that a wire substrate strung into the grooves does not leave the perimeter of the frame and does not touch the perimeter of the wired-frame assembly. Circular frame 2120E-2, on the other hand, has wire grooves 2154 etched along the length of its perimeter in a manner that a wire substrate strung into the grooves forms part of the perimeter of the wired-frame assembly. In some embodiments using circular frame 2120E-2, frame o-ring 1921 is used to seal the perimeter of the wired-frame assembly and prevent electrolyte from leaking out.

Figure 22:
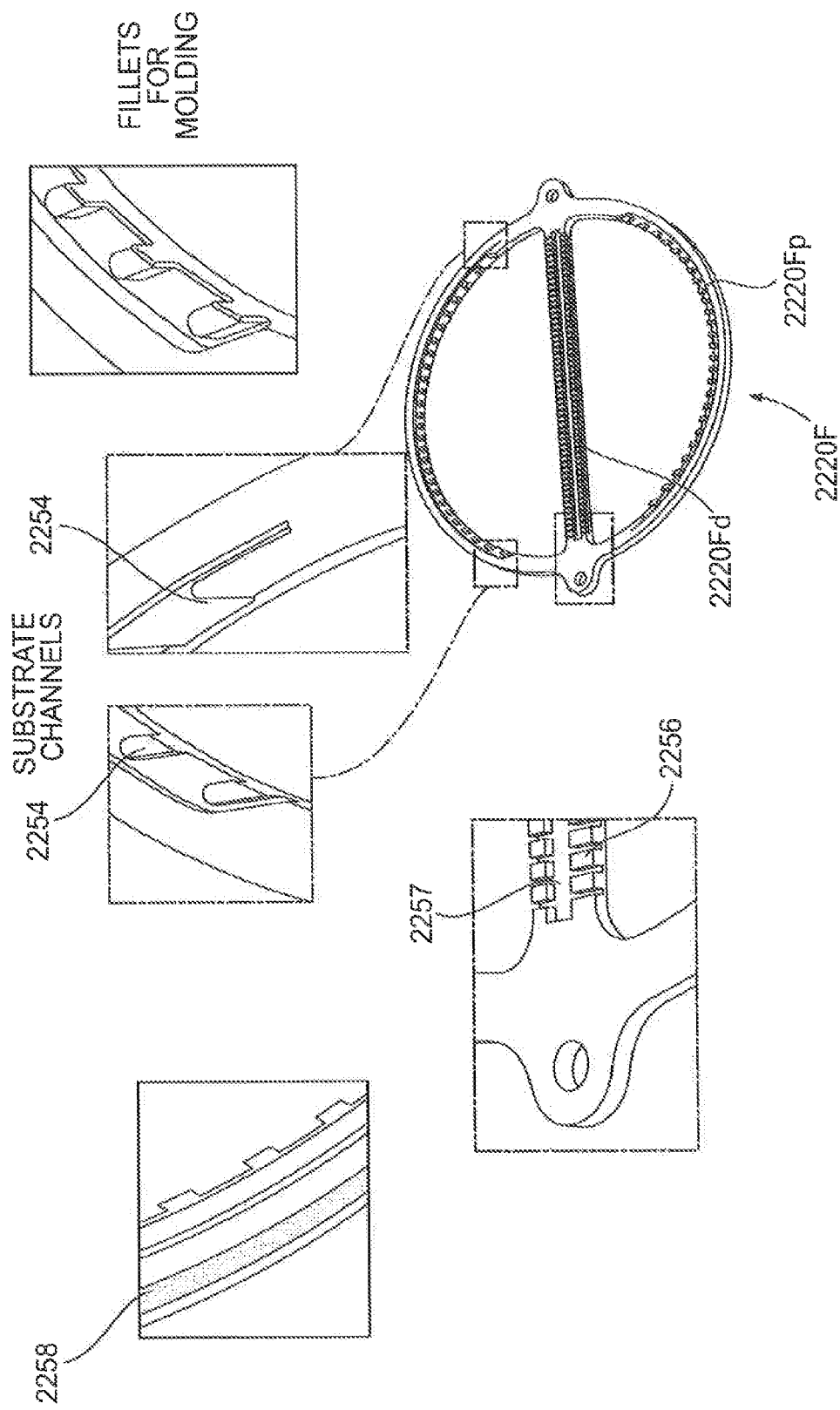
FIG. 22 shows the structure of a circular frame in accordance with some other embodiments.

FIG. 22 shows the structure of a circular frame 2220F in accordance with some other embodiments. Circular frame 2220F includes a perimeter section 2220Fp, a central diameter section 2220Fd, and an O-ring sealing 2258. Perimeter section 2220Fp has grooves formed on it for the wire substrate in the form of vertical channels 2254. Diameter section 2220Fd, on the other hand, has grooves formed on it for the wire substrate in the form of horizontal channels 2256.

O-ring sealing 2258 provides a sealing mechanism to prevent leakage of the byproducts, such as acids, or gases generated by the battery. Moreover, in some embodiments, such leakage is also prevented in the center by cutting out along diameter section 2220Fd, a channel such as potting compound area 2257. After lead-wire substrate is strung on circular frame 2220F, an epoxy is poured into area 2257 to seal in the wire. In some embodiments, the epoxy can be wax or other suitable hydrophobic materials. The epoxy is used to prevent or reduce the leakage of the battery between half layers.

Figure 23:
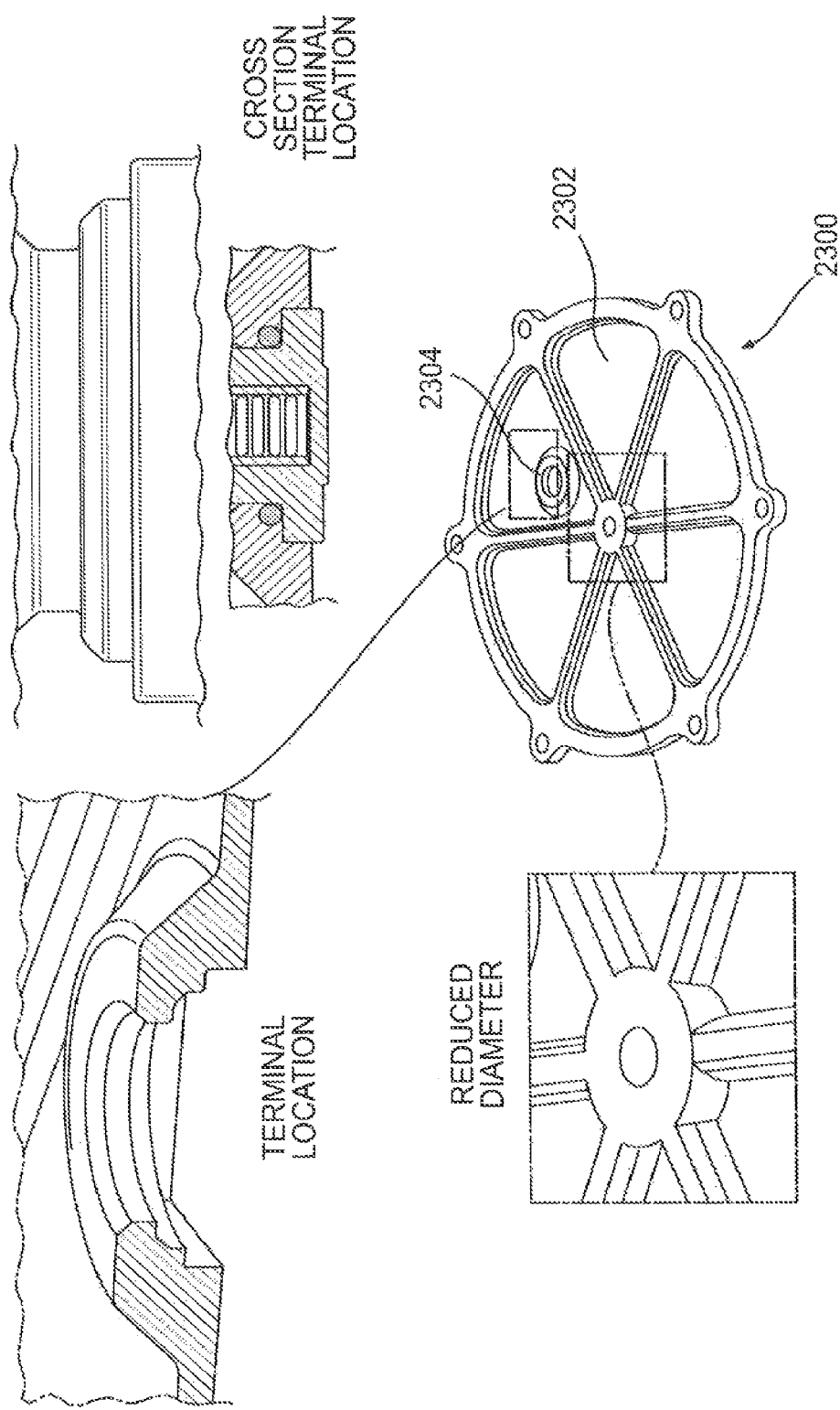
FIG. 23 shows a circular module cover in accordance with one embodiment.

Various embodiments change the shape or geometry of the module covers to improve the characteristics of the battery. FIG. 23 shows a circular module cap 2300 in accordance with one embodiment. Module cap 2300 includes six sectors 2302 and a terminal location 2304. Each of sectors 2302 includes a middle section, which has a reduced thickness and is a surrounded by a thicker rim. Because of the reduced thickness in the middle of sectors 2302, module cap 2300 is lighter than a cap that has a uniform thickness and is otherwise similar to module cap 2300. For example, in some embodiments each circular module cap 2300 for the top or bottom covers measures eight inches in the outside diameter, seven inches in the inside diameter, and ¼ inches in thickness. In various embodiments, top and bottom covers are injection molded using PVC. In these embodiments, module cap 2300 weighs around 140 grams, while a similarly dimensioned cap with a uniform thickness weights around 270 grams. Lighter covers reduces the weight of the battery, and thus increases its specific energy or specific power.

Figure 20:
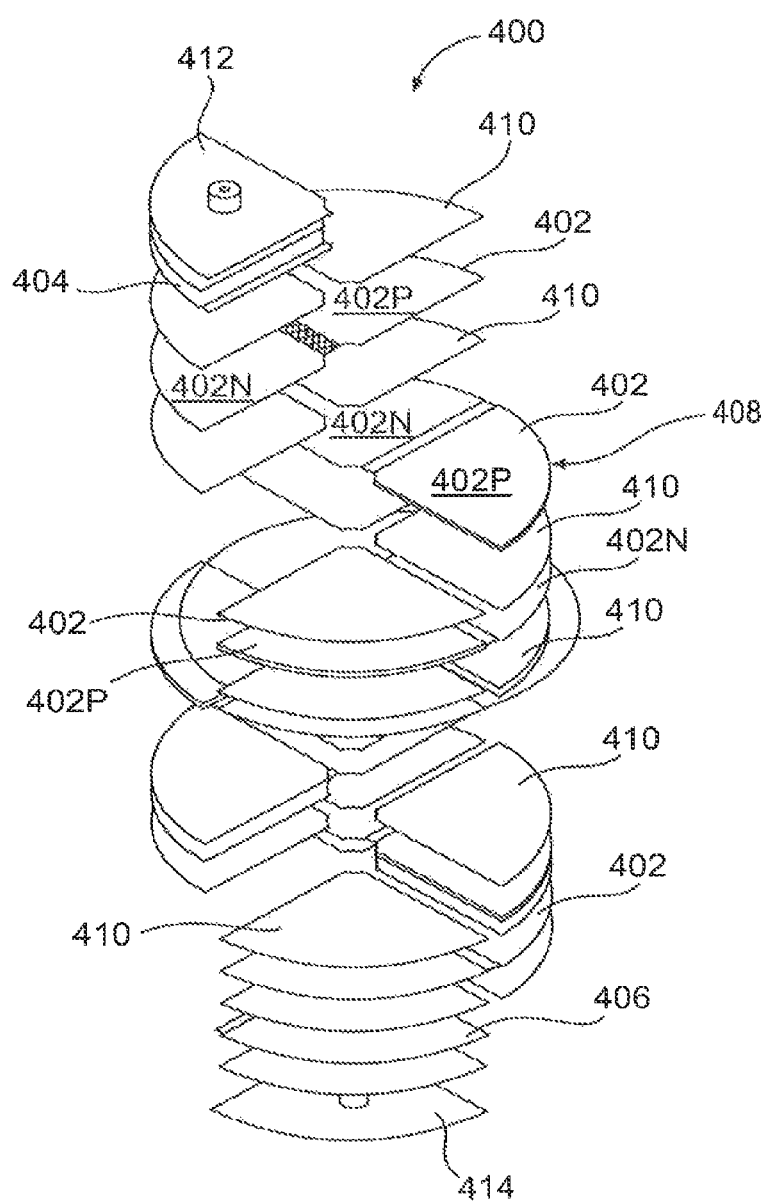
FIG. 20 shows an electrode assembly of a battery module according to some embodiments.

FIG. 20 shows an electrode assembly 400 of a battery module according to some embodiments. Assembly 400 includes semi-circular shaped full electrode plates 402, quarter-circular shaped positive and negative end plates 404 and 406, isolator layer 408, separator plates 410, positive terminal 412 and negative terminal 414. Each full electrode plate 402 includes a positive half plate 402P and a negative half plate 402N. Full electrode plates 402 are assembled in a manner that when a full plate is positioned above another full plate, it is rotated by 90 degrees about the axis of electrode assembly 400, such that positive half plate 402P of one plate is positioned against negative half plate 402N of the other plate. Moreover, a separator 410 is inserted between these two oppositely charge half plates to provide ionic connection between them. This combination of negative half plate of one plate ionically connected to a positive half plate of another plate located over or under the first plate creates a unit cell. Moreover, the wire connection between the positive half plate 402P and negative half plate 402N in the same full plate 402 provides a series connects between two consecutive unit cells. Positive end plate 404 forms a unit cell with the negative half plate 402N positioned against it (under it in FIG. 20). Similarly, negative end plate 406 forms another unit cell with the positive half plate 402P positioned against it (above it in FIG. 20).

Figure 24:
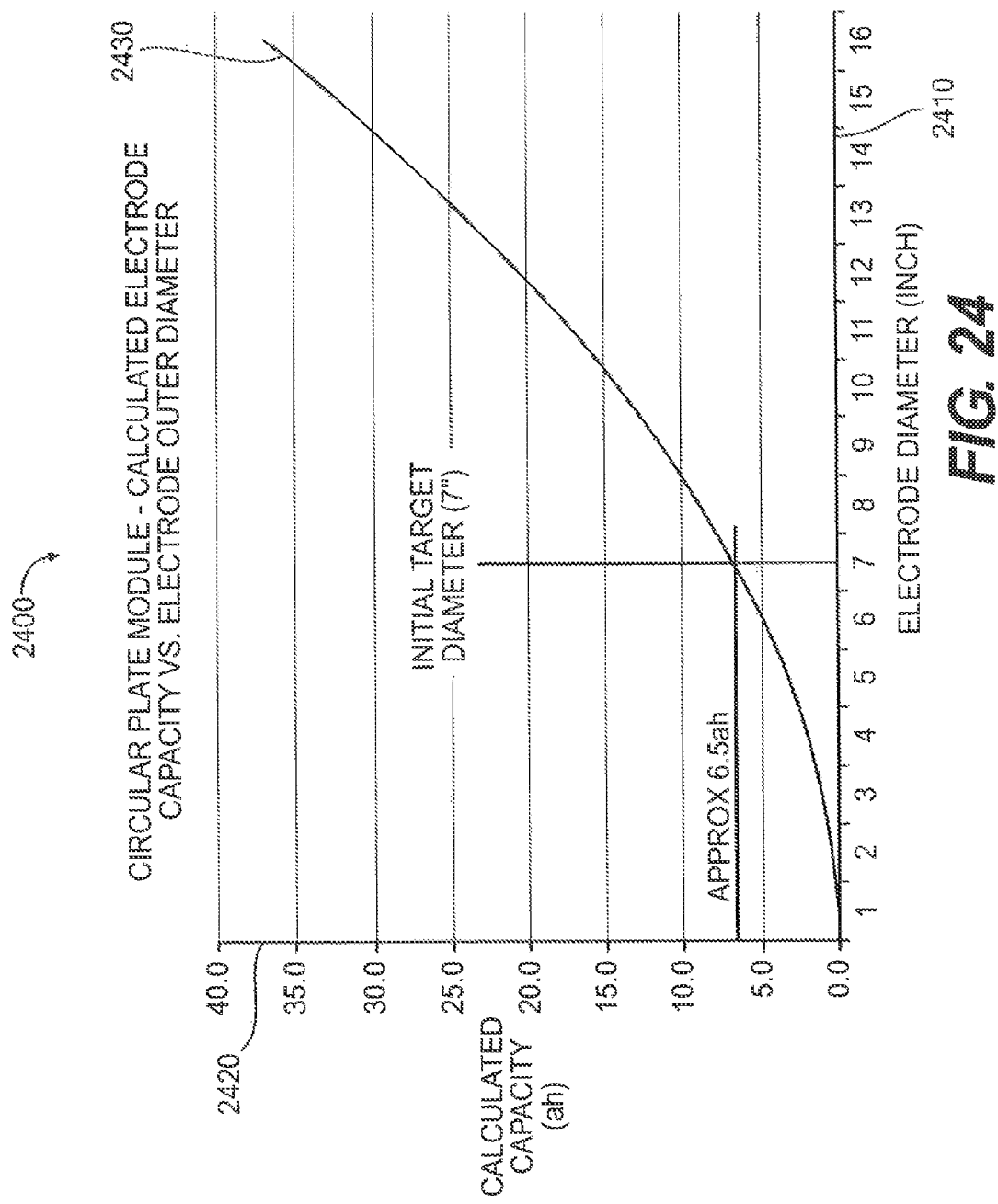
FIG. 24 shows the behavior of calculated capacity of circular plate modules as a function of the diameter of the circular plates, in accordance with some embodiments.

FIG. 24 shows the behavior of calculated capacity of circular plate modules as a function of the diameter of the circular plates, in accordance with some embodiments. FIG. 24 depicts graph 2400 in which abscissa 2410 lists the electrode diameter in inches and ordinate 2420 lists the corresponding calculated capacity in Ampere Hours (ah). The curve 2430 shows the calculated values for the capacity as a function of the diameter. In particular, curve 2430 shows that increasing the diameter of the plates causes the calculated capacity to increase in a non-linear manner. Moreover, curve 2430 shows that, in one embodiment, the electrode diameter is set to seven inches and the capacity of the module is around 6.5 ah.

Figure 25:
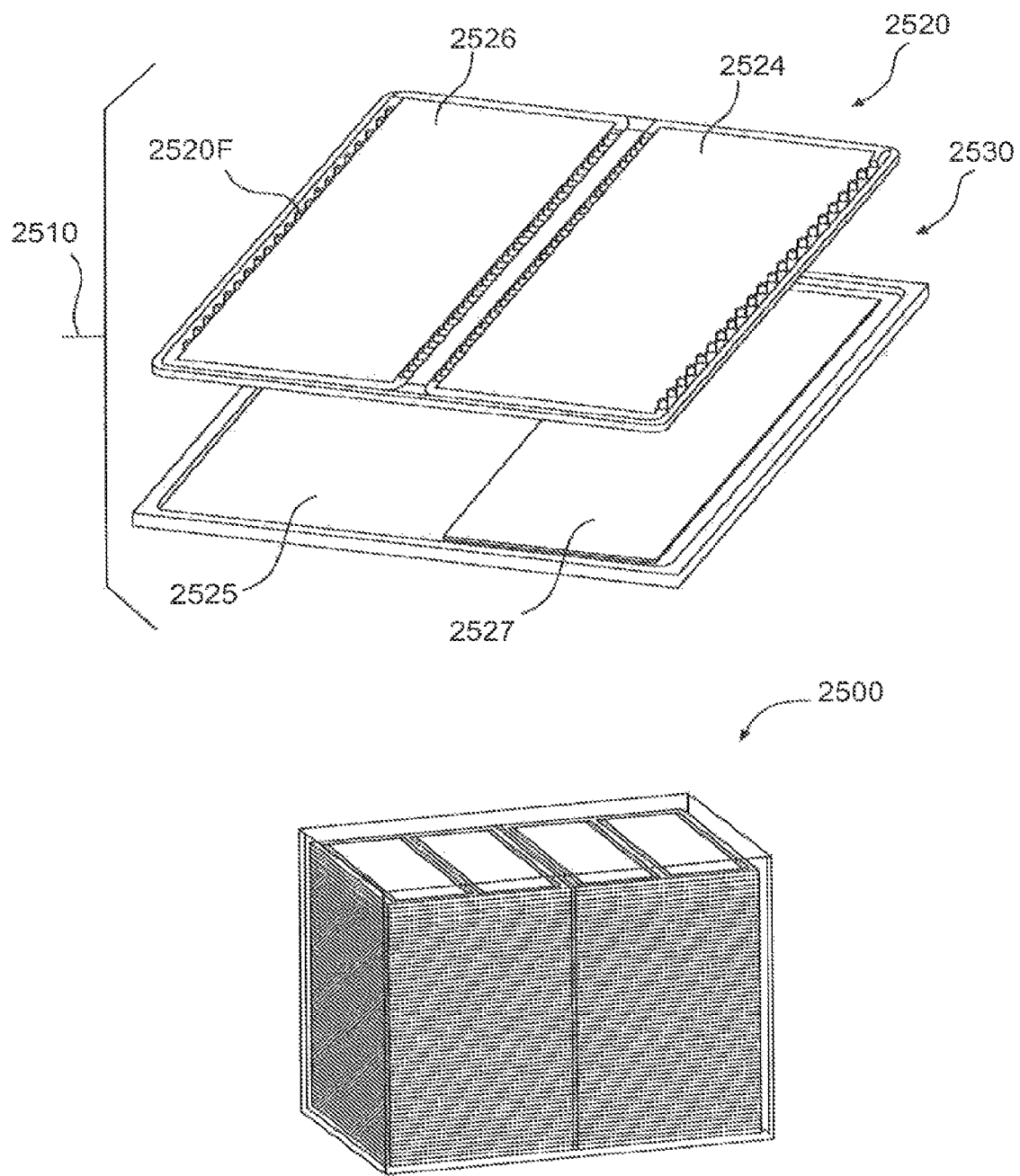
FIG. 25 shows a battery shaped as a rectangular box in accordance with some embodiments.

In some embodiments, a battery module is made of plates that have non-circular shapes. FIG. 25 shows a battery 2500 shaped as a rectangular box (rectangular prism) in accordance with some embodiments. Battery 2500 includes one or more rectangular plates 2510. In some embodiments, rectangular plate 2510 includes a rectangular active module 2520 and a rectangular nest module 2530.

Rectangular active module 2520 fits inside rectangular nest module 2530. Rectangular active module 2520 includes a rectangular frame 2520F that houses a rectangular negative half layer 2524 and a rectangular positive half layer 2526. Rectangular nest module 2530, on the other hand, contains a rectangular isolator 2525 and a rectangular separator 2527.

In various embodiments, two different frames thus comprise one layer of the battery module, in a manner similar to that shown in FIG. 25. A first frame contains two active half layers including two different types of active materials. The second frame has the same shape as the first frame and includes a separator or an isolator, or both. In various embodiments, these two types of frames are manufactured separately and are then put together to create one layer of a battery module. Multiple layers are then assembled to create the battery module. In some embodiments, when assembling the layers, each layer is rotated with respect to the layer below or above it, such that the negative and positive half layers of neighboring layers face each other.

Figure 26A:
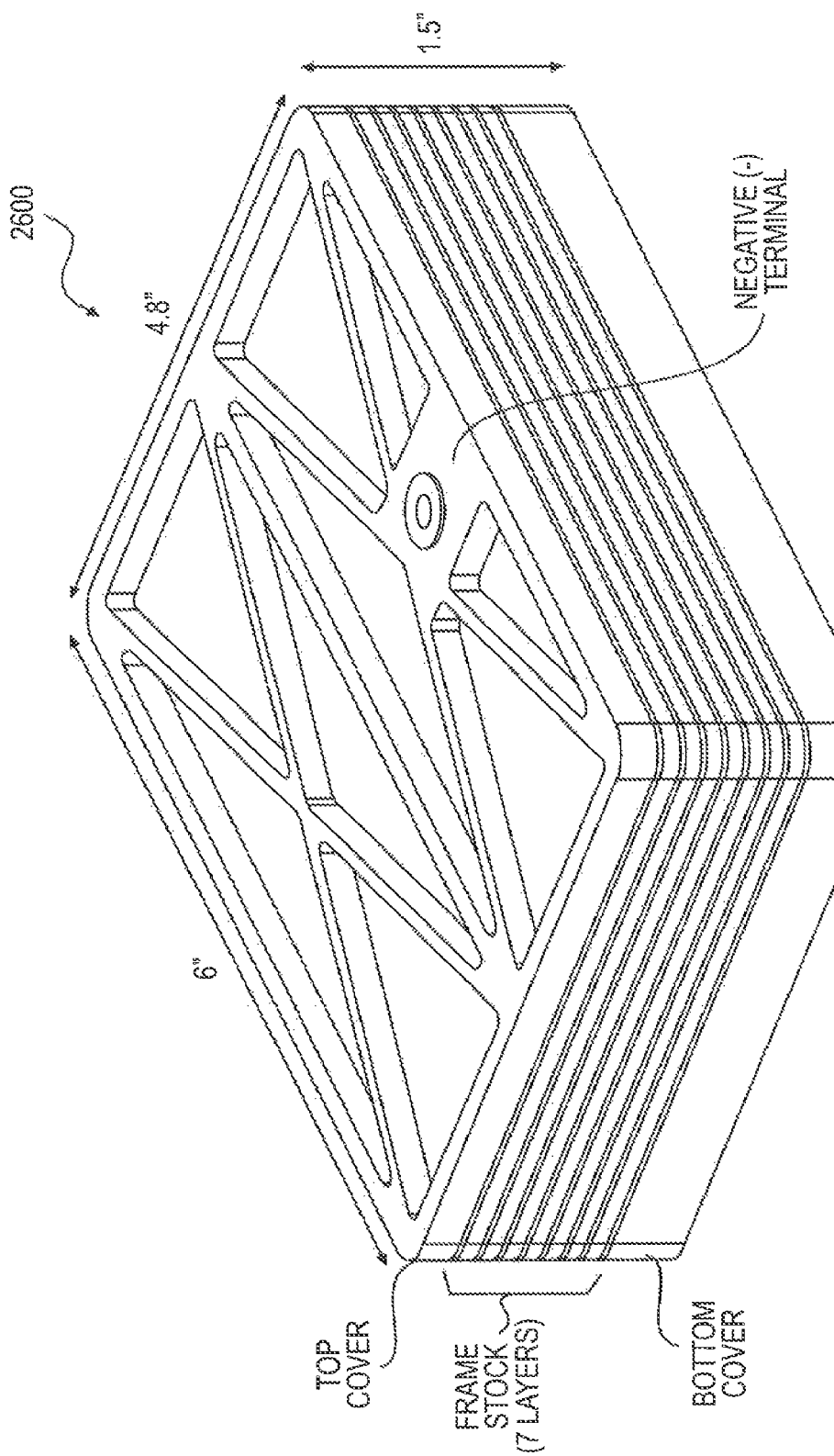

In some embodiments, a number of rectangular layers are assembled to form a rectangular module with a desired output voltage. FIGS. 26A and 26B show a 12 volt rectangular module 2600 in assembled and disassembled forms according to some embodiments. As shown in FIG. 26B, rectangular module 2600 includes a top layer 2610, five current repeating frames 2630, and a bottom layer 2650. Top layer 2610 includes a top cover 2610C and an upper half-electrode frame 2620. Bottom layer 2650 includes a bottom cover 2650C and a lower half-electrode frame 2640. In the embodiment shown in FIGS. 26A and 26B, upper half electrode frame 2620 includes a negative half layer and lower half electrode frame 2640 includes a positive half layer, similar to positive and negative half layers discussed above. In various embodiments, module 2600 can be oriented and used differently such that, for example, the negative and positive half layers are respectively positioned at the bottom and at the top, or in any other orientation.

Figure 26C:
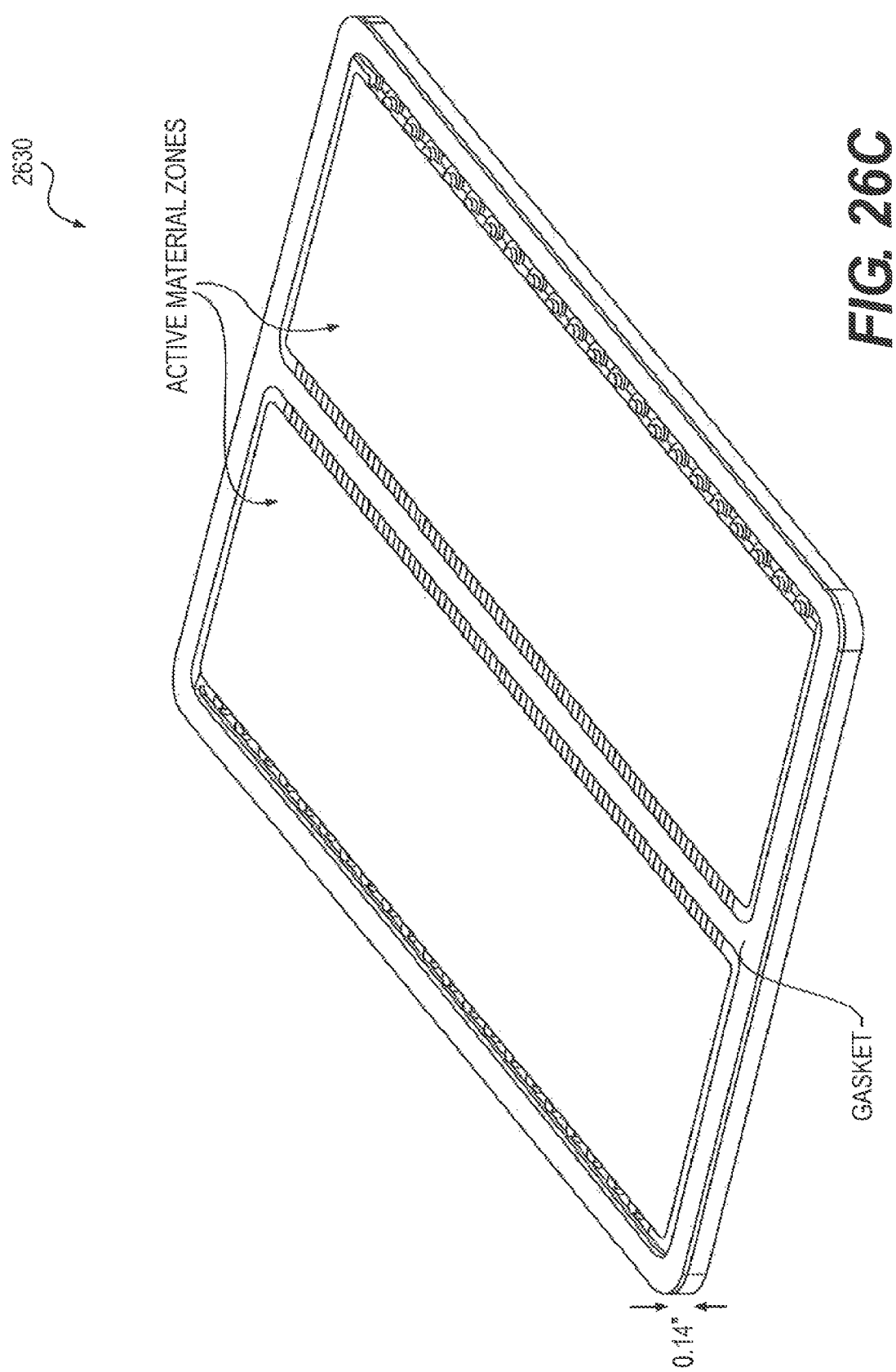
Figure 26D:
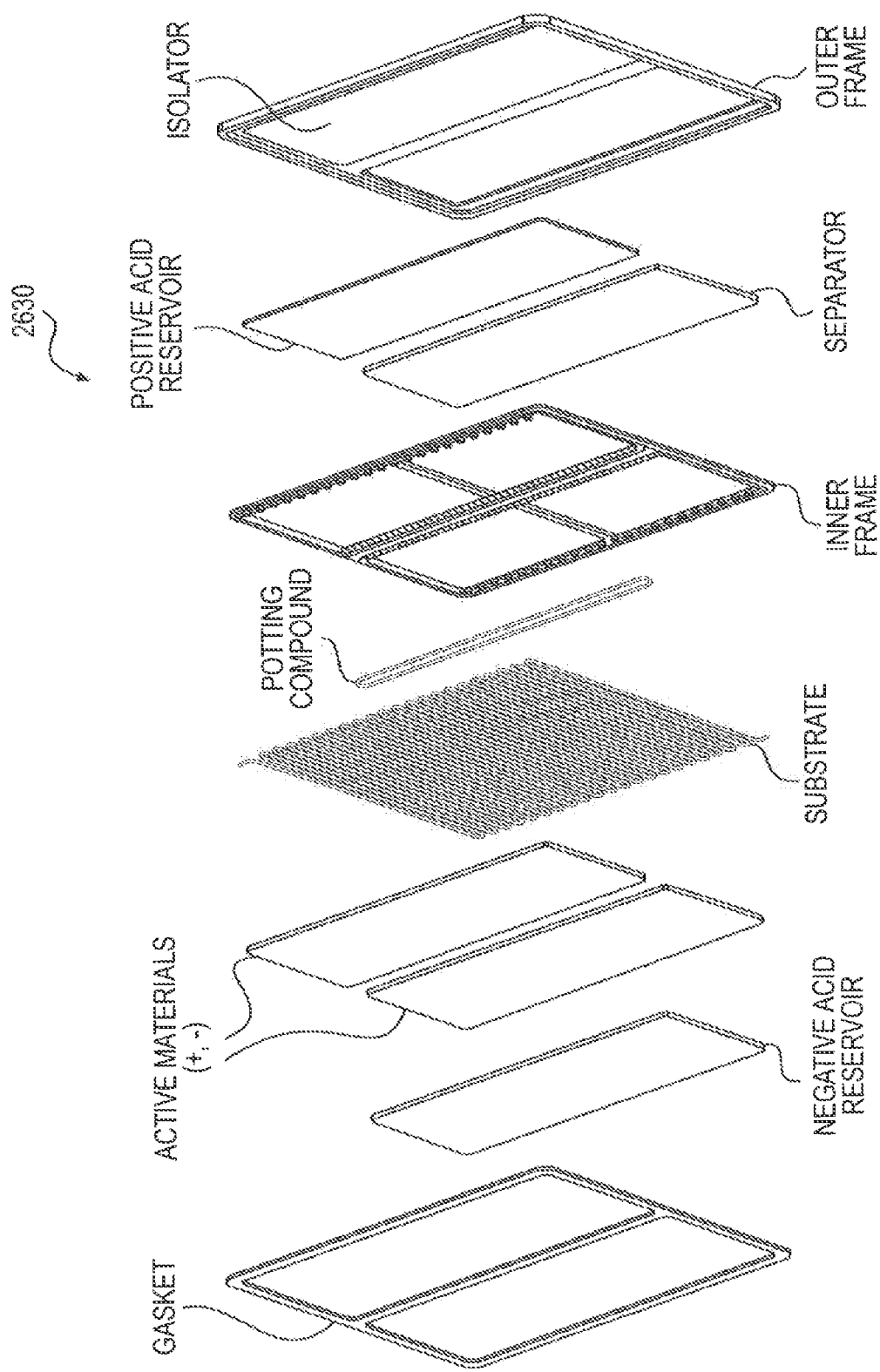
Figure 26F:
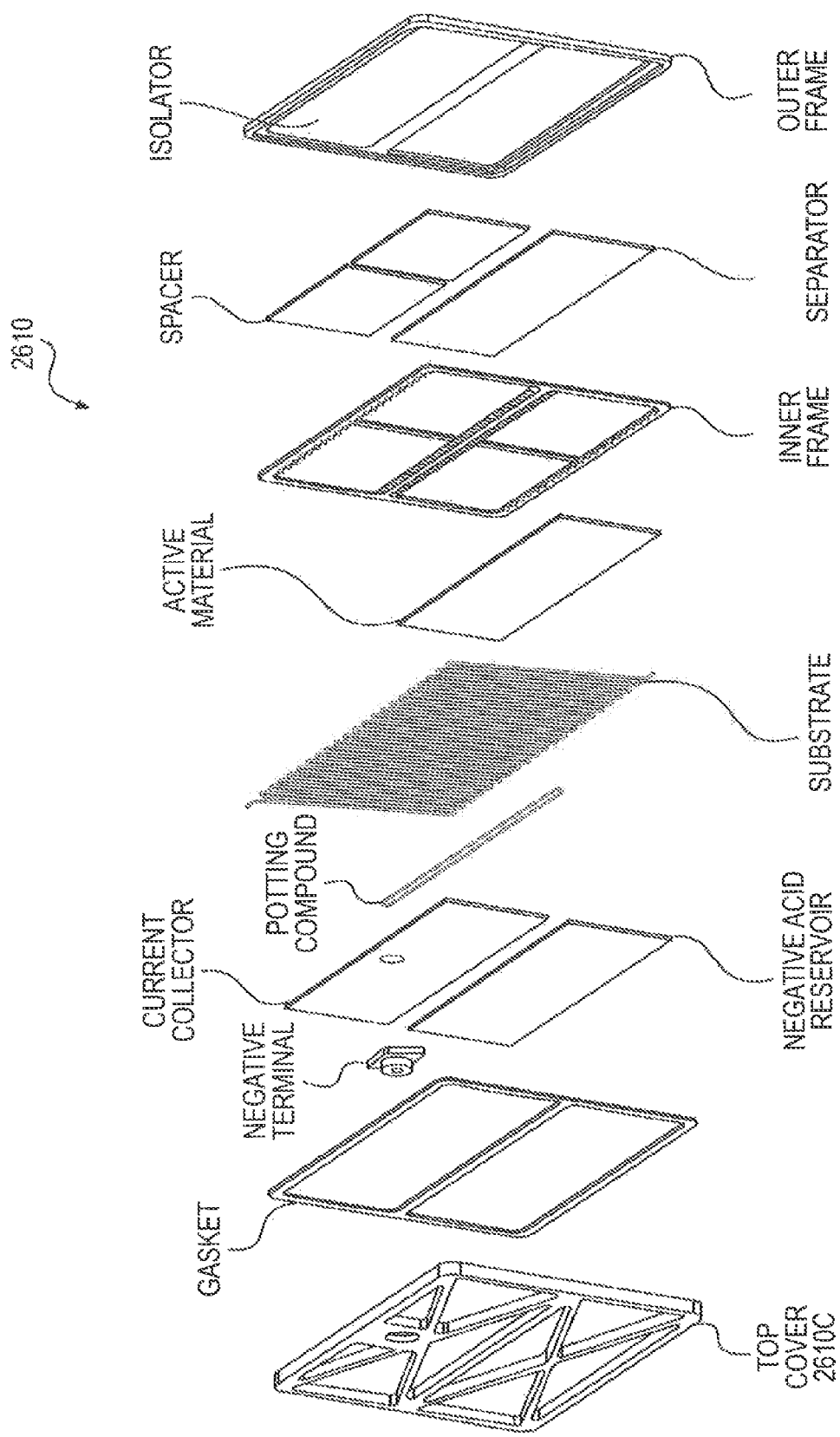

FIGS. 26C and 26D respectively show assembled and disassembled views of center repeating frame 2630 of module 2600 according to some embodiments. As shown in FIGS. 26C and 26D, current repeating frame 2630 includes a gasket, a negative acid reservoir half rectangle, positive and negative active material half rectangles, a wire substrate, a potting compound, an inner frame, a separator half rectangle, a positive acid reservoir half rectangle, and an outer frame that includes an isolator half rectangle. These parts generally function in a manner similar to the parts of layer electrodes discussed above. In particular, in some embodiments, negative and positive acid reservoir half rectangles are made of thin separator material. In the embodiment shown in FIG. 26D, negative and positive acid reservoirs respectively cover negative and positive active material half rectangles from above or below, and each function as a reservoir of acid for the corresponding active material half rectangle. In some embodiments the gasket is made of EPDM rubber, other embodiments include Viton or similar elastomers, and acts as a washer between a center repeating frame and the one above it. The inner frame is made of a suitable acid resistant plastic and functions as a general frame for the active material, the wire substrate, the acid reservoirs, and other parts. The potting compound is a curable epoxy compound and functions as a barrier for acid migration between positive and negative active material FIGS. 26E and 26F respectively show assembled and disassembled views of top layer 2610 of module 2600 according to some embodiments. Top layer 2610 includes top cover 2610C and upper half-electrode frame 2620. FIG. 26F also shows, in accordance with some embodiments, different parts of upper half-electrode frame 2620 which include a gasket, a negative terminal, a current collector, a negative acid reservoir half rectangle, a potting compound, a wire substrate, an active material half rectangle that is negative, a separator half rectangle, a spacer half rectangle, and an outer frame that includes a separator half rectangle. The current collector is made of a lead metal sheet and collects current from the active material and delivers it to the negative terminal. The spacer half rectangle is made of EPDM rubber or similar acid resistant elastomer and compensates for thickness difference between the substrate and isolator components.

Figure 26G:
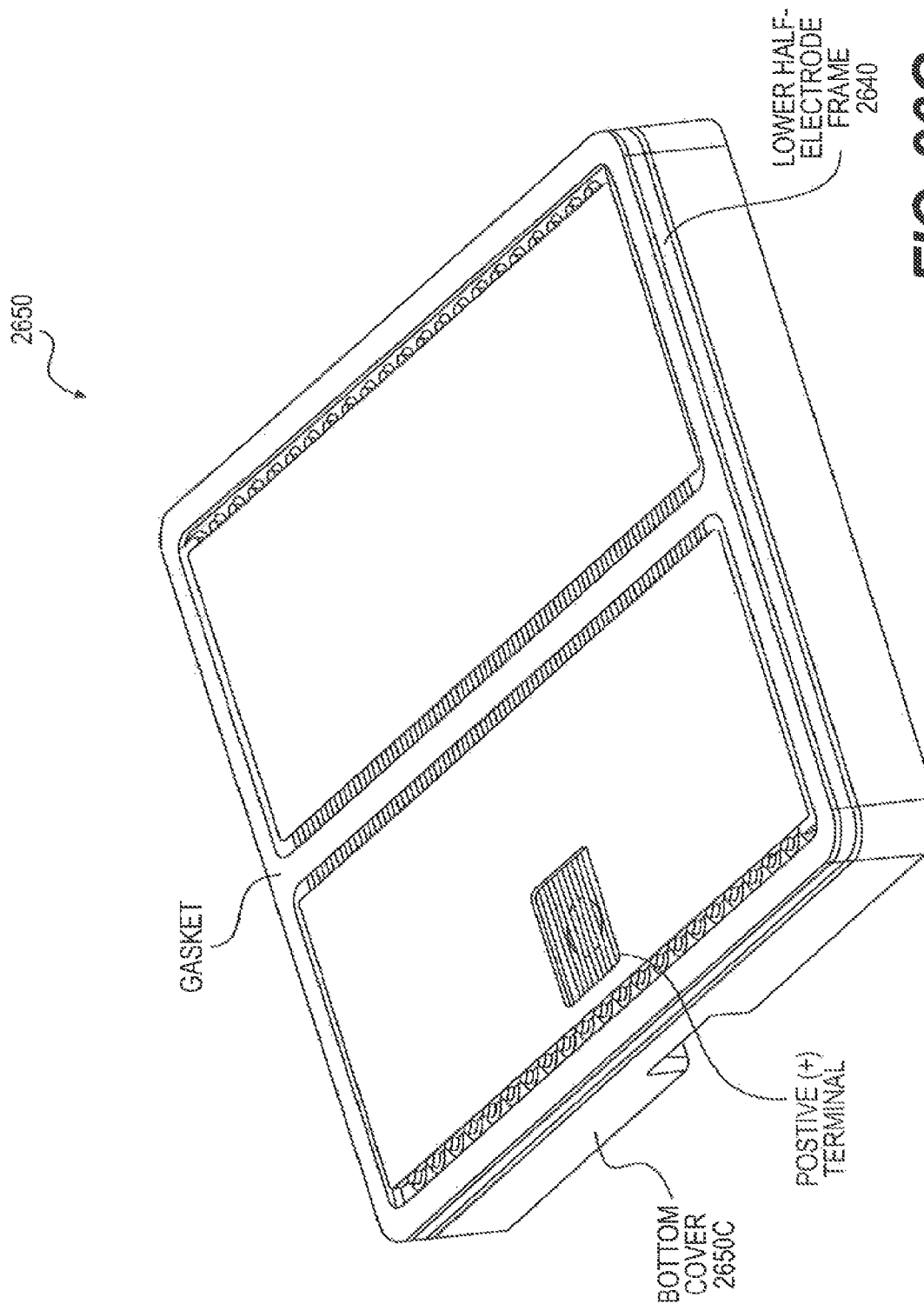
Figure 26H:
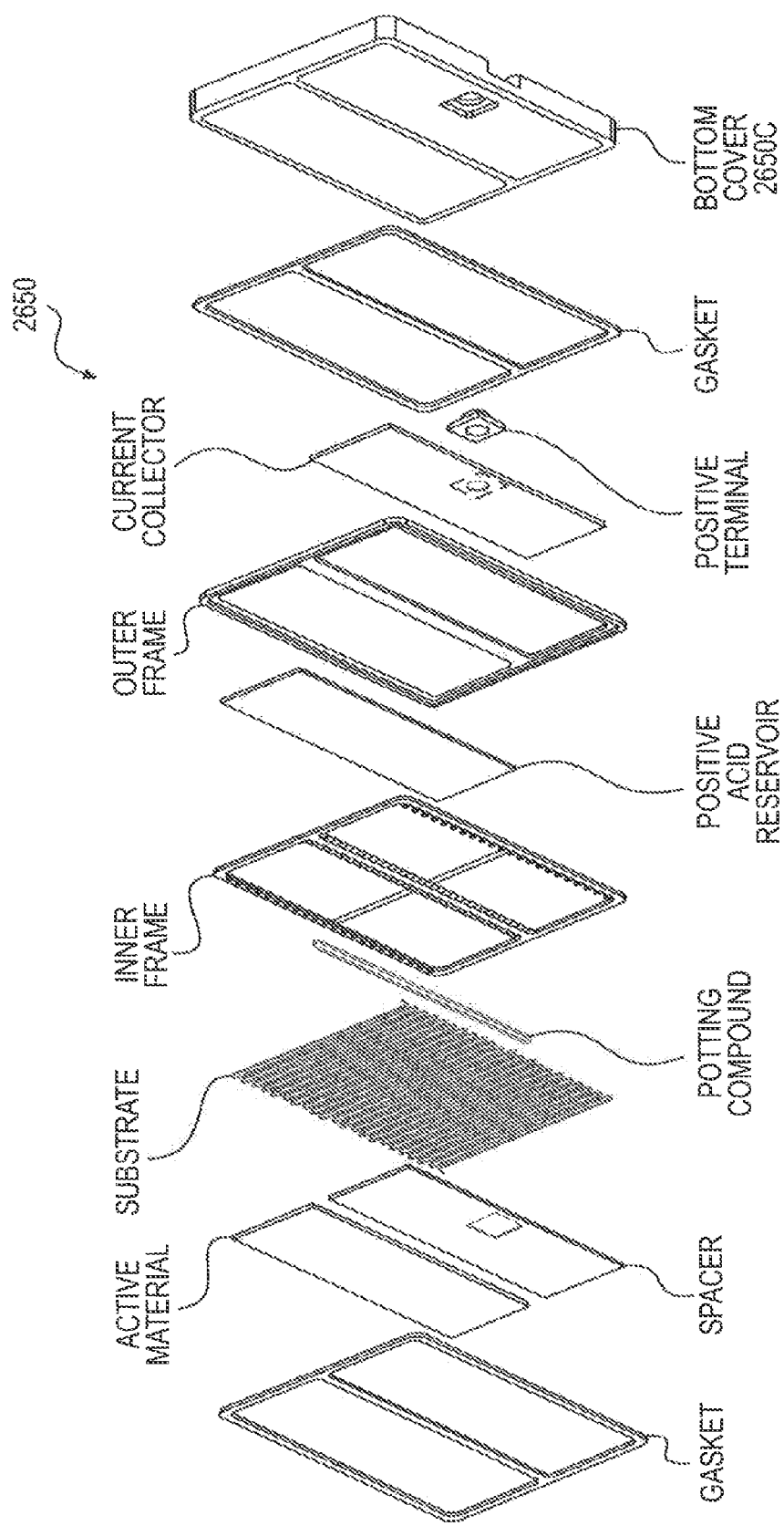

FIGS. 26G and 26H respectively show assembled and disassembled views of bottom layer 2650 of module 2600 according to some embodiments. Bottom layer 2650 includes bottom cover 2650C and lower half-electrode frame 2640. FIG. 26H also shows, in accordance with some embodiments, different parts of lower half-electrode frame 2640 which include a gasket, an active material half rectangle that is positive, a spacer, a wire substrate, a potting compound, an inner frame, an acid reservoir for positive plate, an outer frame that includes an isolator half rectangle, a current collector, a positive terminal, and a second gasket.

Figure 27A:
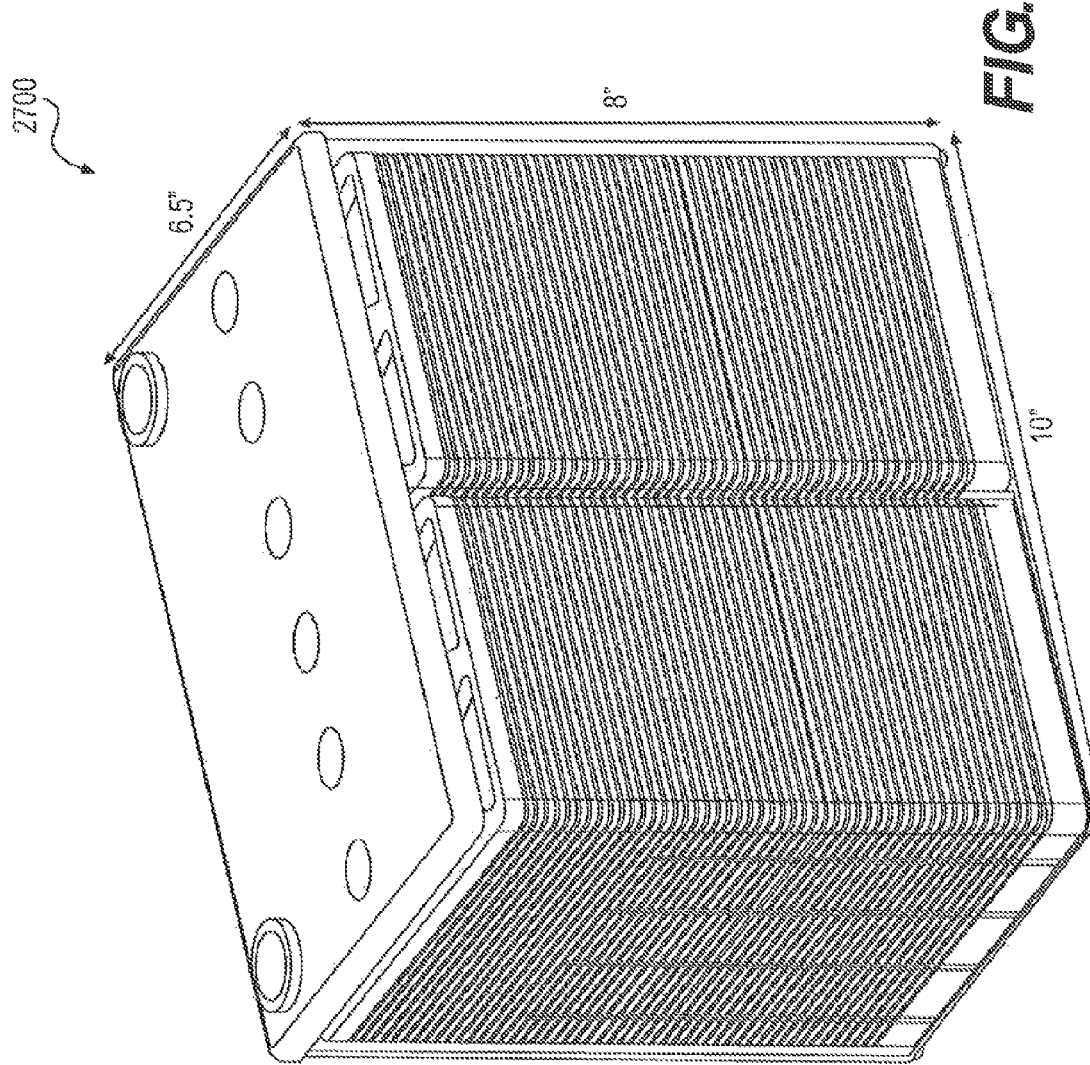

Various embodiments combine a larger number of rectangular frames to create rectangular modules with a larger output. FIGS. 27A and 27B show a 192 volt rectangular module 2700 according to one embodiment. Rectangular module 2700 includes a lid 2710, positive bus 2722 and negative bus 2724, two electrode stacks 2730, center bus 2740, and case 2750. In this embodiment the center bus connects the lower terminal of stacks 2730 together in a series electrical connection.

Some embodiments use a spiral configuration of unit cells. In some embodiments, the spiral configuration provides a multi-helix current path through the electrode stack. FIGS. 28A-D show a circular spiral module 2800 according to some embodiments. Circular spiral module 2800 includes a plurality of partial modules 2810 assembled in a spiraling manner, as described below in more detail.

Figure 28A:
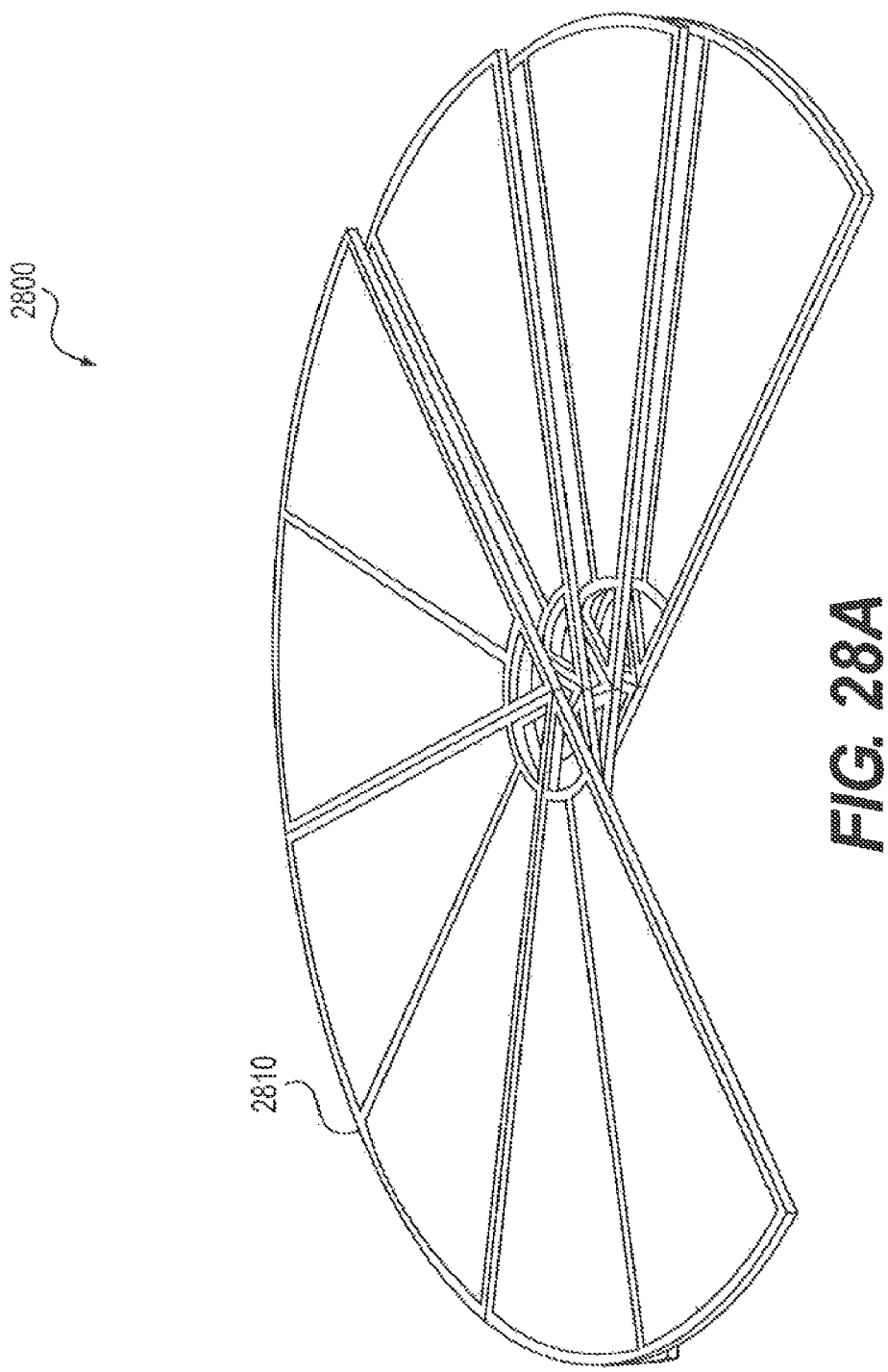
Figure 28B:
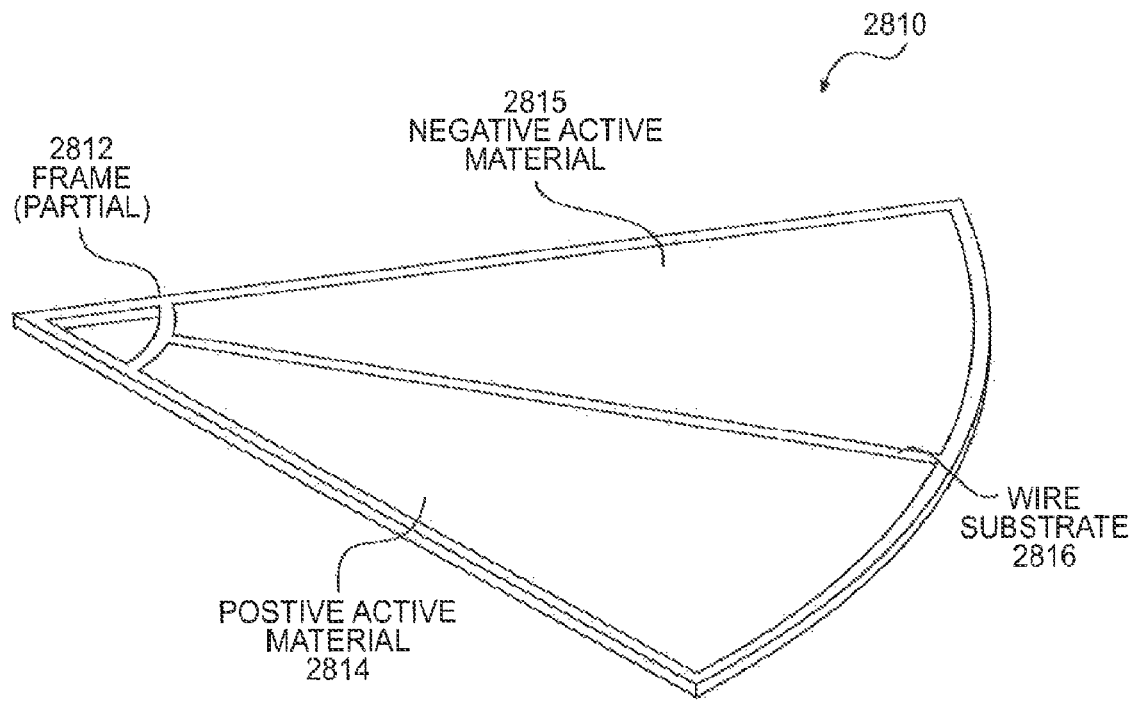
Figure 28C:
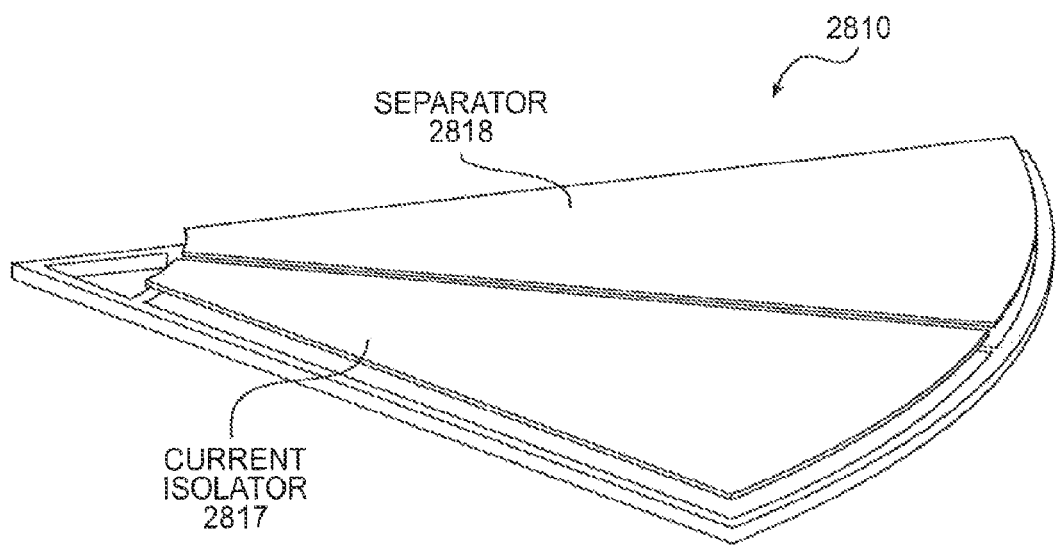

FIGS. 28B and 28C show details of partial module 2810 according to some embodiments. Partial module 2810 is shaped as a sector of a circle. In the embodiment shown in FIGS. 28A-D, partial module 2810 is shaped as a 60 degree angle sector including two 30 degree half sectors with positive and negative active materials.

FIGS. 28B and 28C show various parts of partial module 2810. Partial module 2810 includes frame 2812, positive and negative active material half sectors 2814 and 2815, wire substrate 2816, isolator half sector 2817, and separator half sector 2818. The negative and positive active materials, the isolator, and the separator function in a manner similar to that explained above in circular plate module 1900 or other similar modules.

FIGS. 28A and 28D show the stacking of multiple partial modules 2810 to form circular spiral module 2800, according to some embodiments. In particular, as shown in FIG. 28D, circular spiral module 2800 includes five partial modules 2810-1 to 2810-5. The partial modules are stacked in a spiral manner so that the negative half sector of a partial module is located underneath and connected ionically to the positive half sector of the partial module above it. For example, the negative half sector of partial module 2810-1 is located underneath and connected ionically via a separator to the positive half sector of partial module 2810-2. Similarly, the negative half sector of partial module 2810-2 is located underneath and connected ionically via a separator to the positive half sector of partial module 2810-3, and so on.

In this manner, a set of partial modules 2810 form a group of unit cells connected in series. In particular, each unit cell includes the negative half sector of partial module 2810-*i*, the positive half sector of the partial module 2810-*i*+1 located above the negative half sector, and the separator between these two half sectors. Each unit cell, thus formed, is connected in series with the cells before or after it by the trans-electrode substrates 2816. For example, one unit cell forms between the negative half sector of partial module 2810-1 and the positive half sector of partial module 2810-2 located above it. This unit cell is connected serially to the unit cell before and after it respectively by the trans-electrode substrate 2816 in partial modules 2810-1 and 2810-2.

In FIG. 28D, the arrows show the direction of the electrons transferred inside and among these serially connected unit cells. In particular, each horizontal arrow shows the conductive transfer of charge from one unit cell to the next one, that is, from the positive half sector of each partial module 2810-*i* to the negative half sector of the same partial module through the trans-electrode substrate of that partial module. Each vertical arrow, on the other hand, shows the ionic transfer of current within each unit cell, that is, from the negative half sector of a partial module 2810-*i* to the positive half sector of the next partial module 2810-*i*+1 positioned above the negative half sector through the separator inserted between them. Thus, partial modules 2810-1 to 2810-5 form a serially connected set of four unit cells and two half sectors at the start and the end. Some embodiments include a gasket which prevents internal shorting or electrolyte loss. In some embodiments a gasket prevents electrolyte loss in a manner similar to that explained above in circular plate module 1900 or other similar modules. In FIG. 28C, for example, internal shorting is mitigated by the current isolator 2817.

Figure 29A:
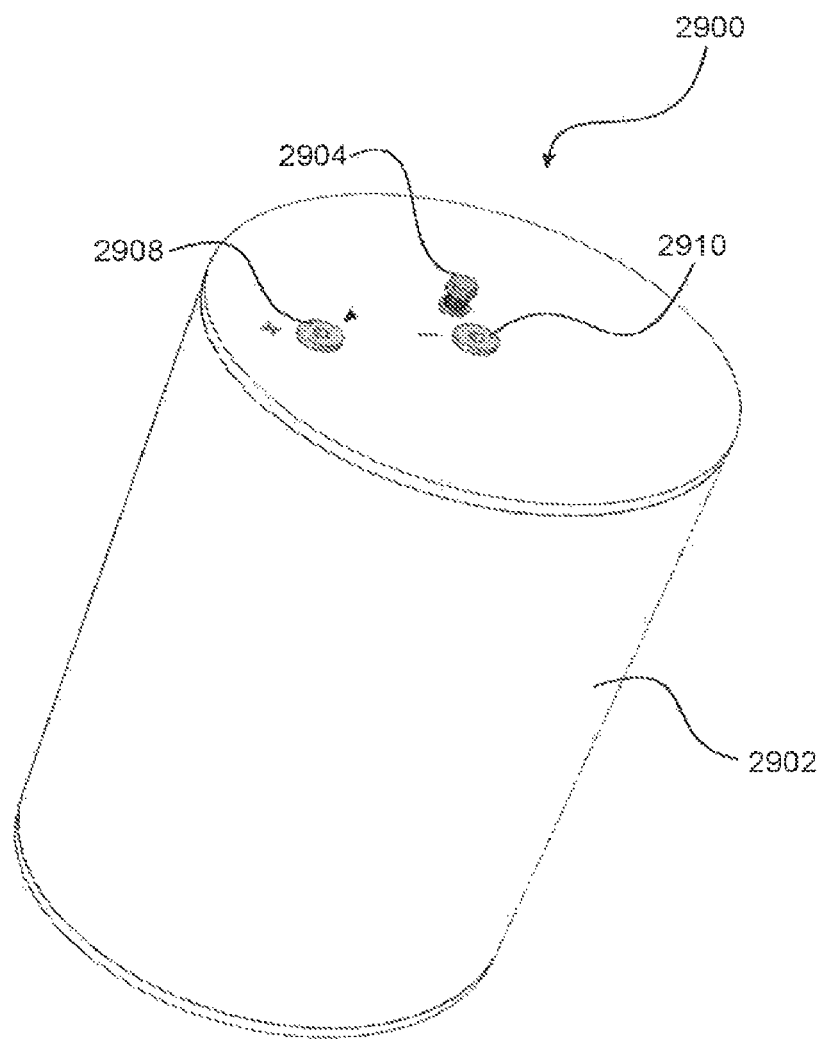
FIGS. 29A-29E show spiral wound modules according to various embodiments.
Figure 29B:
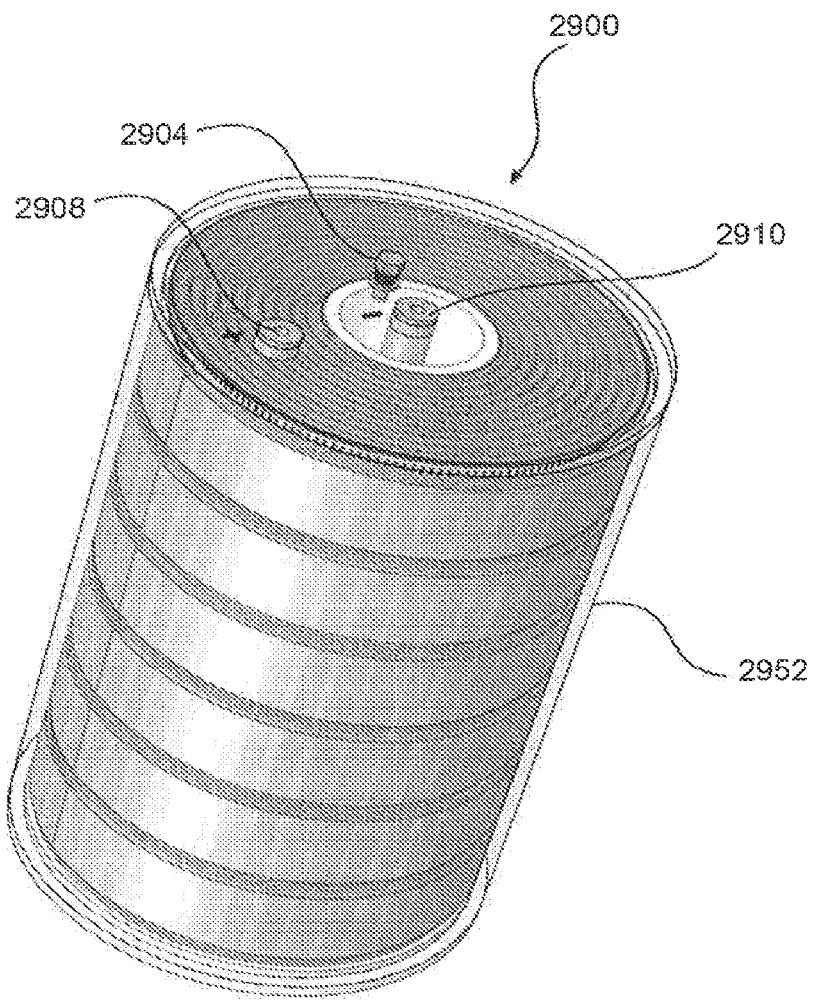
Figure 29C:
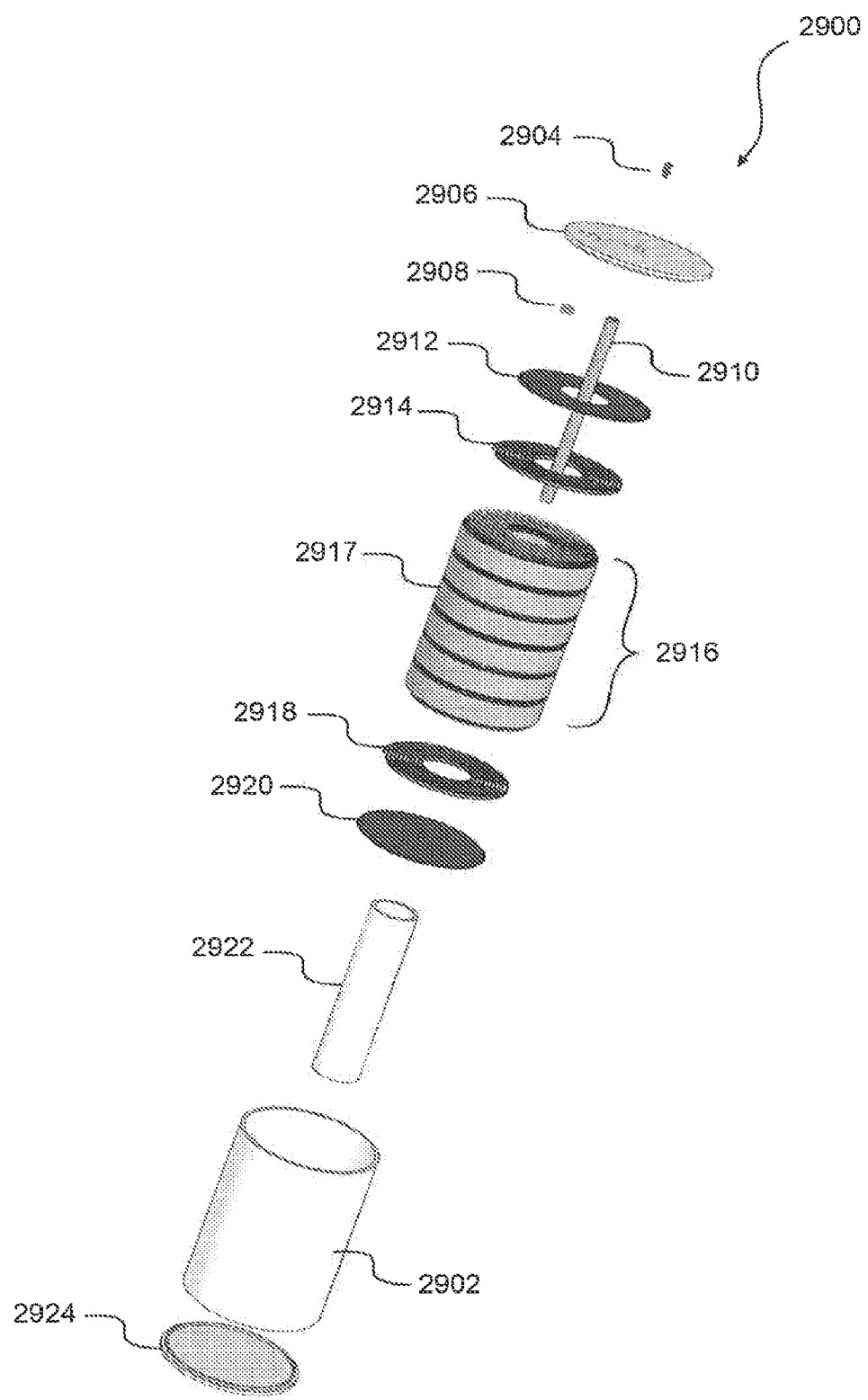

In some embodiments an electro-chemical battery module is a cylindrical spiral wound module. The cylindrical spiral wound module utilizes an alternative form factor and an alternative manufacturing method. In some embodiments, the module is built by winding long strip electrodes of mono- and bipole configurations around a center mandrel to create cylindrical cells for the module. Adjacent cells are connected in electrical series to one another through wire substrates. The cells are housed in a cylindrical, pressure tight case. Cylindrical spiral wound modules, thus built, have fewer parts, higher volumetric efficiency, and higher vibration and pressure resistance compared to their counterparts, FIGS. 29A-29C show spiral wound modules 2900 according to various embodiments. In particular, FIG. 29A shows an external view, FIG. 29B shows a view of the internal assembled parts, and FIG. 29C shows an exploded view of the parts of spiral wound module 2900 according to various embodiments.

Spiral wound module 2900 includes a module case 2902, a case vent 2904, a top cover 2906, a positive terminal 2908, a negative terminal 2910, a positive current collector 2912, a positive half-electrode substrate termination strip 2914, a cylindrical cell pack 2916, a negative half-electrode substrate termination strip 2918, a negative current collector 2920, a center mandrel 2922, and a bottom cover 2924. In the embodiments shown in FIGS. 29A-29C, cylindrical cell pack 2916 includes six cylindrical cell stacks 2917, connected internally in series via wirings. In some embodiments, each cell stack 2917 provides a two volt potential difference, and thus module 2900 is a twelve volt module.

In various embodiments, positive half-electrode substrate termination strip 2914 electrically joins positive half-electrode end wiring in a common bus along outer edges and allows easy electrical joining of wiring to positive current collector 2912. In various embodiments, positive current collector 2912 is a circular metal plate that electrically joins positive half-electrode termination strip to positive terminal 2908. In some embodiments, positive current collector 2912 is a low resistance, direct line path to the positive terminal. In various embodiments, positive terminal 2908 allows external electrical connection to the module.

Similarly, in various embodiments, negative half-electrode substrate termination strip 2918 electrically joins negative half-electrode end wiring in a common bus along outer edges and allows easy electrical joining of wiring to negative current collector 2920. In various embodiments, negative current collector 2920 is a circular metal plate that electrically joins negative half-electrode termination strip to negative terminal 2910. In some embodiments, negative current collector 2920 is a low resistance, direct line path to the negative terminal. In various embodiments, negative terminal 2910 allows external electrical connection to the module.

Figure 29D:
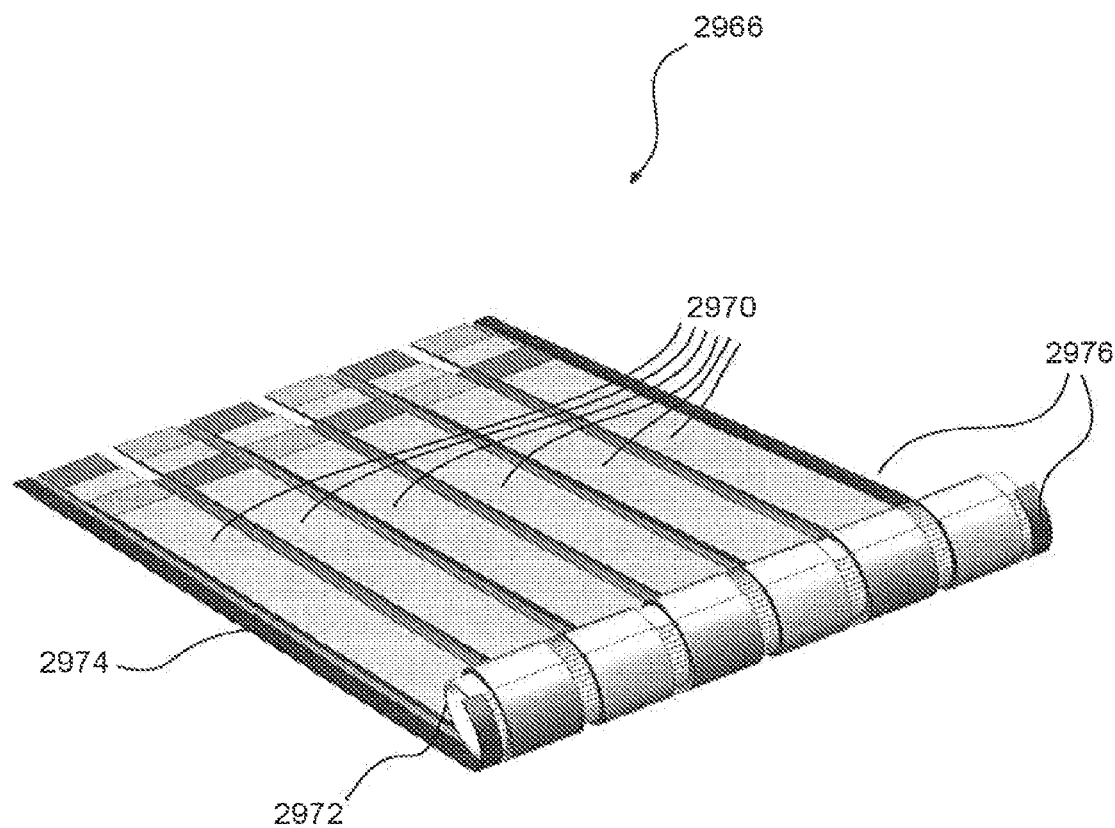
Figure 29E:
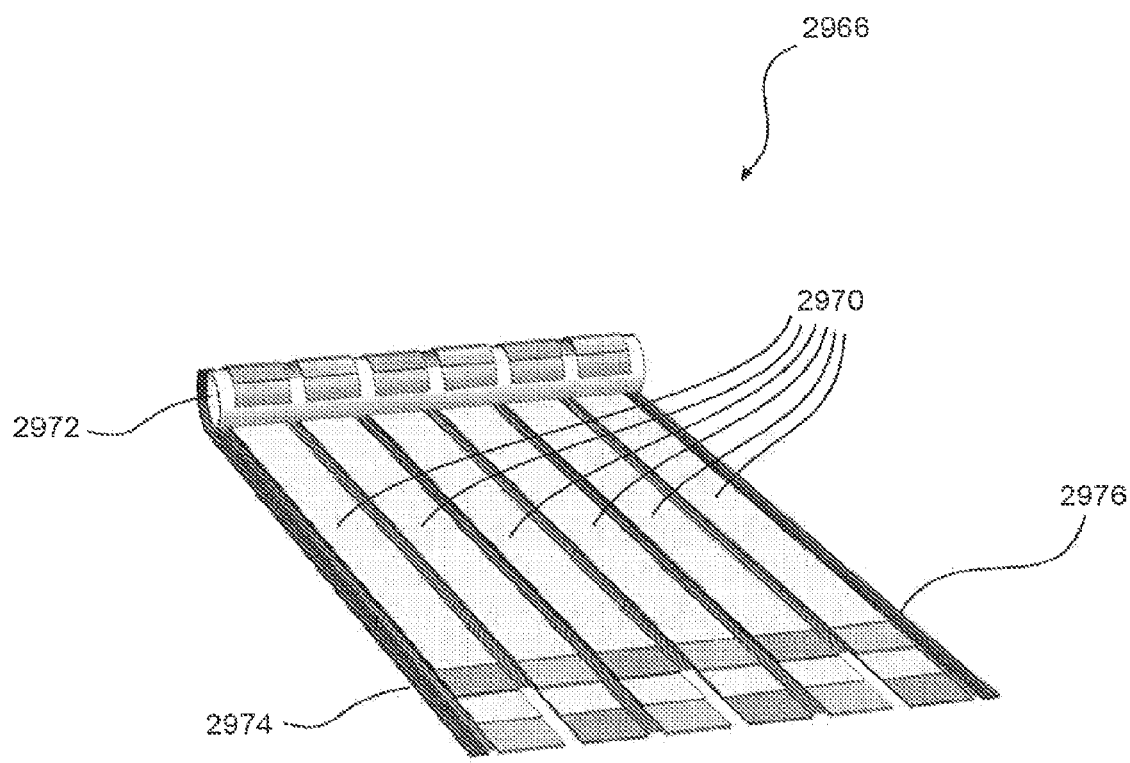

FIGS. 29D and 29E depict an intermediate stage of manufacturing a cylindrical cell pack similar to cylindrical cell pack 2916 according to some embodiments. FIGS. 29D and 29E each show two different views of a flat cell pack 2966 while being rolled into a cylindrical cell pack. Flat cell pack 2966 includes six flat cell stacks 2970 and a center mandrel 2972. At the stage shown in FIGS. 29D and 29E, each cell stack 2970 is a flat elongated strip. In the embodiment shown in FIGS. 29D and 29E, each cell stack 2970 includes four layers as described in more detail in relation to FIG. 30A. In particular, each cell stack 2970 includes alternating layers of electrodes and separators. The ends of those layers are staggered in FIGS. 29D and 29E for illustration purposes. Some of neighboring layers of the cell stacks are connected via wirings, as detailed below.

FIGS. 29D and 29E depict a starting stage of rolling flat cell stacks 2970 around center mandrel 2972 to build a cylindrical cell pack. FIGS. 29D and 29E also show positive and negative half electrode termination strips 2974 and 2976 in their flat configuration, and while being rolled around center mandrel 2972. After the completion the rolling, these strips will take the spiral shape of parts 2914 and 2918 in FIG. 29C.

Figure 30A:
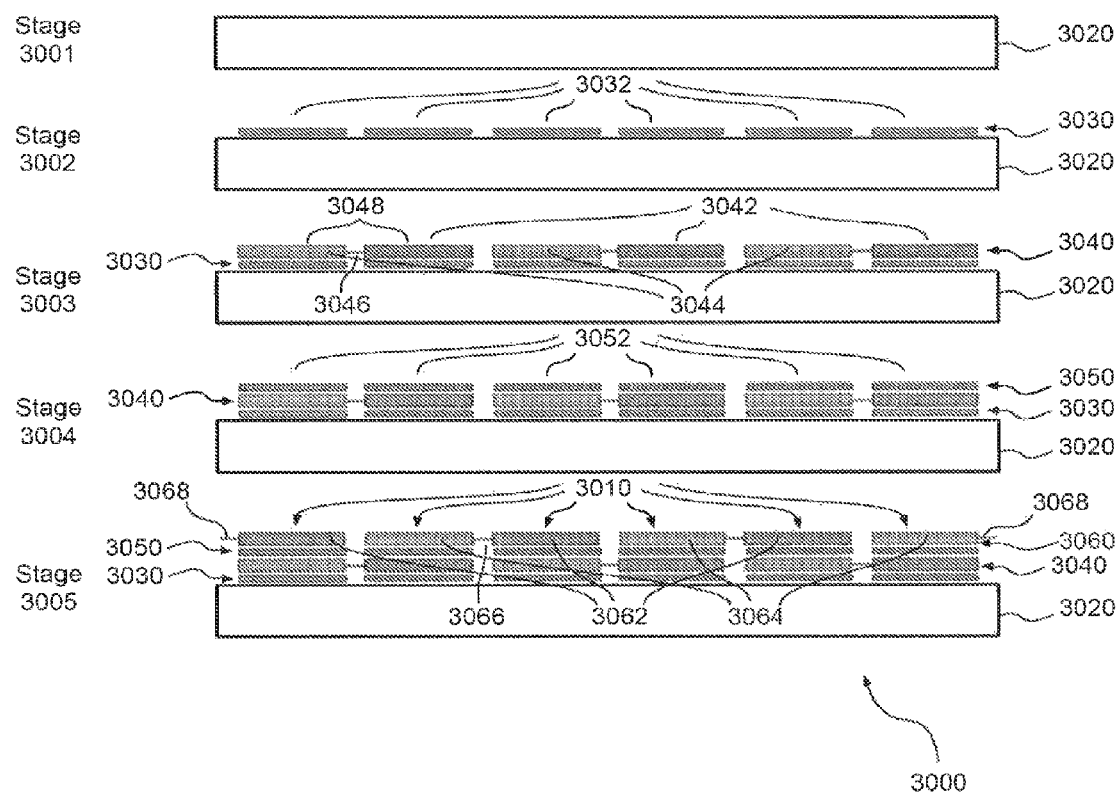
FIG. 30A shows a cross section of a spiral wound module according to some embodiments.

In some embodiments, center mandrel 2972 is a cylindrical tube, made of a sulfuric acid-resistant plastic. In some embodiments the material of center mandrel is similar to the material of the module case. In various embodiments, the electrodes are wound around the center mandrel. In various embodiments, center mandrel 2972 thus supports the electrode assembly. FIG. 30A is a 2D sketch showing full- and half-electrode arrangement on the mandrel prior to winding.

FIG. 30A shows a cross section of a spiral wound module upon performing one roll of winding the cell stacks around the central mandrel. A sequence of images 3001-3005 are used to show details of a cell pack 3000 according to some embodiments. In particular, the full cell image 3005 shows a cross section of cell pack 3000 that includes layers resulting from winding a flat cell pack such as cell pack 2966 in FIGS. 29D and 29E around a center mandrel 3020 after one full rolling. After being wound for one roll, cell pack 3000 includes six cell stacks 3010. Each rectangle in FIG. 30A represents a cross section of a layer of a cell stack, rolled around center mandrel 3020.

Image 3001 shows a central mandrel 3020. Image 3002, shows a layer of separator layer 3030 formed around central mandrel 3020 upon performing one roll of winding the cell stacks around the central mandrel. Separator layer 3030 includes six separator half parts 3032. Each separator half part 3032 corresponds to one of the six cell stacks 3010. In some embodiments, separator layer 3030 is made of absorbent glass mat (AGM). In various embodiments, the separator layer holds electrolytes, such as sulfuric acid and promotes ionic transfer between the positive and negative electrodes of the cell.

Image 3003 shows an electrode layer 3040, formed around separator layer 3030 upon performing one roll of winding the cell stacks around the central mandrel. Electrode layer 3040 includes three negative half electrodes 3042 and three positive half electrodes 3044, laid over the six separator half parts 3032 in alternating order. In particular (assuming that in stage 3003 of FIG. 30A the six half electrodes in electrode layer 3040 are numbered from left to right) first, third, and fifth half electrodes are positive half electrodes 3044; and second, fourth, and sixth half electrodes are negative half electrodes 3042.

The three consecutive neighboring pairs of negative and positive half electrodes are connected via three wirings. That is, as shown in image 3003, three pairs respectively consisting of the first and second half electrodes, the third and fourth half electrodes, and the fifth and sixth half electrodes are each connected via a wiring 3046 (of which, in FIG. 30A, all wirings are shown and only the first wiring has been labeled). Each such connected pair forms a bipole electrode 3048 (of which, in FIG. 30A, only the first one has been labeled). Electrode layer 3040, therefore, includes three bipole electrodes 3048.

Image 3004 shows a second separator layer 3050 that is formed around electrode layer 3040 upon performing one roll of winding the cell stacks around the central mandrel. Separator layer 3050 includes six separator half parts 3052. Each separator half part 3052 corresponds to one of the six cell stacks 3010.

Image 3005 shows a second electrode layer 3060 that is formed around separator layer 3050 upon performing one roll of winding the cell stacks around the central mandrel. Electrode layer 3060 includes three negative half electrodes 3062, and three positive half electrodes 3064, laid over the six separator half parts 3052, in an alternating order that is a reverse of the order in electrode layer 3040. That is, each negative half electrode 3062 is laid over a separator half part 3052 that is itself laid over a positive half electrode 3044. Conversely, each positive half electrode 3064 is laid over a separator half part 3052 that is itself laid over a negative half layers 3042. Therefore, as shown in image 3005 of FIG. 30A (assuming that the six half electrodes of electrode layer 3060 are numbered from left to right) first, third, and fifth half electrodes are negative half electrodes 3062; and second, fourth, and sixth half electrodes are positive half electrodes 3064.

Image 3005 shows two bipole electrodes that are formed via two wirings 3066. In particular, a first bipole electrode is formed by connecting the second and third half electrodes via wiring 3066 (which is shown and labeled in stage 3005 of FIG. 30A). Further, a second bipole electrode is formed by connecting the fourth and fifth half electrodes via wiring 3066 (which is shown but not labeled in stage 3005 of FIG. 30A). The first half electrode, which is a negative half electrode 3062, is connected to the outside from left via a terminal wiring 3068. Further, the sixth half electrode, which is a positive half electrode 3064, is connected to the outside from right via another terminal wiring 3068. Electrode layer 3060, therefore, includes from the left a negative half electrode 3062, two bipole electrodes, and a positive half electrode 3064.

Cell pack 3000, as shown in stage 3005 of FIG. 30A, thus includes six cell stacks 3010 rolled around central mandrel 3020. First, third, and fifth cell stacks each include, in order from top to bottom, a negative half electrode 3062, a separator 3052, a positive half electrode 3044, and another separator 3032. Further, second, fourth, and sixth cell stacks each include, in order from top to bottom, a positive half electrode 3064, a separator 3052, a negative half electrode 3042, and another separator 3032. In electrode layer 3040, first and second stacks are connected via a wiring 3046, third and fourth stacks are connected via another wiring 3046, and fifth and sixth stacks are connected via another wiring 3046. In electrode layer 3060, second and third stacks are connected via a wiring 3066, fourth and fifth stacks are connected via another wiring 3066, and first and sixth stacks are each connected to the outside via a terminal wiring 3068.

In some embodiments, the length of cell stacks are such that they are wound further around the central mandrel. Each additional rolling generates another set of cell stacks similar and on top of those shown in FIG. 30A, image 3005.

Figure 30B:
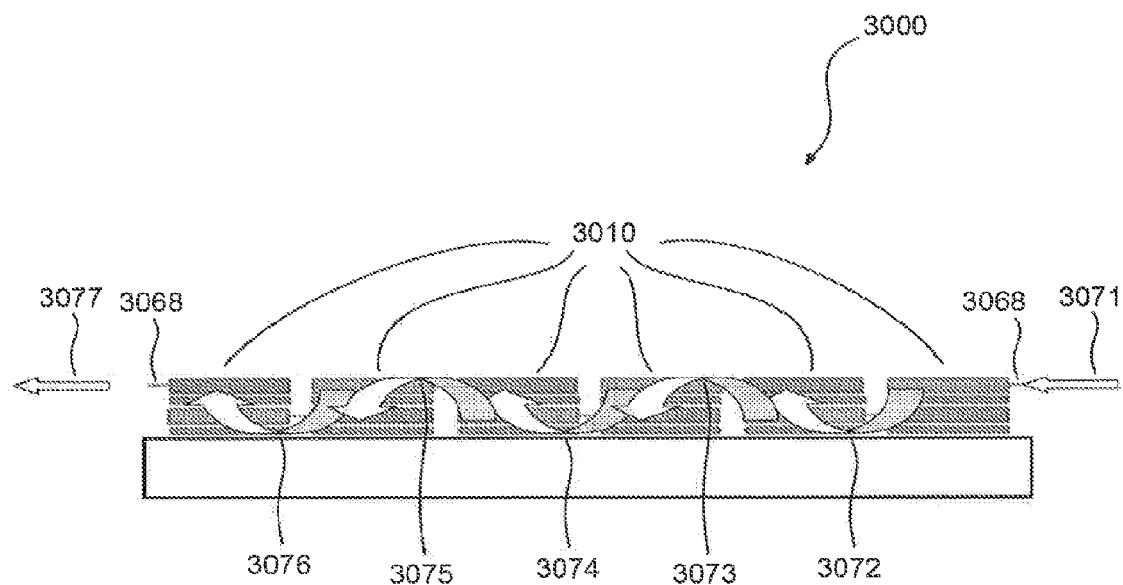
FIG. 30B shows a path of the electron flow through a cell pack according to some embodiments.

FIG. 30B shows a path of the electron flow through cell pack 3000 according to some embodiments. The direction of electron flow is schematically shown by arrows 3071-3077. In particular, arrows 3071 and 3077 indicate entrance and exit of electrons into cell pack 3000, while arrows 3072-3076 depict the flow of electrons within and among cell stacks 3010 in cell pack 300. More specifically, arrow 3071 depicts that electrons enter the positive half electrode 3064 of the sixth stack 3010 through the right hand side terminal wiring 3068.

The electrons flow in each cell stack through a separator and then flow to the neighboring cell stack through a wiring. For example, arrow 3072 depicts that, in the sixth stack 3010, the electrons flow from the positive half electrode 3064 through the separator 3052 to the negative half electrode 3042, and then flow to the positive half electrode 3044 of the fifth stack 3010 through the wiring 3046 that connects the sixth stack to the fifth stack. Arrow 3073, on the other hand, depicts that the electron flow continues in the fifth stack 3010 in which the electrons flow from the positive half electrode 3044 through the separator 3052 to the negative half electrode 3062, and then flow to the positive half electrode 3064 of the fourth stack 3010 through the wiring 3066 that connects the fifth stack to the fourth stack. Arrows 3074 and 3076 electron flow paths in the fourth and second stacks, respectively, in a manner similar to that shown by arrow 3072. Further, arrow 3075 shows an electron flow path in the third stack in a manner similar to that shown by arrow 3073. Finally, arrow 3076 also depicts that, in the first stack, the electrons flow from positive half electrode 3044 through separator 3052 to negative half electrode 3062.

Figure 31:
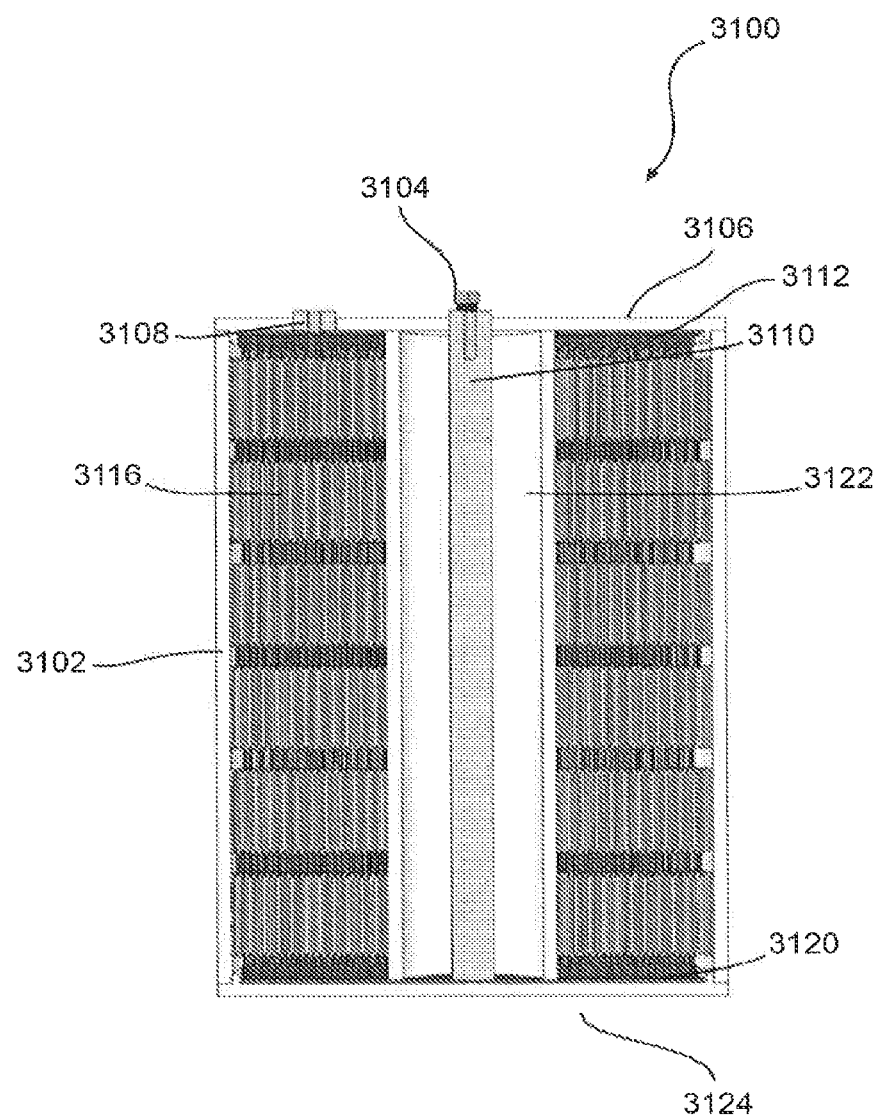
FIG. 31 shows a cross section of a spiral wound module according to some embodiments.

FIG. 31 shows a cross section of a spiral wound module 3100 according to some embodiments. As shown in FIG. 31, module 3100 includes module case 3102, case vent 3104, top cover 3106, positive terminal 3108, negative terminal 3110, positive current collector 3112, six cylindrical cell stacks 3116, negative current collector 3120, central mandrel 3122, and bottom cover 3124. Modules 2900 or 3100 can be used in any direction and terminologies top and bottom is used merely for referencing the figures. Each cell stack 3116 is a cylindrical stack built by rolling flat cell stacks similar to cell stacks 3010 in FIG. 30A. The cross section of each cell stack 3116 includes alternating layers of separators and negative or positive half electrodes, as described above. Moreover, in some embodiments, the outer layer of a cell stack 3116 is a separator layer. In some embodiments, the outer separator is used, among other things, as a reservoir for the cell electrolyte.

In some embodiments, the above-discussed design is used in solid-state batteries, lead acid batteries, fuel cell batteries, or some other types of electrochemical batteries. Other embodiments of the disclosure will be apparent to those skilled in the art from consideration of the specification and practice of the invention disclosed herein. For example, various elements or components of the disclosed embodiments may be combined with other elements or components of other embodiments, as appropriate for the desired application. Thus, it is intended that the specification and examples be considered as exemplary only, with a true scope and spirit of the disclosure being indicated by the following claims.

The invention claimed is:

1. A lead-acid battery, comprising:
   a cylindrical case forming a common gas management cavity, the cylindrical case being sealed;
   a first cell stack comprising a first non-flooded cell in an overlapping spirally wound configuration having ionic transfer therein;
   a second cell stack comprising a second non-flooded cell in an overlapping spirally wound configuration having ionic transfer therein; and
   a conductive substrate comprising a current collector embedded in both an active material of the first cell stack and an active material of the second cell stack,
   the conductive substrate electrically connecting the first cell stack and the second cell stack,
   the conductive substrate further comprising a first portion and a second portion;
   the first non-flooded cell further comprising a first positive electrode and a first negative electrode, the first positive electrode being disposed on the first portion of the conductive substrate,
   the second non-flood cell further comprising a second positive electrode and a second negative electrode, the second negative electrode being disposed on the second portion of the conductive substrate,
   the first cell stack and the second sell stack being formed by simultaneously rolling a first cell strip and a second cell strip corresponding respectively to the first non-flooded cell and the second non-flooded cell; and
   the first cell stack and the second cell stack being disposed in the common gas management cavity and disposed axially in the cylindrical case.

2. The lead-acid battery of claim 1, wherein the cylindrical case is vented.

3. The lead-acid of claim 1, wherein each of the first cell strip and the second cell strip includes a positive electrode strip, a negative electrode strip, and a separator strip disposed between the positive electrode strip and the negative electrode strip, and the positive electrode strip, the negative strip, and the separator strip overlap one another.

4. The lead-acid of claim 1, further comprising a center mandrel disposed within the common gas management cavity and oriented axially along the cylindrical case, wherein the first cell stack and the second cell stack are rolled around the center mandrel.

5. The lead-acid battery of claim 3, wherein the separator strips are configured to enable the ionic transfer within the first non-flooded cell and the second non-flooded cell.

6. The lead-acid battery of claim 1, wherein each of the first cell stack and the second cell stack includes a plurality of electrode layers having positive electrodes and negative electrodes arranged in an alternating order.

7. The lead-acid battery of claim 6, wherein the separator layer includes an ionically conductive medium.

8. The lead-acid battery of claim 7, wherein the separator includes a polymeric membrane or Nafion material.

9. The lead-acid battery of claim 1, wherein the first positive electrode and the second negative electrode form a bipole electrode.

* * * * *

UNITED STATES PATENT AND TRADEMARK OFFICE
CERTIFICATE OF CORRECTION

PATENT NO. : 8,808,914 B2
APPLICATION NO. : 13/766991
DATED : August 19, 2014
INVENTOR(S) : Dhar et al.

Page 1 of 1

It is certified that error appears in the above-identified patent and that said Letters Patent is hereby corrected as shown below:

IN THE CLAIMS:

In claim 1, column 37, line 32, "second non-flood cell" should read --second non-flooded cell--.

In claim 1, column 38, line 1, "second sell stack" should read --second cell stack--.

In claim 3, column 38, line 10, "The lead-acid of claim 1," should read --The lead-acid battery of claim 1,--.

In claim 3, column 38, line 14, "the negative strip," should read --the negative electrode strip,--.

In claim 4, column 38, line 16, "The lead-acid of claim 1," should read --The lead-acid battery of claim 1,--.

Signed and Sealed this
Sixth Day of January, 2015

Michelle K. Lee
*Deputy Director of the United States Patent and Trademark Office*